(12) United States Patent
Herbst

(10) Patent No.: US 7,346,063 B1
(45) Date of Patent: Mar. 18, 2008

(54) MEMORY MANAGEMENT UNIT FOR A NETWORK SWITCH

(75) Inventor: Joseph Herbst, Milpitas, CA (US)

(73) Assignee: Broadcom Corporation, Irvine, CA (US)

( * ) Notice: Subject to any disclaimer, the term of this patent is extended or adjusted under 35 U.S.C. 154(b) by 1069 days.

(21) Appl. No.: 09/599,938

(22) Filed: Jun. 23, 2000

Related U.S. Application Data

(63) Continuation-in-part of application No. 09/343,409, filed on Jun. 30, 1999.

(60) Provisional application No. 60/144,097, filed on Jul. 16, 1999, provisional application No. 60/144,098, filed on Jul. 16, 1999, provisional application No. 60/144,283, filed on Jul. 16, 1999, provisional application No. 60/144,286, filed on Jul. 16, 1999, provisional application No. 60/144,284, filed on Jul. 16, 1999, provisional application No. 60/144,094, filed on Jul. 16, 1999, provisional application No. 60/095,972, filed on Aug. 10, 1998, provisional application No. 60/092,220, filed on Jul. 8, 1998.

(51) Int. Cl.
*H04L 12/56* (2006.01)

(52) U.S. Cl. .............. 370/395.7; 370/392; 370/428

(58) Field of Classification Search .............. 370/395, 370/400, 389, 396, 352, 412–413, 428–429, 370/395.7, 399, 395.71, 395.72, 427, 417, 370/418, 905, 415

See application file for complete search history.

(56) References Cited

U.S. PATENT DOCUMENTS

| | | | | |
|---|---|---|---|---|
| 5,255,264 A | * | 10/1993 | Cotton et al. ............. | 370/286 |
| 5,412,655 A | * | 5/1995 | Yamada et al. ............ | 370/474 |
| 5,724,358 A | * | 3/1998 | Headrick et al. .......... | 370/418 |
| 5,841,771 A | * | 11/1998 | Irwin et al. ............... | 370/360 |
| 5,844,906 A | * | 12/1998 | Khelghatti et al. ........ | 370/474 |
| 6,061,351 A | * | 5/2000 | Erimli et al. .............. | 370/390 |
| 6,061,358 A | * | 5/2000 | Nelson et al. ............. | 370/412 |
| 6,128,295 A | * | 10/2000 | Larsson et al. ............ | 370/389 |
| 6,137,807 A | * | 10/2000 | Rusu et al. ................ | 370/429 |
| 6,233,244 B1 | * | 5/2001 | Runaldue et al. .......... | 370/412 |
| 6,246,680 B1 | * | 6/2001 | Muller et al. .............. | 370/389 |
| 6,320,861 B1 | * | 11/2001 | Adam et al. ............... | 370/395.7 |
| 6,400,715 B1 | * | 6/2002 | Beaudoin et al. .......... | 370/392 |

* cited by examiner

*Primary Examiner*—Chi Pham
*Assistant Examiner*—Kevin Mew
(74) *Attorney, Agent, or Firm*—Squire, Sanders & Dempsey L.L.P.

(57) ABSTRACT

A network switch having at least one port data port interface, a first memory, a second memory, and a memory management unit in connection with the at least one data port interface, the first memory, and the second memory. The memory management unit operates to receive data from the at least one data port interface, determine if the data is to be stored in one of the first memory or the second memory, store the data in one of the first memory or the second memory as a linked list, retrieve the data from one of the first memory or the second memory, and forwards the data for egress.

31 Claims, 39 Drawing Sheets

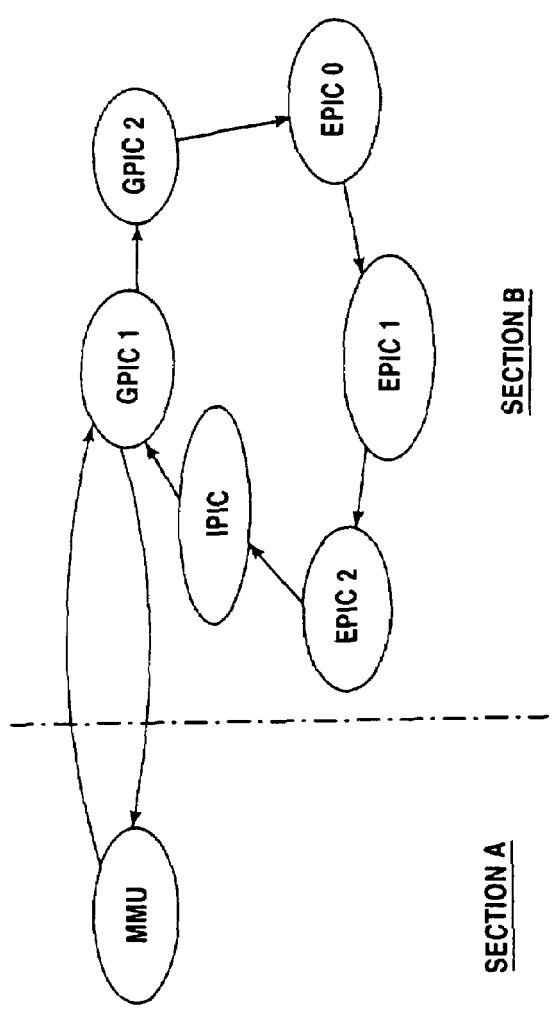
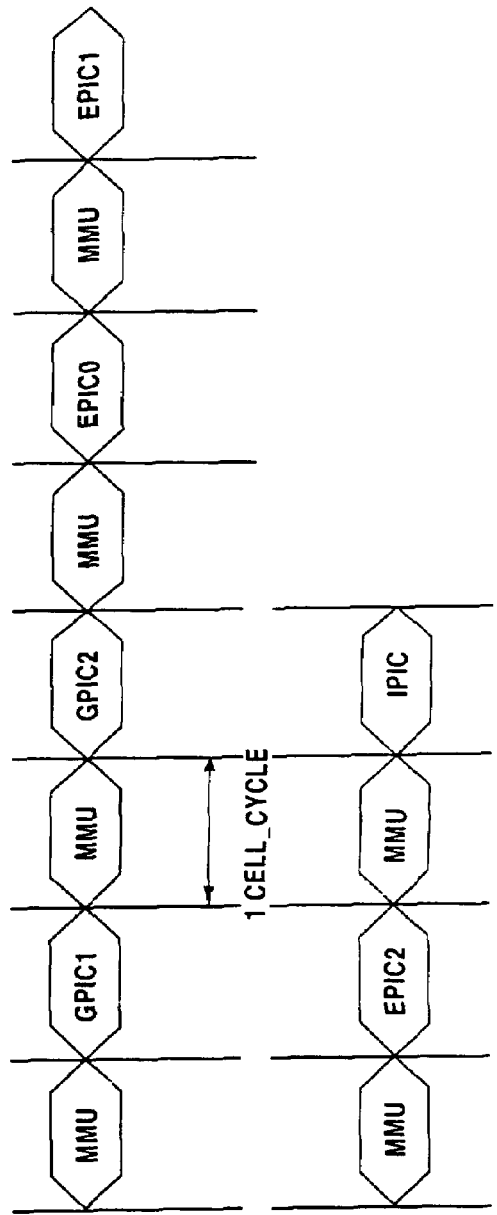
Fig.4a
Fig.4b

Fig.5

PROTOCOL CHANNEL MESSAGES

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| OPCODE | IP IPX | RESERVED | NXT CELL | SRC DEST PORT | | | COS | | J | S | E | CRC | P | O | LEN |

| 62 | 60 | 58 | 56 | 54 | 52 | 50 | 48 | 46 | 44 | 42 | 40 | 38 | 36 | 34 | 32 |
|----|----|----|----|----|----|----|----|----|----|----|----|----|----|----|----|
| MODULE ID BITMAP |||||||||||||||||

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| R | Bc / Mc PORTBITMAP |||||||||||||||

| 62 | 60 | 58 | 56 | 54 | 52 | 50 | 48 | 46 | 44 | 42 | 40 | 38 | 36 | 34 | 32 |
|----|----|----|----|----|----|----|----|----|----|----|----|----|----|----|----|
| PFM | NEW IP CHECKSUM | | | | | | | M | MT-MOD ID | | T | TGID | | MOD OPCODE | c |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| U | UNTAGGED PORTBITMAP / SRC PORT NUMBER (bit0...5) |||||||||||||||

| 62 | 60 | 58 | 56 | 54 | 52 | 50 | 48 | 46 | 44 | 42 | 40 | 38 | 36 | 34 | 32 |
|----|----|----|----|----|----|----|----|----|----|----|----|----|----|----|----|
| RSVD | | MATCHED FILTER | | VLAN ID | | | | | SRC PORT | | | REMOTE PORT | | | |

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| CPU OPCODES | | | | | | | | | TIME STAMP | | | | | | |

| 62 | 60 | 58 | 56 | 54 | 52 | 50 | 48 | 46 | 44 | 42 | 40 | 38 | 36 | 34 | 32 |
|----|----|----|----|----|----|----|----|----|----|----|----|----|----|----|----|
| R | L3 PORT BITMAP |||||||||||||||

Fig.6

SIDE BAND CHANNEL MESSAGES

| 30 | 28 | 26 | 24 | 22 | 20 | 18 | 16 | 14 | 12 | 10 | 8 | 6 | 4 | 2 | 0 |
|----|----|----|----|----|----|----|----|----|----|----|---|---|---|---|---|
| OPCODE ||| DEST PORT / DESTINATION DEV ID ||| SRC PORT ||| DATA LEN ||| E | EC ODE | COS | C |
| ADDRESS ||||||||||||||||
| DATA ||||||||||||||||

Fig.11

| LINE 0 → | FC \| LC \| BC/MC \| Cpy_cnt (5b) \| Cell_length (7b) \| CRC (2b) \| NC_header (16b) \| Src Count (6) \| IPX \| IP \| Time_Stamp (14b) \| O bits (2b) \| P \| NextCellLen (2b) \| CpuOpcode (4b) \| Cell_data (0-9B) |
|---|---|
| LINE 1 → | Cell_data (10-27) Bytes |
| LINE 2 → | Cell_data (28-45) Bytes |
| LINE 3 → | Cell_data (45-63) Bytes |

Fig.17  FFP PROGRAMMING FLOW CHART

SDRAM Controller Interface Timing

SDRAM Controller Command Input FIFO

| Field | Left | Right | Bits |
|---|---|---|---|
| Src | 310 | 306 | 5 |
| CPUOpcode | 305 | 302 | 4 |
| BC/MC Bitmap | 301 | 270 | 32 |
| Cos | 269 | 267 | 3 |
| P | 266 | 266 | 1 |
| FC (S) | 265 | 265 | 1 |
| LC (E) | 264 | 264 | 1 |
| CRC | 263 | 262 | 2 |
| Len (0 = 64) | 261 | 256 | 6 |
| O | 255 | 254 | 2 |
| BC/MC | 253 | 253 | 1 |
| Copy Count (0 = 32) | 252 | 248 | 5 |
| Untagged Bitmap | 247 | 216 | 32 |
| IP | 215 | 215 | 1 |
| IPX | 214 | 214 | 1 |
| Time Stamp | 213 | 200 | 14 |
| Cell Data Bytes 24-0 | 199 | 0 | 200 |
| Total | | | 311 |

FIGURE 28

| Cell Size | SAU Words | SDRAM Words |
|---|---|---|
| 0 0 | 1 | 2 |
| 0 1 | 1 | 3 |
| 1 0 | 2 | 4 |
| 1 1 | 2 | 5 |

Figure 29

| Field | Left | Right | Bits | First Only |
|---|---|---|---|---|
| Last Slot | 313 | 313 | 1 | X |
| Next Slot ID | 312 | 297 | 16 | X |
| Copy Count | 296 | 292 | 5 | X |
| CPUOpcode | 291 | 288 | 4 | |
| Cell Size | 287 | 286 | 2 | |
| P | 285 | 285 | 1 | |
| FC | 284 | 284 | 1 | |
| LC | 283 | 283 | 1 | |
| CRC | 282 | 281 | 2 | |
| Len | 280 | 275 | 6 | |
| O | 274 | 273 | 2 | |
| BC/MC | 272 | 272 | 1 | |
| IP | 271 | 271 | 1 | |
| IPX | 270 | 270 | 1 | |
| Time Stamp | 269 | 256 | 14 | |

Figure 30

MEMORY MANAGEMENT UNIT FOR A NETWORK SWITCH

REFERENCE TO RELATED APPLICATIONS

This application claims priority of U.S. Provisional Patent Application Ser. No. 60/144,097, filed on Jul. 16, 1999, U.S. Provisional Patent Application Ser. No. 60/144,098, filed on Jul. 16, 1999, U.S. Provisional Patent Application Ser. No. 60/144,283, filed on Jul. 16, 1999, U.S. Provisional Patent Application Ser. No. 60/144,286, filed on Jul. 16, 1999, U.S. Provisional Patent Application Ser. No. 60/144,284, filed on Jul. 16, 1999, and U.S. Provisional Patent Application Ser. No. 60/144,094, filed on Jul. 16, 1999. This application is a continuation-in-part (CIP) of U.S. patent application Ser. No. 09/343,409, filed on Jun. 30, 1999, which claims priority to U.S. Provisional Patent Application Ser. No. 60/092,220, filed on Jul. 8, 1998, and U.S. Provisional Application No. 60/095,972, filed on Aug. 10, 1998. The subject matter of these earlier filed applications is hereby incorporated by reference.

BACKGROUND OF THE INVENTION

Field of the Invention

The invention relates to a method and apparatus for high performance switching in local area communications networks such as token ring, ATM, ethernet, fast ethernet, and gigabit ethernet environments, generally known as LANs. In particular, the invention relates to a new switching architecture in an integrated, modular, single chip solution, which can be implemented on a semiconductor substrate such as a silicon chip.

Description of the Related Art

As computer performance has increased in recent years, the demands on computer networks has significantly increased; faster computer processors and higher memory capabilities need networks with high bandwidth capabilities to enable high speed transfer of significant amounts of data. The well-known ethernet technology, which is based upon numerous IEEE ethernet standards, is one example of computer networking technology which has been able to be modified and improved to remain a viable computing technology. A more complete discussion of prior art networking systems can be found, for example, in SWITCHED AND FAST ETHERNET, by Breyer and Riley (Ziff-Davis, 1996), and numerous IEEE publications relating to IEEE 802 standards. Based upon the Open Systems Interconnect (OSI) 7-layer reference model, network capabilities have grown through the development of repeaters, bridges, routers, and, more recently, "switches", which operate with various types of communication media. Thickwire, thinwire, twisted pair, and optical fiber are examples of media which has been used for computer networks. Switches, as they relate to computer networking and to ethernet, are hardware-based devices which control the flow of data packets or cells based upon destination address information which is available in each packet. A properly designed and implemented switch should be capable of receiving a packet and switching the packet to an appropriate output port at what is referred to wirespeed or linespeed, which is the maximum speed capability of the particular network. Basic ethernet wirespeed is up to 10 megabits per second, and Fast Ethernet is up to 100 megabits per second. The newest ethernet is referred to as gigabit ethernet, and is capable of transmitting data over a network at a rate of up to 1,000 megabits per second. As speed has increased, design constraints and design requirements have become more and more complex with respect to following appropriate design and protocol rules and providing a low cost, commercially viable solution. For example, high speed switching requires high speed memory to provide appropriate buffering of packet data; conventional Dynamic Random Access Memory (DRAM) is relatively slow, and requires hardware-driven refresh. The speed of DRAMs, therefore, as buffer memory in network switching, results in valuable time being lost, and it becomes almost impossible to operate the switch or the network at linespeed. Furthermore, external CPU involvement should be avoided, since CPU involvement also makes it almost impossible to operate the switch at linespeed. Additionally, as network switches have become more and more complicated with respect to requiring rules tables and memory control, a complex multi-chip solution is necessary which requires logic circuitry, sometimes referred to as glue logic circuitry, to enable the various chips to communicate with each other. Additionally, cost/benefit tradeoffs are necessary with respect to expensive but fast SRAMs versus inexpensive but slow DRAMs. Additionally, DRAMs, by virtue of their dynamic nature, require refreshing of the memory contents in order to prevent losses thereof. SRAMs do not suffer from the refresh requirement, and have reduced operational overhead which compared to DRAMs such as elimination of page misses, etc. Although DRAMs have adequate speed when accessing locations on the same page, speed is reduced when other pages must be accessed.

Referring to the OSI 7-layer reference model discussed previously, and illustrated in FIG. 7, the higher layers typically have more information. Various types of products are available for performing switching-related functions at various levels of the OSI model. Hubs or repeaters operate at layer one, and essentially copy and "broadcast" incoming data to a plurality of spokes of the hub. Layer two switching-related devices are typically referred to as multiport bridges, and are capable of bridging two separate networks. Bridges can build a table of forwarding rules based upon which MAC (media access controller) addresses exist on which ports of the bridge, and pass packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, can forward packets based upon the destination network address. Layer three switches are capable of learning addresses and maintaining tables thereof which correspond to port mappings. Processing speed for layer three switches can be improved by utilizing specialized high performance hardware, and off loading the host CPU so that instruction decisions do not delay packet forwarding.

SUMMARY OF THE INVENTION

The present invention is related to a network switch having at least one port data port interface, a first memory, a second memory, and a memory management unit in connection with the at least one data port interface, the first memory, and the second memory. The memory management unit operates to receive data from the at least one data port interface, determine if the data is to be stored in one of the first memory or the second memory, store the data in one of the first memory or the second memory as a linked list, retrieve the data from one of the first memory or the second memory, and forwards the data for egress.

The present invention is further related to method for storing data in a network switch, wherein the method includes the steps of receiving data to be transmitted to an egress at an input to a memory management unit and formatting the data received as a linked list. Thereafter, determining if the data is to be stored in a first memory or a second memory, and storing the data in the first memory or the second memory based on the determining step.

BRIEF DESCRIPTION OF THE DRAWINGS

The objects and features of the invention will be more readily understood with reference to the following description and the attached drawings, wherein:

FIG. 4A illustrates demand priority round robin arbitration for access to the C-channel of the network switch;

FIG. 4B illustrates access to the C-channel based upon the round robin arbitration illustrated in FIG. 4A;

FIG. 5 illustrates P-channel message types;

FIG. 6 illustrates a message format for S channel message types;

FIG. 11 illustrates the CBM cell format;

FIG. 28 illustrates the first and second word formats;

FIG. 29 illustrates number of words within SAU and SDRAM that correspond to four possible two bit cell sizes;

FIG. 30 illustrates the SAU word format;

DETAILED DESCRIPTION OF THE PREFERRED EMBODIMENTS

Figure 1:
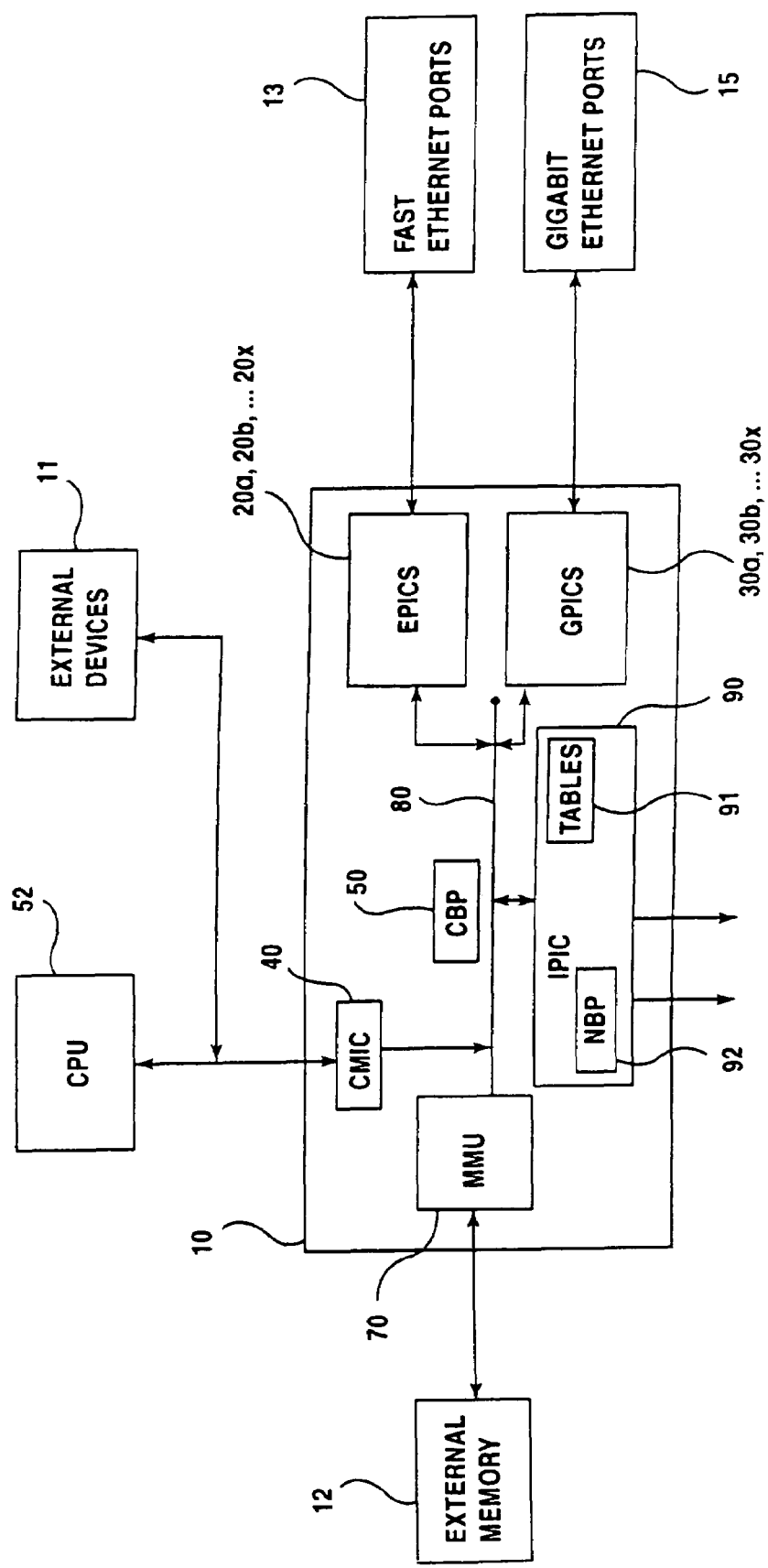
FIG. 1 is a general block diagram of elements of the present invention.

FIG. 1 illustrates a configuration wherein a switch-on-chip (SOC) 10, in accordance with the present invention, is functionally connected to external devices 11, external memory 12, fast ethernet ports 13, and gigabit ethernet ports 15. For the purposes of this embodiment, fast ethernet ports 13 will be considered low speed ethernet ports, since they are capable of operating at speeds ranging from 10 Mbps to 100 Mbps, while the gigabit ethernet ports 15, which are high speed ethernet ports, are capable of operating at 1000 Mbps. External devices 11 could include other switching devices for expanding switching capabilities, or other devices as may be required by a particular application. External memory 12 is additional off-chip memory, which is in addition to internal memory which is located on SOC 10, as will be discussed below. CPU 52 can be used as necessary to program SOC 10 with rules which are appropriate to control packet processing. However, once SOC 10 is appropriately programmed or configured, SOC 10 operates, as much as possible, in a free running manner without communicating with CPU 52. Because CPU 52 does not control every aspect of the operation of SOC 10, CPU 52 performance requirements, at least with respect to SOC 10, are fairly low. A less powerful and therefore less expensive CPU 52 can therefore be used when compared to known network switches. As also will be discussed below, SOC 10 utilizes external memory 12 in an efficient manner so that the cost and performance requirements of memory 12 can be reduced. Internal memory on SOC 10, as will be discussed below, is also configured to maximize switching throughput and minimize costs.

It should be noted that any number of fast ethernet ports 13 and gigabit ethernet ports 15 can be provided. In one embodiment, a maximum of 24 fast ethernet ports 13 and 2 gigabit ports 15 can be provided. Similarly, additional interconnect links to additional external devices 11, external memory 12, and CPUs 52 may be provided as necessary.

Figure 2:
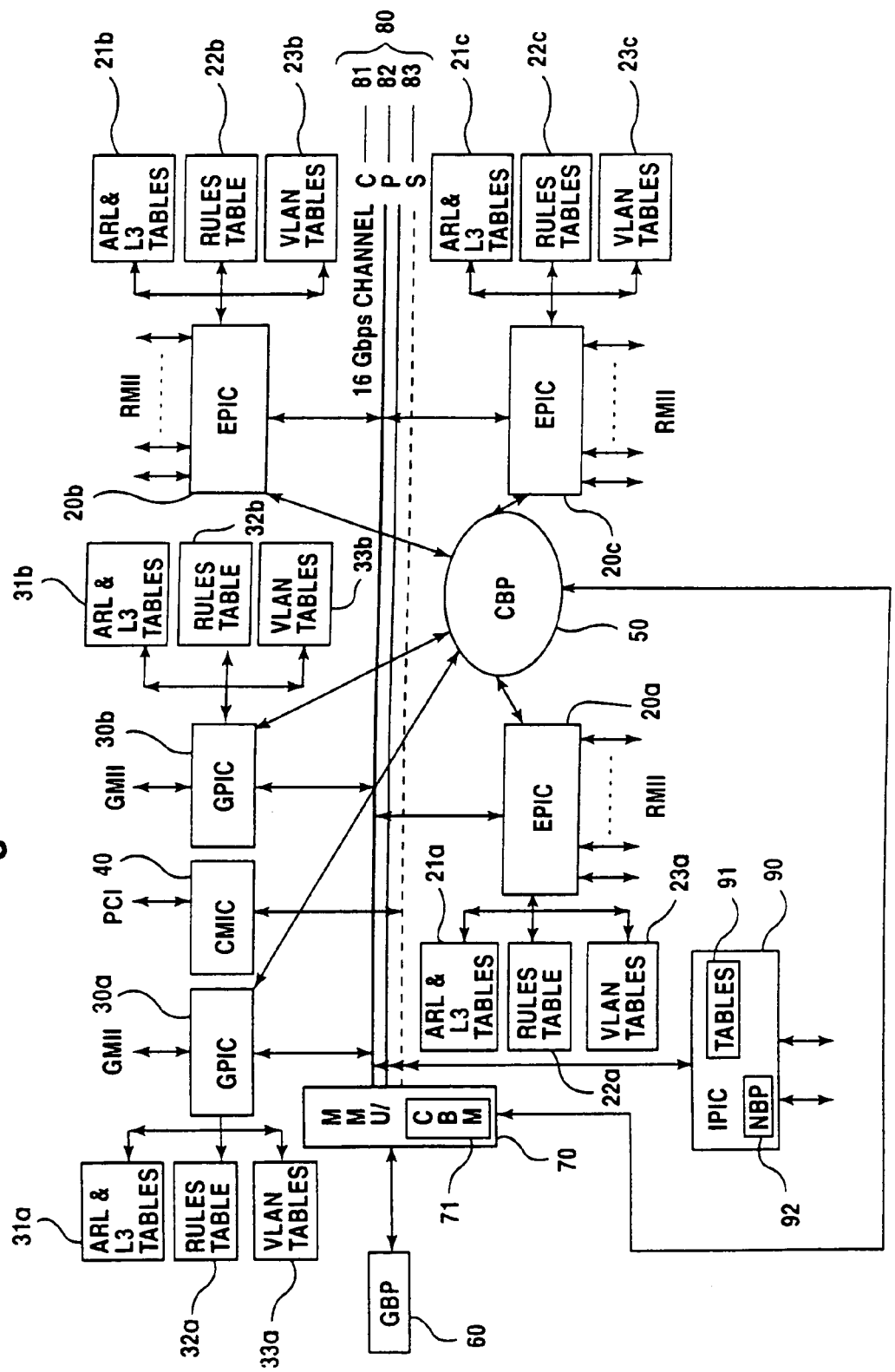
FIG. 2 is a more detailed block diagram of a network switch according to the present invention.

FIG. 2 illustrates a more detailed block diagram of the functional elements of SOC 10. As evident from FIG. 2 and as noted above, SOC 10 includes a plurality of modular systems on-chip, with each modular system, although being on the same chip, being functionally separate from other modular systems. Therefore, each module can efficiently operate in parallel with other modules, and this configuration enables a significant amount of freedom in updating and re-engineering SOC 10.

SOC 10 includes a plurality of Ethernet Port Interface Controllers (EPIC) 20a, 20b, 20c, etc., a plurality of Gigabit Port Interface Controllers (GPIC) 30*a*, 30*b*, etc., a CPU Management Interface Controller (CMIC) 40, a Common Buffer Memory Pool (CBP) 50, a Pipelined Memory Management Unit (PMMU) 70, including a Common Buffer Manager (CBM) 71, and a system-wide bus structure referred to as CPS channel 80. The PMMU 70 communicates with external memory 12, which includes a Global Buffer Memory Pool (GBP) 60. The CPS channel 80 comprises C channel 81, P channel 82, and S channel 83. The CPS channel is also referred to as the Cell Protocol Sideband Channel, and is a 17 Gbps channel which glues or interconnects the various modules together. As also illustrated in FIG. 2, other high speed interconnects can be provided, as shown as an extendible high speed interconnect. In one embodiment of the invention, this interconnect can be in the form of an interconnect port interface controller (IPIC) 90, which is capable of interfacing CPS channel 80 to external devices 11 through an extendible high speed interconnect link. As will be discussed below, each EPIC 20*a*, 20*b*, and 20*c*, generally referred to as EPIC 20, and GPIC 30*a* and 30*b*, generally referred to as GPIC 30, are closely interrelated with appropriate address resolution logic and layer three switching tables 21*a*, 21*b*, 21*c*, 31*a*, 31*b*, rules tables 22*a*, 22*b*, 22*c*, 31*a*, 31*b*, and VLAN tables 23*a*, 23*b*, 23*c*, 31*a*, 31*b*. These tables will be generally referred to as 21, 31, 22, 32, 23, 33, respectively. These tables, like other tables on SOC 10, are implemented in silicon as two-dimensional arrays.

In a preferred embodiment of the invention, each EPIC 20 supports 8 fast ethernet ports 13, and switches packets to and/or from these ports as may be appropriate. The ports, therefore, are connected to the network medium (coaxial, twisted pair, fiber, etc.) using known media connection technology, and communicates with the CPS channel 80 on the other side thereof. The interface of each EPIC 20 to the network medium can be provided through a Reduced Media Internal Interface (RMII), which enables the direct medium connection to SOC 10. As is known in the art, auto-negotiation is an aspect of fast ethernet, wherein the network is capable of negotiating a highest communication speed between a source and a destination based on the capabilities of the respective devices. The communication speed can vary, as noted previously, between 10 Mbps and 100 Mbps; auto negotiation capability, therefore, is built directly into each EPIC module. The address resolution logic (ARL) and layer three tables (ARL/L3) 21*a*, 21*b*, 21*c*, rules table 22*a*, 22*b*, 22*c*, and VLAN tables 23*a*, 23*b*, and 23*c* are configured to be part of or interface with the associated EPIC in an efficient and expedient manner, also to support wirespeed packet flow.

Each EPIC 20 has separate ingress and egress functions. On the ingress side, self-initiated and CPU-initiated learning of level 2 address information can occur. Address resolution logic (ARL) is utilized to assist in this task. Address aging is built in as a feature, in order to eliminate the storage of address information which is no longer valid or useful. The EPIC also carries out layer 2 mirroring. A fast filtering processor (FFP) 141 (see FIG. 14) is incorporated into the EPIC, in order to accelerate packet forwarding and enhance packet flow. The ingress side of each EPIC and GPIC, illustrated in FIG. 8 as ingress submodule 14, has a significant amount of complexity to be able to properly process a significant number of different types of packets which may come in to the port, for linespeed buffering and then appropriate transfer to the egress. Functionally, each port on each module of SOC 10 has a separate ingress submodule 14 associated therewith. From an implementation perspective, however, in order to minimize the amount of hardware implemented on the single-chip SOC 10, common hardware elements in the silicon will be used to implement a plurality of ingress submodules on each particular module. The configuration of SOC 10 discussed herein enables concurrent lookups and filtering, and therefore, processing of up to 6.6 million packets per second. Layer two lookups, Layer three lookups and filtering occur simultaneously to achieve this level of performance. On the egress side, the EPIC is capable of supporting packet polling based either as an egress management or class of service (COS) function. Rerouting/scheduling of packets to be transmitted can occur, as well as head-of-line (HOL) blocking notification, packet aging, cell reassembly, and other functions associated with ethernet port interface.

Each GPIC 30 is similar to each EPIC 20, but supports only one gigabit ethernet port, and utilizes a port-specific ARL table, rather than utilizing an ARL table which is shared with any other ports. Additionally, instead of an RMII, each GPIC port interfaces to the network medium utilizing a gigabit media independent interface (GMII).

CMIC 40 acts as a gateway between the SOC 10 and the host CPU. The communication can be, for example, along a PCI bus, or other acceptable communications bus. CMIC 40 can provide sequential direct mapped accesses between the host CPU 52 and the SOC 10. CPU 52, through the CMIC 40, will be able to access numerous resources on SOC 10, including MIB counters, programmable registers, status and control registers, configuration registers, ARL tables, port-based VLAN tables, IEEE 802.1q VLAN tables, layer three tables, rules tables, CBP address and data memory, as well as GBP address and data memory. Optionally, the CMIC 40 can include DMA support, DMA chaining and scatter-gather, as well as master and target PCI 64.

Common buffer memory pool or CBP 50 can be considered to be the on-chip data memory. In one embodiment of the invention, the CBP 50 is first level high speed SRAM memory, to maximize performance and minimize hardware overhead requirements. The CBP can have a size of, for example, 720 kilobytes running at 132 MHz. Packets stored in the CBP 50 are typically stored as cells, rather than packets. As illustrated in the figure, PMMU 70 also contains the Common Buffer Manager (CBM) 71 thereupon. CBM 71 handles queue management, and is responsible for assigning cell pointers to incoming cells, as well as assigning common packet IDs (CPID) once the packet is fully written into the CBP. CBM 71 can also handle management of the on-chip free address pointer pool, control actual data transfers to and from the data pool, and provide memory budget management.

Global memory buffer pool or GBP 60 acts as a second level memory, and can be located on-chip or off chip. In the preferred embodiment, GBP 60 is located off chip with respect to SOC 10. When located off-chip, GBP 60 is considered to be a part of or all of external memory 12. As a second level memory, the GBP does not need to be expensive high speed SRAMs, and can be a slower less expensive memory such as DRAM. The GBP is tightly coupled to the PMMU 70, and operates like the CBP in that packets are stored as cells. For broadcast and multicast messages, only one copy of the packet is stored in GBP 60.

As shown in the figure, PMMU 70 is located between GBP 60 and CPS channel 80, and acts as an external memory interface. In order to optimize memory utilization, PMMU 70 includes multiple read and write buffers, and supports numerous functions including global queue management, which broadly includes assignment of cell pointers for rerouted incoming packets, maintenance of the global FAP, time-optimized cell management, global memory budget management, GPID assignment and egress manager notification, write buffer management, read prefetches based upon egress manager/class of service requests, and smart memory control.

As shown in FIG. 2, the CPS channel 80 is actually three separate channels, referred to as the C-channel, the P-channel, and the S-channel. The C-channel is 128 bits wide, and runs at 132 MHz. Packet transfers between ports occur on the C-channel. Since this channel is used solely for data transfer, there is no overhead associated with its use. The P-channel or protocol channel is synchronous or locked with the C-channel. During cell transfers, the message header is sent via the P-channel by the PMMU. The P-channel is 32 bits wide, and runs at 132 MHz.

The S or sideband channel runs at 132 MHz, and is 32 bits wide. The S-channel is used for functions such as four conveying Port Link Status, receive port full, port statistics, ARL table synchronization, memory and register access to CPU and other CPU management functions, and global memory full and common memory full notification.

Figure 3:
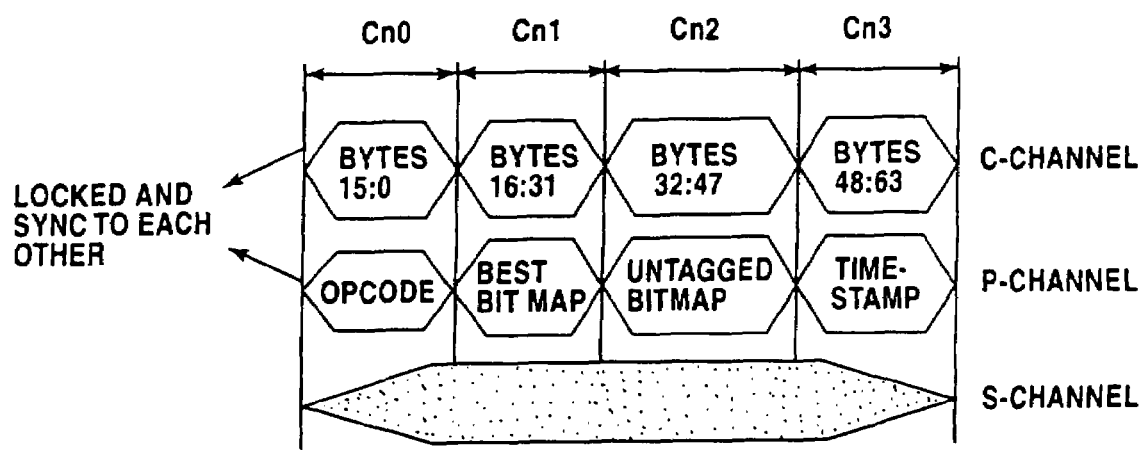
FIG. 3 illustrates the data flow on the CPS channel of a network switch according to the present invention.
Figure 7:
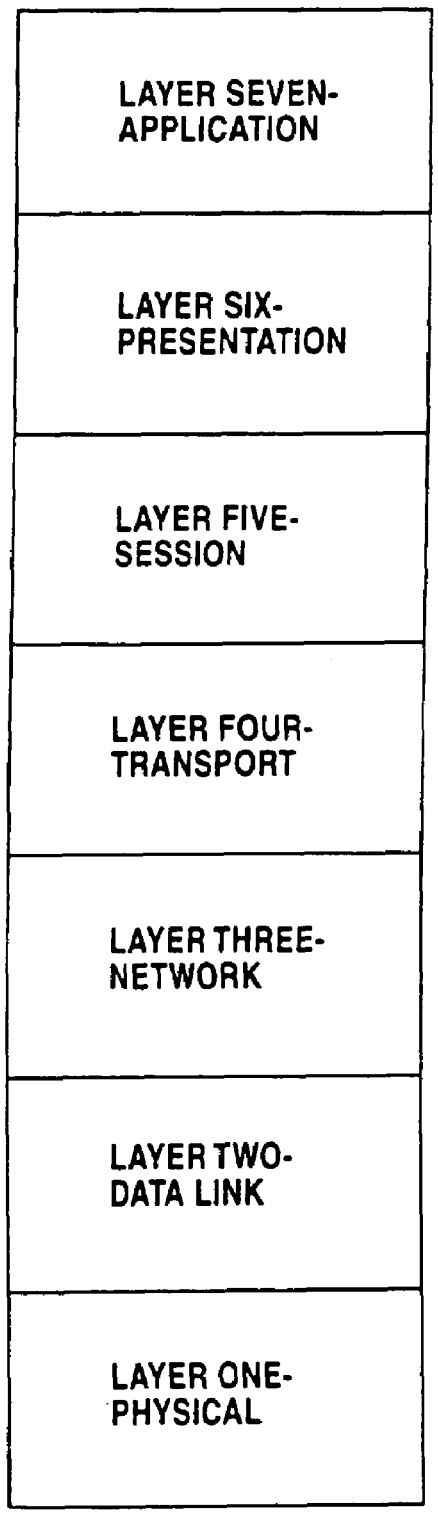
FIG. 7 is an illustration of the OSI 7 layer reference model.

A proper understanding of the operation of SOC 10 requires a proper understanding of the operation of CPS channel 80. Referring to FIG. 3, it can be seen that in SOC 10, on the ingress, packets are sliced by an EPIC 20 or GPIC 30 into 64-byte cells. The use of cells on-chip instead of packets makes it easier to adapt the SOC to work with cell based protocols such as, for example, Asynchronous Transfer Mode (ATM). Presently, however, ATM utilizes cells which are 53 bytes long, with 48 bytes for payload and 5 bytes for header. In the SOC, incoming packets are sliced into cells which are 64 bytes long as discussed above, and the cells are further divided into four separate 16 byte cell blocks Cn0 . . . Cn3. Locked with the C-channel is the P-channel, which locks the opcode in synchronization with Cn0. A port bit map is inserted into the P-channel during the phase Cn1. The untagged bit map is inserted into the P-channel during phase Cn2, and a time stamp is placed on the P-channel in Cn3. Independent from occurrences on the C and P-channel, the S-channel is used as a sideband, and is therefore decoupled from activities on the C and P-channel.

Cell or C-Channel

Arbitration for the CPS channel occurs out of band. Every module (EPIC, GPIC, etc.) monitors the channel, and matching destination ports respond to appropriate transactions. C-channel arbitration is a demand priority round robin arbitration mechanism. If no requests are active, however, the default module, which can be selected during the configuration of SOC 10, can park on the channel and have complete access thereto. If all requests are active, the configuration of SOC 10 is such that the PMMU is granted access every other cell cycle, and EPICs 20 and GPICs 30 share equal access to the C-channel on a round robin basis. FIGS. 4A and 4B illustrate a C-channel arbitration mechanism wherein section A is the PMMU, and section B consists of two GPICs and three EPICs. The sections alternate access, and since the PMMU is the only module in section A, it gains access every other cycle. The modules in section B, as noted previously, obtain access on a round robin basis.

Protocol or P-Channel

Referring once again to the protocol or P-channel, a plurality of messages can be placed on the P-channel in order to properly direct flow of data flowing on the C-channel. Since P-channel 82 is 32 bits wide, and a message typically requires 128 bits, four smaller 32 bit messages are put together in order to form a complete P-channel message. The following list identifies the fields and function and the various bit counts of the 128 bit message on the P-channel.

Opcode—2 bits long—Identifies the type of message present on the C channel 81;

IP Bit—1 bit long—This bit is set to indicate that the packet is an IP switched packet;

IPX Bit—1 bit long—This bit is set to indicate that the packet is an IPX switched packet;

Next Cell—2 bits long—A series of values to identify the valid bytes in the corresponding cell on the C channel 81;

SRC DEST Port—6 bits long—Defines the port number which sends the message or receives the message, with the interpretation of the source or destination depending upon Opcode;

Cos—3 bits long—Defines class of service for the current packet being processed;

J—1 bit long—Describes whether the current packet is a jumbo packet;

S—1 bit long—Indicates whether the current cell is the first cell of the packet;

E—1 bit long—Indicates whether the current cell is the last cell of the packet;

CRC—2 bits long—Indicates whether a Cyclical Redundancy Check (CRC) value should be appended to the packet and whether a CRC value should be regenerated;

P Bit—1 bit long—Determines whether MMU should Purge the entire packet;

Len—7 bytes—Identifies the valid number of bytes in current transfer;

O—2 bits—Defines an optimization for processing by the CPU 52; and

Bc/Mc Bitmap—28 bits—Defines the broadcast or multicast bitmap. Identifies egress ports to which the packet should be set, regarding multicast and broadcast messages.

Untag Bits/Source Port—28/5 bits long—Depending upon Opcode, the packet is transferred from Port to MMU, and this field is interpreted as the untagged bit map. A different Opcode selection indicates that the packet is being transferred from MMU to egress port, and the last six bits of this field is interpreted as the Source Port field. The untagged bits identifies the egress ports which will strip the tag header, and the source port bits identifies the port number upon which the packet has entered the switch;

U Bit—1 bit long—For a particular Opcode selection (0x01, this bit being set indicates that the packet should leave the port as Untagged; in this case, tag stripping is performed by the appropriate MAC;

CPU Opcode—18 bits long—These bits are set if the packet is being sent to the CPU for any reason. Opcodes are defined based upon filter match, learn bits being set, routing bits, destination lookup failure (DLF), station movement, etc;

Time Stamp—14 bits—The system puts a time stamp in this field when the packet arrives, with a granularity of 1 μsec.

The opcode field of the P-channel message defines the type of message currently being sent. While the opcode is currently shown as having a width of 2 bits, the opcode field can be widened as desired to account for new types of messages as may be defined in the future. Graphically, however, the P-channel message type defined above is shown in FIG. 5.

An early termination message is used to indicate to CBM 71 that the current packet is to be terminated. During operation, as discussed in more detail below, the status bit (S) field in the message is set to indicate the desire to purge the current packet from memory. Also in response to the status bit all applicable egress ports would purge the current packet prior to transmission.

The Src Dest Port field of the P-channel message, as stated above, define the destination and source port addresses, respectively. Each field is 6 bits wide and therefore allows for the addressing of sixty-four ports.

The CRC field of the message is two bits wide and defines CRC actions. Bit 0 of the field provides an indication whether the associated egress port should append a CRC to the current packet. An egress port would append a CRC to the current packet when bit 0 of the CRC field is set to a logical one. Bit 1 of the CRC field provides an indication whether the associated egress port should regenerate a CRC for the current packet. An egress port would regenerate a CRC when bit 1 of the CRC field is set to a logical one. The CRC field is only valid for the last cell transmitted as defined by the E bit field of P-channel message set to a logical one.

As with the CRC field, the status bit field (st), the Len field, and the Cell Count field of the message are only valid for the last cell of a packet being transmitted as defined by the E bit field of the message.

Last, the time stamp field of the message has a resolution of 1 μs and is valid only for the first cell of the packet defined by the S bit field of the message. A cell is defined as the first cell of a received packet when the S bit field of the message is set to a logical one value.

As is described in more detail below, the C channel 81 and the P channel 82 are synchronously tied together such that data on C channel 81 is transmitted over the CPS channel 80 while a corresponding P channel message is simultaneously transmitted.

S-Channel or Sideband Channel

The S channel 83 is a 32-bit wide channel which provides a separate communication path within the SOC 10. The S channel 83 is used for management by CPU 52, SOC 10 internal flow control, and SOC 10 inter-module messaging. The S channel 83 is a sideband channel of the CPS channel 80, and is electrically and physically isolated from the C channel 81 and the P channel 82. It is important to note that since the S channel is separate and distinct from the C channel 81 and the P channel 82, operation of the S channel 83 can continue without performance degradation related to the C channel 81 and P channel 82 operation. Conversely, since the C channel is not used for the transmission of system messages, but rather only data, there is no overhead associated with the C channel 81 and, thus, the C channel 81 is able to free-run as needed to handle incoming and outgoing packet information.

The S channel 83 of CPS channel 80 provides a system wide communication path for transmitting system messages, for example, providing the CPU 52 with access to the control structure of the SOC 10. System messages include port status information, including port link status, receive port full, and port statistics, ARL table 22 synchronization, CPU 52 access to GBP 60 and CBP 50 memory buffers and SOC 10 control registers, and memory full notification corresponding to GBP 60 and/or CBP 50.

FIG. 6 illustrates a message format for an S channel message on S channel 83. The message is formed of four 32-bit words; the bits of the fields of the words are defined as follows:

Opcode—6 bits long—Identifies the type of message present on the S channel;

Dest Port—6 bits long—Defines the port number to which the current S channel message is addressed;

Src Port—6 bits long—Defines the port number of which the current S channel message originated;

COS—3 bits long—Defines the class of service associated with the current S channel message; and C bit—1 bit long—Logically defines whether the current S channel message is intended for the CPU 52.

Error Code—2 bits long—Defines a valid error when the E bit is set;

DataLen—7 bits long—Defines the total number of data bytes in the Data field;

E bit—1 bit long—Logically indicates whether an error has occurred in the execution of the current command as defined by opcode;

Address—32 bits long—Defines the memory address associated with the current command as defined in opcode;

Data—0-127 bits long—Contains the data associated with the current opcode.

With the configuration of CPS channel 80 as explained above, the decoupling of the S channel from the C channel and the P channel is such that the bandwidth on the C channel can be preserved for cell transfer, and that overloading of the C channel does not affect communications on the sideband channel.

SOC Operation

The configuration of the SOC 10 supports fast ethernet ports, gigabit ports, and extendible interconnect links as discussed above. The SOC configuration can also be "stacked", thereby enabling significant port expansion capability. Once data packets have been received by SOC 10, sliced into cells, and placed on CPS channel 80, stacked SOC modules can interface with the CPS channel and monitor the channel, and extract appropriate information as necessary. As will be discussed below, a significant amount of concurrent lookups and filtering occurs as the packet comes in to ingress submodule 14 of an EPIC 20 or GPIC 30, with respect to layer two and layer three lookups, and fast filtering.

Figure 8:
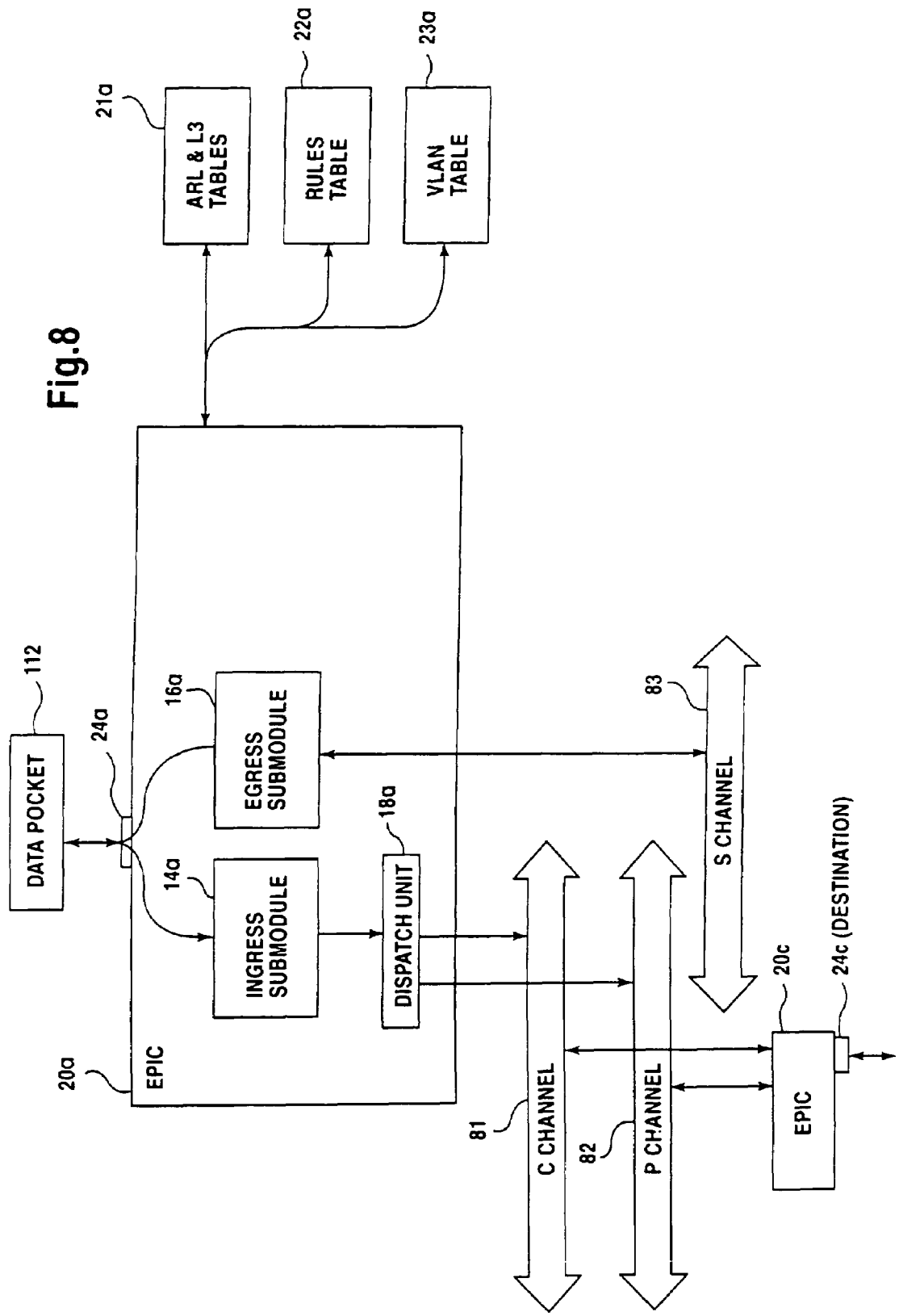
FIG. 8 illustrates an operational diagram of an EPIC module.
Figure 9:
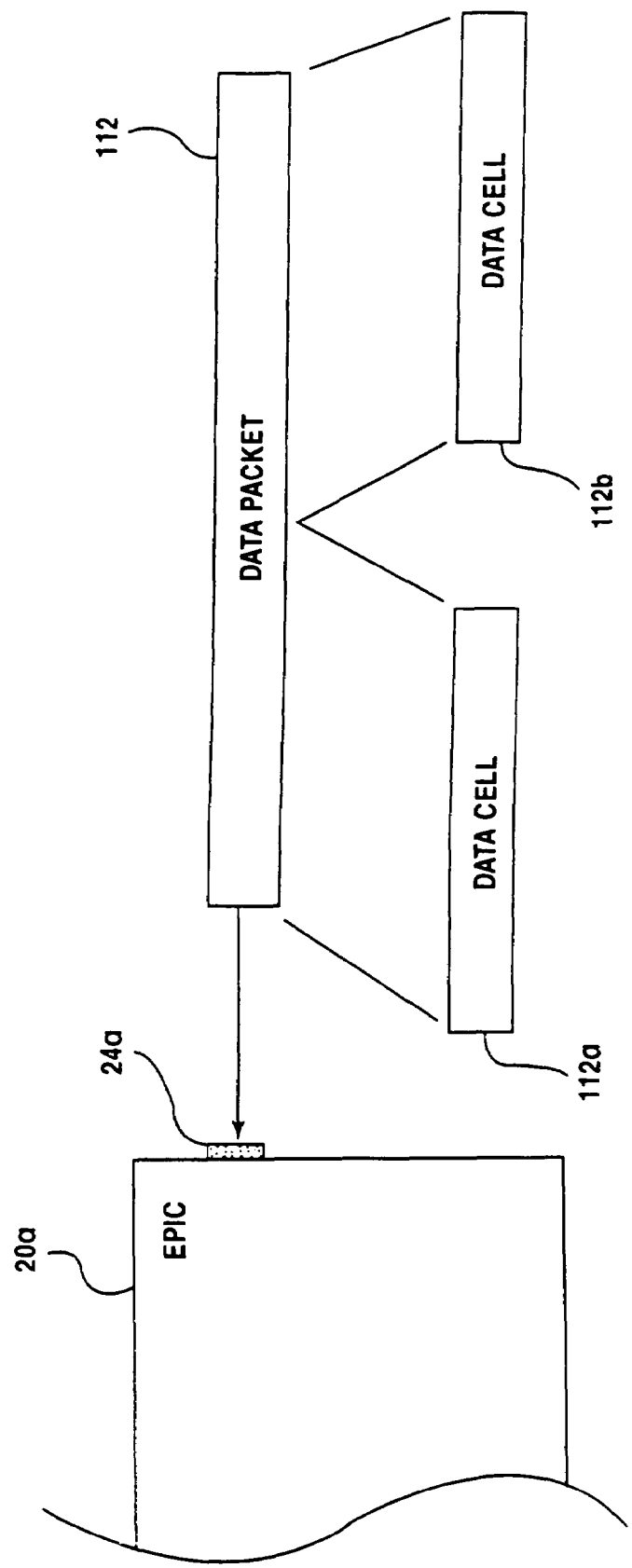
FIG. 9 illustrates the slicing of a data packet on the ingress to an EPIC module.

Now referring to FIGS. 8 and 9, the handling of a data packet is described. For explanation purposes, ethernet data to be received will consider to arrive at one of the ports 24*a* of EPIC 20*a*. It will be presumed that the packet is intended to be transmitted to a user on one of ports 24*c* of EPIC 20*c*. All EPICs 20 (20*a*, 20*b*, 20*c*, etc.) have similar features and functions, and each individually operate based on packet flow.

An input data packet 112 is applied to the port 24*a* is shown. The data packet 112 is, in this example, defined per the current standards for 10/100 Mbps Ethernet transmission and may have any length or structure as defined by that standard. This discussion will assume the length of the data packet 112 to be 1024 bits or 128 bytes.

When the data packet 112 is received by the EPIC module 20*a*, an ingress sub-module 14*a*, as an ingress function, determines the destination of the packet 112. The first 64 bytes of the data packet 112 is buffered by the ingress sub-module 14*a* and compared to data stored in the lookup tables 21*a* to determine the destination port 24*c*. Also as an ingress function, the ingress sub-module 14*a* slices the data packet 112 into a number of 64-byte cells; in this case, the 128 byte packet is sliced in two 64 byte cells 112*a* and 112*b*. While the data packet 112 is shown in this example to be exactly two 64-byte cells 112a and 112b, an actual incoming data packet may include any number of cells, with at least one cell of a length less than 64 bytes. Padding bytes are used to fill the cell. In such cases the ingress sub-module 14a disregards the padding bytes within the cell. Further discussions of packet handling will refer to packet 112 and/or cells 112a and 112b.

It should be noted that each EPIC 20 (as well as each GPIC 30) has an ingress submodule 14 and egress submodule 16, which provide port specific ingress and egress functions. All incoming packet processing occurs in ingress submodule 14, and features such as the fast filtering processor, layer two (L2) and layer three (L3) lookups, layer two learning, both self-initiated and CPU 52 initiated, layer two table management, layer two switching, packet slicing, and channel dispatching occurs in ingress submodule 14. After lookups, fast filter processing, and slicing into cells, as noted above and as will be discussed below, the packet is placed from ingress submodule 14 into dispatch unit 18, and then placed onto CPS channel 80 and memory management is handled by PMMU 70. A number of ingress buffers are provided in dispatch unit 18 to ensure proper handling of the packets/cells. Once the cells or cellularized packets are placed onto the CPS channel 80, the ingress submodule is finished with the packet. The ingress is not involved with dynamic memory allocation, or the specific path the cells will take toward the destination. Egress submodule 16, illustrated in FIG. 8 as submodule 16a of EPIC 20a, monitors CPS channel 80 and continuously looks for cells destined for a port of that particular EPIC 20. When the PMMU 70 receives a signal that an egress associated with a destination of a packet in memory is ready to receive cells, PMMU 70 pulls the cells associated with the packet out of the memory, as will be discussed below, and places the cells on CPS channel 80, destined for the appropriate egress submodule. A FIFO in the egress submodule 16 continuously sends a signal onto the CPS channel 80 that it is ready to receive packets, when there is room in the FIFO for packets or cells to be received. As noted previously, the CPS channel 80 is configured to handle cells, but cells of a particular packet are always handled together to avoid corrupting of packets.

In order to overcome data flow degradation problems associated with overhead usage of the C channel 81, all L2 learning and L2 table management is achieved through the use of the S channel 83. L2 self-initiated learning is achieved by deciphering the source address of a user at a given ingress port 24 utilizing the packet's associated address. Once the identity of the user at the ingress port 24 is determined, the ARL/L3 tables 21a are updated to reflect the user identification. The ARL/L3 tables 21 of each other EPIC 20 and GPIC 30 are updated to reflect the newly acquired user identification in a synchronizing step, as will be discussed below. As a result, while the ingress of EPIC 20a may determine that a given user is at a given port 24a, the egress of EPIC 20b, whose table 21b has been updated with the user's identification at port 24a, can then provide information to the User at port 24a without re-learning which port the user was connected.

Table management may also be achieved through the use of the CPU 52. CPU 52, via the CMIC 40, can provide the SOC 10 with software functions which result in the designation of the identification of a user at a given port 24. As discussed above, it is undesirable for the CPU 52 to access the packet information in its entirety since this would lead to performance degradation. Rather, the SOC 10 is programmed by the CPU 52 with identification information concerning the user. The SOC 10 can maintain real-time data flow since the table data communication between the CPU 52 and the SOC 10 occurs exclusively on the S channel 83. While the SOC 10 can provide the CPU 52 with direct packet information via the C channel 81, such a system setup is undesirable for the reasons set forth above. As stated above, as an ingress function an address resolution lookup is performed by examining the ARL table 21a. If the packet is addressed to one of the layer three (L3) switches of the SOC 10, then the ingress sub-module 14a performs the L3 and default table lookup. Once the destination port has been determined, the EPIC 20a sets a ready flag in the dispatch unit 18a which then arbitrates for C channel 81.

The C channel 81 arbitration scheme, as discussed previously and as illustrated in FIGS. 4A and 4B, is Demand Priority Round-Robin. Each I/O module, EPIC 20, GPIC 30, and CMIC 40, along with the PMMU 70, can initiate a request for C channel access. If no requests exist at any one given time, a default module established with a high priority gets complete access to the C channel 81. If any one single I/O module or the PMMU 70 requests C channel 81 access, that single module gains access to the C channel 81 on-demand.

If EPIC modules 20a, 20b, 20c, and GPIC modules 30a and 30b, and CMIC 40 simultaneously request C channel access, then access is granted in round-robin fashion. For a given arbitration time period each of the I/O modules would be provided access to the C channel 81. For example, each GPIC module 30a and 30b would be granted access, followed by the EPIC modules, and finally the CMIC 40. After every arbitration time period the next I/O module with a valid request would be given access to the C channel 81. This pattern would continue as long as each of the I/O modules provide an active C channel 81 access request.

If all the I/O modules, including the PMMU 70, request C channel 81 access, the PMMU 70 is granted access as shown in FIG. 4B since the PMMU provides a critical data path for all modules on the switch. Upon gaining access to the channel 81, the dispatch unit 18a proceeds in passing the received packet 112, one cell at a time, to C channel 81.

Referring again to FIG. 3, the individual C, P, and S channels of the CPS channel 80 are shown. Once the dispatch unit 18a has been given permission to access the CPS channel 80, during the first time period Cn0, the dispatch unit 18a places the first 16 bytes of the first cell 112a of the received packet 112 on the C channel 81. Concurrently, the dispatch unit 18a places the first P channel message corresponding to the currently transmitted cell. As stated above, the first P channel message defines, among other things, the message type. Therefore, this example is such that the first P channel message would define the current cell as being a unicast type message to be directed to the destination egress port 21c.

During the second clock cycle Cn1, the second 16 bytes (16:31) of the currently transmitted data cell 112a are placed on the C channel 81. Likewise, during the second clock cycle Cn1, the Bc/Mc Port Bitmap is placed on the P channel 82.

As indicated by the hatching of the S channel 83 data during the time periods Cn0 to Cn3 in FIG. 3, the operation of the S channel 83 is decoupled from the operation of the C channel 81 and the P channel 82. For example, the CPU 52, via the CMIC 40, can pass system level messages to non-active modules while an active module passes cells on the C channel 81. As previously stated, this is an important aspect of the SOC 10 since the S channel operation allows parallel task processing, permitting the transmission of cell data on the C channel 81 in real-time. Once the first cell 112a of the incoming packet 112 is placed on the CPS channel 80 the PMMU 70 determines whether the cell is to be transmitted to an egress port 21 local to the SOC 10.

If the PMMU 70 determines that the current cell 112a on the C channel 81 is destined for an egress port of the SOC 10, the PMMU 70 takes control of the cell data flow.

Figure 10:
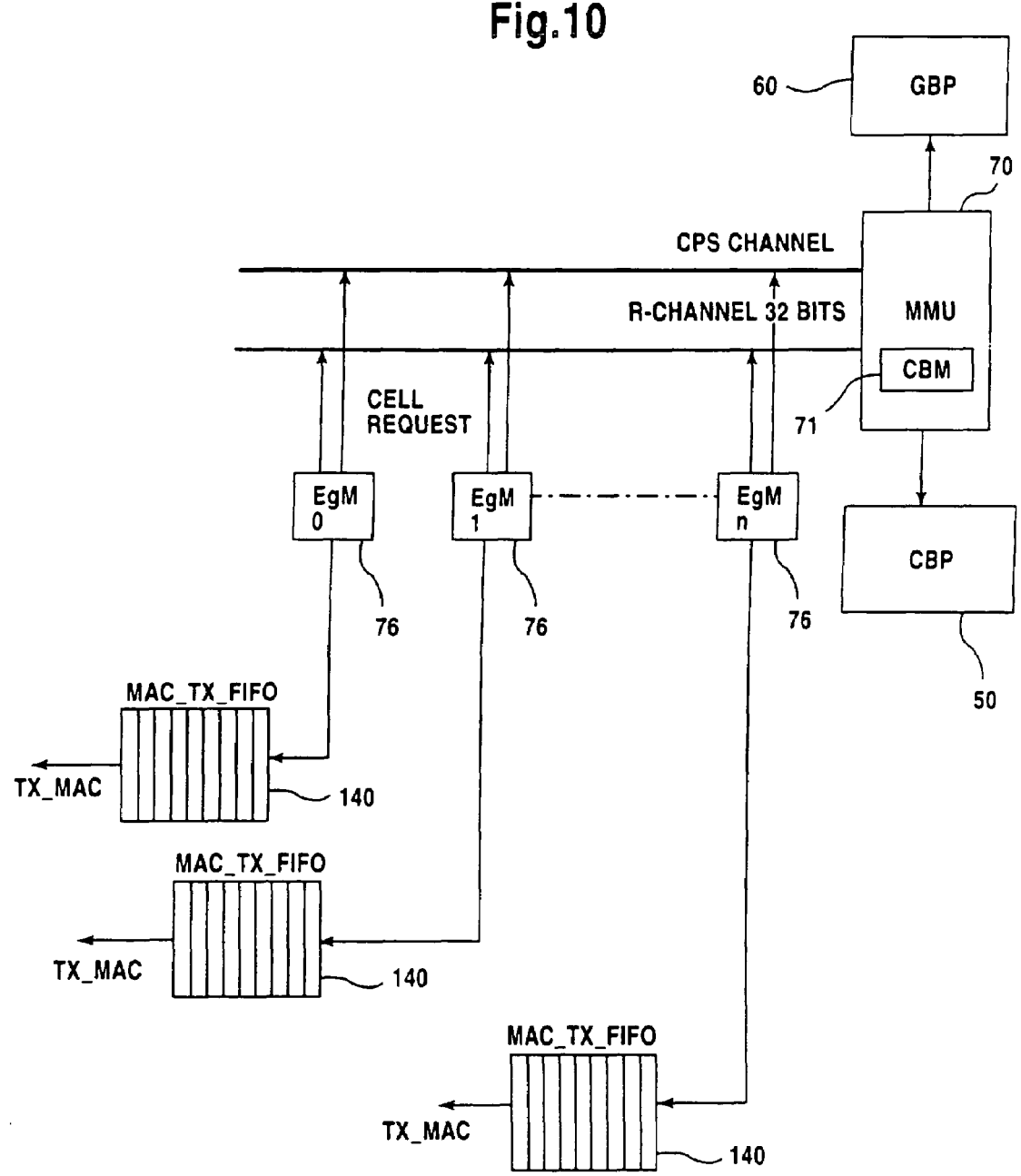
FIG. 10 is a detailed view of elements of the PMMU.

FIG. 10 illustrates, in more detail, the functional egress aspects of PMMU 70. PMMU 70 includes CBM 71, and interfaces between the GBP, CBP and a plurality of egress managers (EgM) 76 of egress submodule 18, with one egress manager 76 being provided for each egress port. CBM 71 is connected to each egress manager 76, in a parallel configuration, via R channel data bus 77. R channel data bus 77 is a 32-bit wide bus used by CBM 71 and egress managers 76 in the transmission of memory pointers and system messages. Each egress manager 76 is also connected to CPS channel 80, for the transfer of data cells 112a and 112b.

CBM 71, in summary, performs the functions of on-chip FAP (free address pool) management, transfer of cells to CBP 50, packet assembly and notification to the respective egress managers, rerouting of packets to GBP 60 via a global buffer manager, as well as handling packet flow from the GBP 60 to CBP 50. Memory clean up, memory budget management, channel interface, and cell pointer assignment are also functions of CBM 71. With respect to the free address pool, CBM 71 manages the free address pool and assigns free cell pointers to incoming cells. The free address pool is also written back by CBM 71, such that the released cell pointers from various egress managers 76 are appropriately cleared. Assuming that there is enough space available in CBP 50, and enough free address pointers available, CBM 71 maintains at least two cell pointers per egress manager 76 which is being managed. The first cell of a packet arrives at an egress manager 76, and CBM 71 writes this cell to the CBM memory allocation at the address pointed to by the first pointer. In the next cell header field, the second pointer is written. The format of the cell as stored in CBP 50 is shown in FIG. 11; each line is 18 bytes wide. Line 0 contains appropriate information with respect to first cell and last cell information, broadcast/multicast, number of egress ports for broadcast or multicast, cell length regarding the number of valid bytes in the cell, the next cell pointer, total cell count in the packet, and time stamp. The remaining lines contain cell data as 64 byte cells. The free address pool within PMMU 70 stores all free pointers for CBP 50. Each pointer in the free address pool points to a 64-byte cell in CBP 50; the actual cell stored in the CBP is a total of 72 bytes, with 64 bytes being byte data, and 8 bytes of control information. Functions such as HOL blocking high and low watermarks, out queue budget registers, CPID assignment, and other functions are handled in CBM 71, as explained herein.

When PMMU 70 determines that cell 112a is destined for an appropriate egress port on SOC 10, PMMU 70 controls the cell flow from CPS channel 80 to CBP 50. As the data packet 112 is received at PMMU 70 from CPS 80, CBM 71 determines whether or not sufficient memory is available in CBP 50 for the data packet 112. A free address pool (not shown) can provide storage for at least two cell pointers per egress manager 76, per class of service. If sufficient memory is available in CBP 50 for storage and identification of the incoming data packet, CBM 71 places the data cell information on CPS channel 80. The data cell information is provided by CBM 71 to CBP 50 at the assigned address. As new cells are received by PMMU 70, CBM 71 assigns cell pointers. The initial pointer for the first cell 112a points to the egress manager 76 which corresponds to the egress port to which the data packet 112 will be sent after it is placed in memory. In the example of FIG. 8, packets come in to port 24a of EPIC 20a, and are destined for port 24c of EPIC 20c. For each additional cell 112b, CBM 71 assigns a corresponding pointer. This corresponding cell pointer is stored as a two byte or 16 bit value NC_header, in an appropriate place on a control message, with the initial pointer to the corresponding egress manager 76, and successive cell pointers as part of each cell header, a linked list of memory pointers is formed which defines packet 112 when the packet is transmitted via the appropriate egress port, in this case 24c. Once the packet is fully written into CBP 50, a corresponding CBP Packet Identifier (CPID) is provided to the appropriate egress manager 76; this CPID points to the memory location of initial cell 112a. The CPID for the data packet is then used when the data packet 112 is sent to the destination egress port 24c. In actuality, the CBM 71 maintains two buffers containing a CBP cell pointer, with admission to the CBP being based upon a number of factors. An example of admission logic for CBP 50 will be discussed below with reference to FIG. 12.

Since CBM 71 controls data flow within SOC 10, the data flow associated with any ingress port can likewise be controlled. When packet 112 has been received and stored in CBP 50, a CPID is provided to the associated egress manager 76. The total number of data cells associated with the data packet is stored in a budget register (not shown). As more data packets 112 are received and designated to be sent to the same egress manager 76, the value of the budget register corresponding to the associated egress manager 76 is incremented by the number of data cells 112a, 112b of the new data cells received. The budget register therefore dynamically represents the total number of cells designated to be sent by any specific egress port on an EPIC 20. CBM 71 controls the inflow of additional data packets by comparing the budget register to a high watermark register value or a low watermark register value, for the same egress.

When the value of the budget register exceeds the high watermark value, the associated ingress port is disabled. Similarly, when data cells of an egress manager 76 are sent via the egress port, and the corresponding budget register decreases to a value below the low watermark value, the ingress port is once again enabled. When egress manager 76 initiates the transmission of packet 112, egress manager 76 notifies CBM 71, which then decrements the budget register value by the number of data cells which are transmitted. The specific high watermark values and low watermark values can be programmed by the user via CPU 52. This gives the user control over the data flow of any port on any EPIC 20 or GPIC 30.

Egress manager 76 is also capable of controlling data flow. Each egress manager 76 is provided with the capability to keep track of packet identification information in a packet pointer budget register; as a new pointer is received by egress manager 76, the associated packet pointer budget register is incremented. As egress manager 76 sends out a data packet 112, the packet pointer budget register is decremented. When a storage limit assigned to the register is reached, corresponding to a full packet identification pool, a notification message is sent to all ingress ports of the SOC 10, indicating that the destination egress port controlled by that egress manager 76 is unavailable. When the packet pointer budget register is decremented below the packet pool high watermark value, a notification message is sent that the destination egress port is now available. The notification messages are sent by CBM 71 on the S channel 83.

As noted previously, flow control may be provided by CBM 71, and also by ingress submodule 14 of either an EPIC 20 or GPIC 30. Ingress submodule 14 monitors cell transmission into ingress port 24. When a data packet 112 is received at an ingress port 24, the ingress submodule 14 increments a received budget register by the cell count of the incoming data packet. When a data packet 112 is sent, the corresponding ingress 14 decrements the received budget register by the cell count of the outgoing data packet 112. The budget register 72 is decremented by ingress 14 in response to a decrement cell count message initiated by CBM 71, when a data packet 112 is successfully transmitted from CBP 50.

Efficient handling of the CBP and GBP is necessary in order to maximize throughput, to prevent port starvation, and to prevent port underrun. For every ingress, there is a low watermark and a high watermark; if cell count is below the low watermark, the packet is admitted to the CBP, thereby preventing port starvation by giving the port an appropriate share of CBP space.

Figure 12:
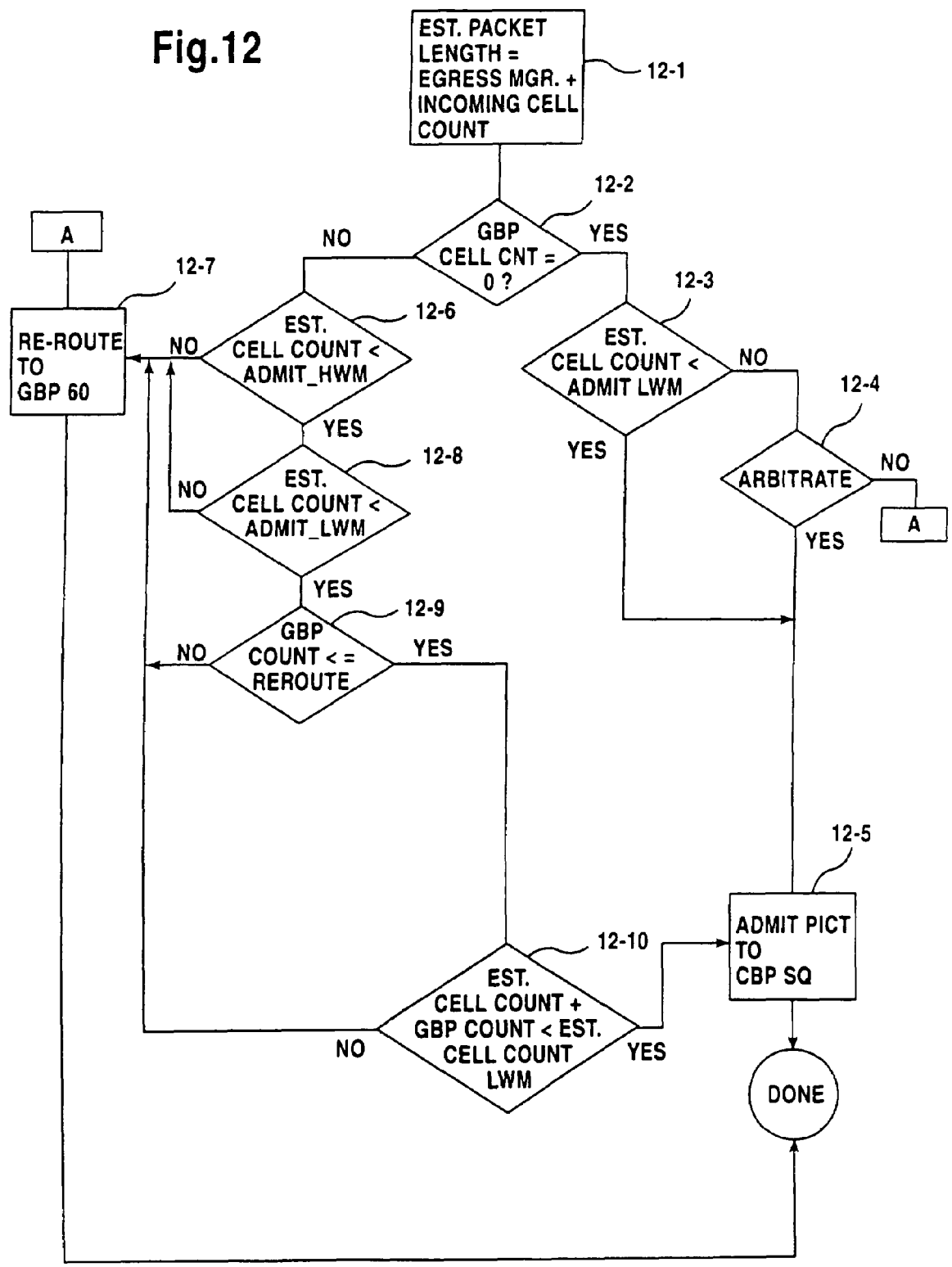
FIG. 12 illustrates an internal/external memory admission flow chart.

FIG. 12 generally illustrates the handling of a data packet 112 when it is received at an appropriate ingress port. This figure illustrates dynamic memory allocation on a single port, and is applicable for each ingress port. In step 12-1, packet length is estimated by estimating cell count based upon egress manager count plus incoming cell count. After this cell count is estimated, the GBP current cell count is checked at step 12-2 to determine whether or not the GBP 60 is empty. If the GBP cell count is 0, indicating that GBP 60 is empty, the method proceeds to step 12-3, where it is determined whether or not the estimated cell count from step 12-1 is less than the admission low watermark. The admission low watermark value enables the reception of new packets 112 into CBP 50 if the total number of cells in the associated egress is below the admission low watermark value. If yes, therefore, the packet is admitted at step 12-5. If the estimated cell count is not below the admission low watermark, CBM 71 then arbitrates for CBP memory allocation with other ingress ports of other EPICs and GPICs, in step 12-4. If the arbitration is unsuccessful, the incoming packet is sent to a reroute process, referred to as A. If the arbitration is successful, then the packet is admitted to the CBP at step 12-5. Admission to the CBP is necessary for linespeed communication to occur.

The above discussion is directed to a situation wherein the GBP cell count is determined to be 0. If in step 12-2 the GBP cell count is determined not to be 0, then the method proceeds to step 12-6, where the estimated cell count determined in step 12-1 is compared to the admission high watermark. If the answer is no, the packet is rerouted to GBP 60 at step 12-7. If the answer is yes, the estimated cell count is then compared to the admission low watermark at step 12-8. If the answer is no, which means that the estimated cell count is between the high watermark and the low watermark, then the packet is rerouted to GBP 60 at step 12-7. If the estimated cell count is below the admission low watermark, the GBP current count is compared with a reroute cell limit value at step 12-9. This reroute cell limit value is user programmable through CPU 52. If the GBP count is below or equal to the reroute cell limit value at step 12-9, the estimated cell count and GBP count are compared with an estimated cell count low watermark; if the combination of estimated cell count and GBP count are less than the estimated cell count low watermark, the packet is admitted to the CBP. If the sum is greater than the estimated cell count low watermark, then the packet is rerouted to GBP 60 at step 12-7. After rerouting to GBP 60, the GBP cell count is updated, and the packet processing is finished. It should be noted that if both the CBP and the GBP are full, the packet is dropped. Dropped packets are handled in accordance with known ethernet or network communication procedures, and have the effect of delaying communication. However, this configuration applies appropriate back pressure by setting watermarks, through CPU 52, to appropriate buffer values on a per port basis to maximize memory utilization. This CBP/GBP admission logic results in a distributed hierarchical shared memory configuration, with a hierarchy between CBP 50 and GBP 60, and hierarchies within the CBP.

Address Resolution (L2)+(L3)

Figure 14:
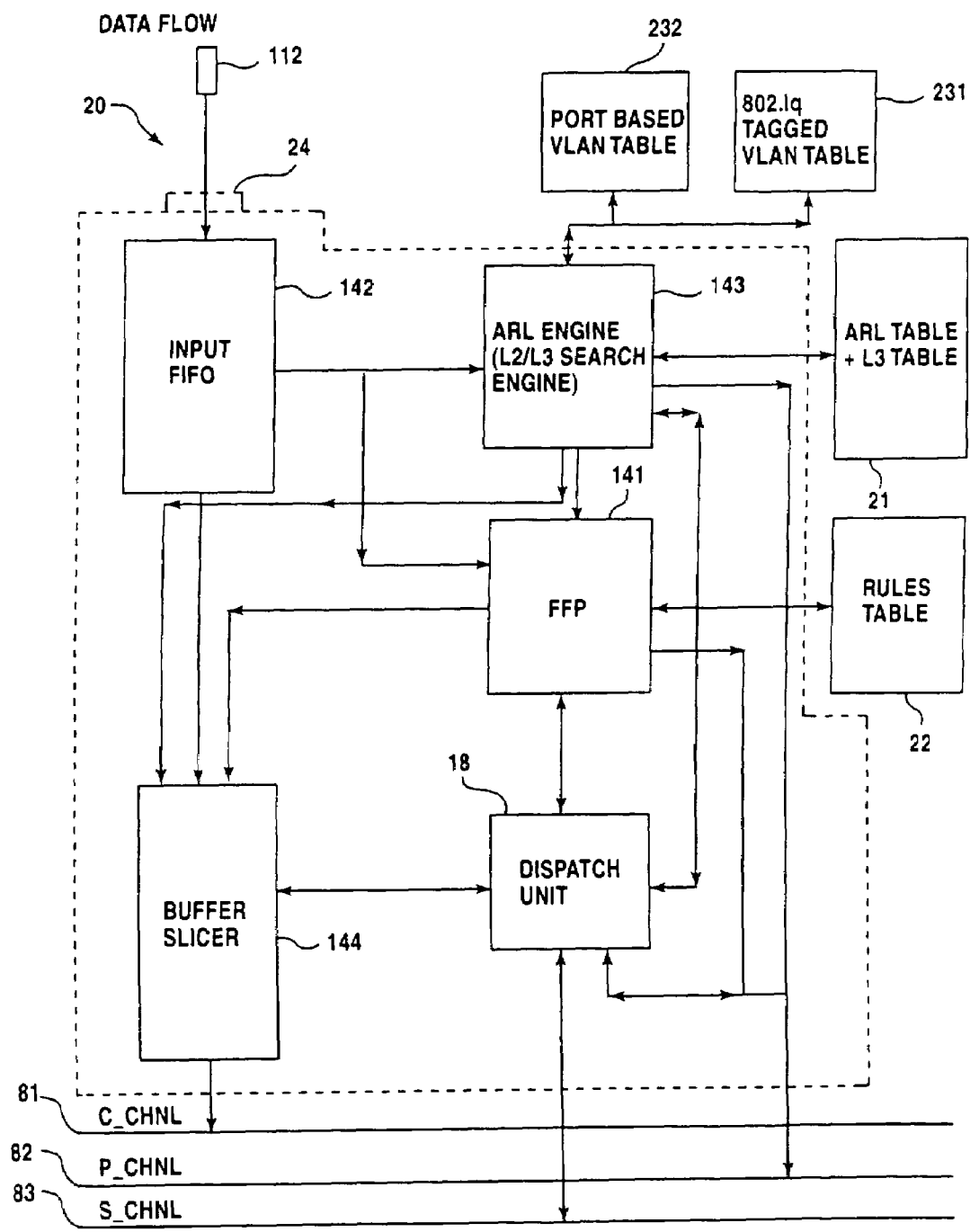
FIG. 14 illustrates more details of an EPIC module.

FIG. 14 illustrates some of the concurrent filtering and look-up details of a packet coming into the ingress side of an EPIC 20. FIG. 12, as discussed previously, illustrates the handling of a data packet with respect to admission into the distributed hierarchical shared memory. FIG. 14 addresses the application of filtering, address resolution, and rules application segments of SOC 10. These functions are performed simultaneously with respect to the CBP admission discussed above. As shown in the figure, packet 112 is received at input port 24 of EPIC 20. It is then directed to input FIFO 142. As soon as the first sixteen bytes of the packet arrive in the input FIFO 142, an address resolution request is sent to ARL engine 143; this initiates lookup in ARL/L3 tables 21.

A description of the fields of an ARL table of ARL/L3 tables 21 is as follows:

Mac Address—48 bits long—Mac Address;

VLAN tag—12 bits long—VLAN Tag Identifier as described in IEEE 802.1q standard for tagged packets. For an untagged Packet, this value is picked up from Port Based VLAN Table.

CosDst—3 bits long—Class of Service based on the Destination Address. COS identifies the priority of this packet. 8 levels of priorities as described in IEEE 802.1p standard.

Port Number—6 bits long—Port Number is the port on which this Mac address is learned.

SD_Disc Bits—2 bits long—These bits identifies whether the packet should be discarded based on Source Address or Destination Address. Value 1 means discard on source. Value 2 means discard on destination.

C bit—1 bit long—C Bit identifies that the packet should be given to CPU Port.

St Bit—1 bit long—St Bit identifies that this is a static entry (it is not learned Dynamically) and that means is should not be aged out. Only CPU 52 can delete this entry.

Ht Bit—1 bit long—Hit Bit—This bit is set if there is match with the Source Address. It is used in the aging Mechanism.

CosSrc—3 bits long—Class of Service based on the Source Address. COS identifies the priority of this packet.

L3 Bit—1 bit long—L3 Bit—identifies that this entry is created as result of L3 Interface Configuration. The Mac address in this entry is L3 interface Mac Address and that any Packet addresses to this Mac Address need to be routed.

T Bit—1 bit long—T Bit identifies that this Mac address is learned from one of the Trunk Ports. If there is a match on Destination address then output port is not decided on the Port Number in this entry, but is decided by the Trunk Identification Process based on the rules identified by the RTAG bits and the Trunk group Identified by the TGID.

TGID—3 bits long—TGID identifies the Trunk Group if the T Bit is set. SOC 10 supports 6 Trunk Groups per switch.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

SCP—1 bit long—Source CoS Priority Bit—If this bit is set (in the matched Source Mac Entry) then Source CoS has priority over Destination Cos.

It should also be noted that VLAN tables 23 include a number of table formats; all of the tables and table formats will not be discussed here. However, as an example, the port based VLAN table fields are described as follows:

Port VLAN Id—12 bits long—Port VLAN Identifier is the VLAN Id used by Port Based VLAN.

Sp State—2 bits long—This field identifies the current Spanning Tree State. Value 0x00—Port is in Disable State. No packets are accepted in this state, not even BPDUs. Value 0x01—Port is in Blocking or Listening State. In this state no packets are accepted by the port, except BPDUs. Value 0x02—Port is in Learning State. In this state the packets are not forwarded to another Port but are accepted for learning. Value 0x03—Port is in Forwarding State. In this state the packets are accepted both for learning and forwarding.

Port Discard Bits—6 bits long—There are 6 bits in this field and each bit identifies the criterion to discard the packets coming in this port. Note: Bits 0 to 3 are not used. Bit 4—If this bit is set then all the frames coming on this port will be discarded. Bit 5—If this bit is set then any 802.1q Priority Tagged (vid=0) and Untagged frame coming on this port will be discarded.

J Bit—1 bit long—J Bit means Jumbo bit. If this bit is set then this port should accept Jumbo Frames.

RTAG—3 bits long—RTAG identifies the Trunk selection criterion if the destination address matches this entry and the T bit is set in that entry. Value 1—based on Source Mac Address. Value 2—based on Destination Mac Address. Value 3—based on Source & destination Address. Value 4—based on Source IP Address. Value 5—based on Destination IP Address. Value 6—based on Source and Destination IP Address.

T Bit—1 bit long—This bit identifies that the Port is a member of the Trunk Group.

C Learn Bit—1 bit long—Cpu Learn Bit—If this bit is set then the packet is send to the CPU whenever the source Address is learned.

PT—2 bits long—Port Type identifies the port Type. Value 0-10 Mbit Port. Value 1-100 Mbit Port. Value 2-1 Gbit Port. Value 3-CPU Port.

VLAN Port Bitmap—28 bits long—VLAN Port Bitmap Identifies all the egress ports on which the packet should go out.

B Bit—1 bit long—B bit is BPDU bit. If this bit is set then the Port rejects BPDUs. This Bit is set for Trunk Ports which are not supposed to accept BPDUs.

TGID—3 bits long—TGID—this field identifies the Trunk Group which this port belongs to.

Untagged Bitmap—28 bits long—This bitmap identifies the Untagged Members of the VLAN. i.e. if the frame destined out of these members ports should be transmitted without Tag Header.

M Bits—1 bit long—M Bit is used for Mirroring Functionality. If this bit is set then mirroring on Ingress is enabled.

The ARL engine 143 reads the packet; if the packet has a VLAN tag according to IEEE Standard 802.1q, then ARL engine 143 performs a look-up based upon tagged VLAN table 231, which is part of VLAN table 23. If the packet does not contain this tag, then the ARL engine performs VLAN lookup based upon the port based VLAN table 232. Once the VLAN is identified for the incoming packet, ARL engine 143 performs an ARL table search based upon the source MAC address and the destination MAC address. If the results of the destination search is an L3 interface MAC address, then an L3 search is performed of an L3 table within ARL/L3 table 21. If the L3 search is successful, then the packet is modified according to packet routing rules.

To better understand lookups, learning, and switching, it may be advisable to once again discuss the handling of packet 112 with respect to FIG. 8. If data packet 112 is sent from a source station A into port 24a of EPIC 20a, and destined for a destination station B on port 24c of EPIC 20c, ingress submodule 14a slices data packet 112 into cells 112a and 112b. The ingress submodule then reads the packet to determine the source MAC address and the destination MAC address. As discussed previously, ingress submodule 14a, in particular ARL engine 143, performs the lookup of appropriate tables within ARL/L3 tables 21a, and VLAN table 23a, to see if the destination MAC address exists in ARL/L3 tables 21a; if the address is not found, but if the VLAN IDs are the same for the source and destination, then ingress submodule 14a will set the packet to be sent to all ports. The packet will then propagate to the appropriate destination address. A "source search" and a "destination search" occurs in parallel. Concurrently, the source MAC address of the incoming packet is "learned", and therefore added to an ARL table within ARL/L3 table 21a. After the packet is received by the destination, an acknowledgement is sent by destination station B to source station A. Since the source MAC address of the incoming packet is learned by the appropriate table of B, the acknowledgement is appropriately sent to the port on which A is located. When the acknowledgement is received at port 24a, therefore, the ARL table learns the source MAC address of B from the acknowledgement packet. It should be noted that as long as the VLAN IDs (for tagged packets) of source MAC addresses and destination MAC addresses are the same, layer two switching as discussed above is performed. L2 switching and lookup is therefore based on the first 16 bytes of an incoming packet. For untagged packets, the port number field in the packet is indexed to the port-based VLAN table within VLAN table 23a, and the VLAN ID can then be determined. If the VLAN IDs are different, however, L3 switching is necessary wherein the packets are sent to a different VLAN. L3 switching, however, is based on the IP header field of the packet. The IP header includes source IP address, destination IP address, and TTL (time-to-live).

In order to more clearly understand layer three switching according to the invention, data packet 112 is sent from source station A onto port 24a of EPIC 20a, and is directed to destination station B; assume, however, that station B is disposed on a different VLAN, as evidenced by the source MAC address and the destination MAC address having differing VLAN IDs. The lookup for B would be unsuccessful since B is located on a different VLAN, and merely sending the packet to all ports on the VLAN would result in B never receiving the packet. Layer three switching, therefore, enables the bridging of VLAN boundaries, but requires reading of more packet information than just the MAC addresses of L2 switching. In addition to reading the source and destination MAC addresses, therefore, ingress 14*a* also reads the IP address of the source and destination. As noted previously, packet types are defined by IEEE and other standards, and are known in the art. By reading the IP address of the destination, SOC 10 is able to target the packet to an appropriate router interface which is consistent with the destination IP address. Packet 112 is therefore sent on to CPS channel 80 through dispatch unit 18*a*, destined for an appropriate router interface (not shown, and not part of SOC 10), upon which destination B is located. Control frames, identified as such by their destination address, are sent to CPU 52 via CMIC 40. The destination MAC address, therefore, is the router MAC address for B. The router MAC address is learned through the assistance of CPU 52, which uses an ARP (address resolution protocol) request to request the destination MAC address for the router for B, based upon the IP address of B. Through the use of the IP address, therefore, SOC 10 can learn the MAC address. Through the acknowledgement and learning process, however, it is only the first packet that is subject to this "slow" handling because of the involvement of CPU 52. After the appropriate MAC addresses are learned, linespeed switching can occur through the use of concurrent table lookups since the necessary information will be learned by the tables. Implementing the tables in silicon as two-dimensional arrays enables such rapid concurrent lookups. Once the MAC address for B has been learned, therefore, when packets come in with the IP address for B, ingress 14*a* changes the IP address to the destination MAC address, in order to enable linespeed switching. Also, the source address of the incoming packet is changed to the router MAC address for A rather than the IP address for A, so that the acknowledgement from B to A can be handled in a fast manner without needing to utilize a CPU on the destination end in order to identify the source MAC address to be the destination for the acknowledgement. Additionally, a TTL (time-to-live) field in the packet is appropriately manipulated in accordance with the IETF (Internet Engineering Task Force) standard. A unique aspect of SOC 10 is that all of the switching, packet processing, and table lookups are performed in hardware, rather than requiring CPU 52 or another CPU to spend time processing instructions. It should be noted that the layer three tables for EPIC 20 can have varying sizes; in a preferred embodiment, these tables are capable of holding up to 2000 addresses, and are subject to purging and deletion of aged addresses, as explained herein.

Referring again to the discussion of FIG. 14, as soon as the first 64 (sixty four) bytes of the packet arrive in input FIFO 142, a filtering request is sent to FFP 141. FFP 141 is an extensive filtering mechanism which enables SOC 10 to set inclusive and exclusive filters on any field of a packet from layer 2 to layer 7 of the OSI seven layer model. Filters are used for packet classification based upon a protocol fields in the packets. Various actions are taken based upon the packet classification, including packet discard, sending of the packet to the CPU, sending of the packet to other ports, sending the packet on certain COS priority queues, changing the type of service (TOS) precedence. The exclusive filter is primarily used for implementing security features, and allows a packet to proceed only if there is a filter match. If there is no match, the packet is discarded.

It should be noted that SOC 10 has a unique capability to handle both tagged and untagged packets coming in. Tagged packets are tagged in accordance with IEEE standards, and include a specific IEEE 802.1 p priority field for the packet. Untagged packets, however, do not include an 802.1 p priority field therein. SOC 10 can assign an appropriate COS value for the packet, which can be considered to be equivalent to a weighted priority, based either upon the destination address or the source address of the packet, as matched in one of the table lookups. As noted in the ARL table format discussed herein, an SCP (Source COS Priority) bit is contained as one of the fields of the table. When this SCP bit is set, then SOC 10 will assign weighted priority based upon a source COS value in the ARL table. If the SCP is not set, then SOC 10 will assign a COS for the packet based upon the destination COS field in the ARL table. These COS values are three bit fields in the ARL table, as noted previously in the ARL table field descriptions.

FFP 141 is essentially a state machine driven programmable rules engine. The filters used by the FFP are 64 (sixty-four) bytes wide, and are applied on an incoming packet; any offset can be used, however, a preferred embodiment uses an offset of zero, and therefore operates on the first 64 bytes, or 512 bits, of a packet. The actions taken by the filter are tag insertion, priority mapping, TOS tag insertion, sending of the packet to the CPU, dropping of the packet, forwarding of the packet to an egress port, and sending the packet to a mirrored port. The filters utilized by FFP 141 are defined by rules table 22. Rules table 22 is completely programmable by CPU 52, through CMIC 40. The rules table can be, for example, 256 entries deep, and may be partitioned for inclusive and exclusive filters, with, again as an example, 128 entries for inclusive filters and 128 entries for exclusive filters. A filter database, within FFP 141, includes a number of inclusive mask registers and exclusive mask registers, such that the filters are formed based upon the rules in rules table 22, and the filters therefore essentially form a 64 byte wide mask or bit map which is applied on the incoming packet. If the filter is designated as an exclusive filter, the filter will exclude all packets unless there is a match. In other words, the exclusive filter allows a packet to go through the forwarding process only if there is a filter match. If there is no filter match, the packet is dropped. In an inclusive filter, if there is no match, no action is taken but the packet is not dropped. Action on an exclusive filter requires an exact match of all filter fields. If there is an exact match with an exclusive filter, therefore, action is taken as specified in the action field; the actions which may be taken, are discussed above. If there is no full match or exact of all of the filter fields, but there is a partial match, then the packet is dropped. A partial match is defined as either a match on the ingress field, egress field, or filter select fields. If there is neither a full match nor a partial match with the packet and the exclusive filter, then no action is taken and the packet proceeds through the forwarding process. The FFP configuration, taking action based upon the first 64 bytes of a packet, enhances the handling of real time traffic since packets can be filtered and action can be taken on the fly. Without an FFP according to the invention, the packet would need to be transferred to the CPU for appropriate action to be interpreted and taken. For inclusive filters, if there is a filter match, action is taken, and if there is no filter match, no action is taken; however, packets are not dropped based on a match or no match situation for inclusive filters.

In summary, the FFP includes a filter database with eight sets of inclusive filters and eight sets of exclusive filters, as separate filter masks. As a packet comes into the FFP, the filter masks are applied to the packet; in other words, a logical AND operation is performed with the mask and the packet. If there is a match, the matching entries are applied to rules tables 22, in order to determine which specific actions will be taken. As mentioned previously, the actions include 802.1p tag insertion, 802.1p priority mapping, IP TOS (type-of-service) tag insertion, sending of the packet to the CPU, discarding or dropping of the packet, forwarding the packet to an egress port, and sending the packet to the mirrored port. Since there are a limited number of fields in the rules table, and since particular rules must be applied for various types of packets, the rules table requirements are minimized in the present invention by the present invention setting all incoming packets to be "tagged" packets; all untagged packets, therefore, are subject to 802.1p tag insertion, in order to reduce the number of entries which are necessary in the rules table. This action eliminates the need for entries regarding handling of untagged packets. It should be noted that specific packet types are defined by various IEEE and other networking standards, and will not be defined herein.

Figure 15:
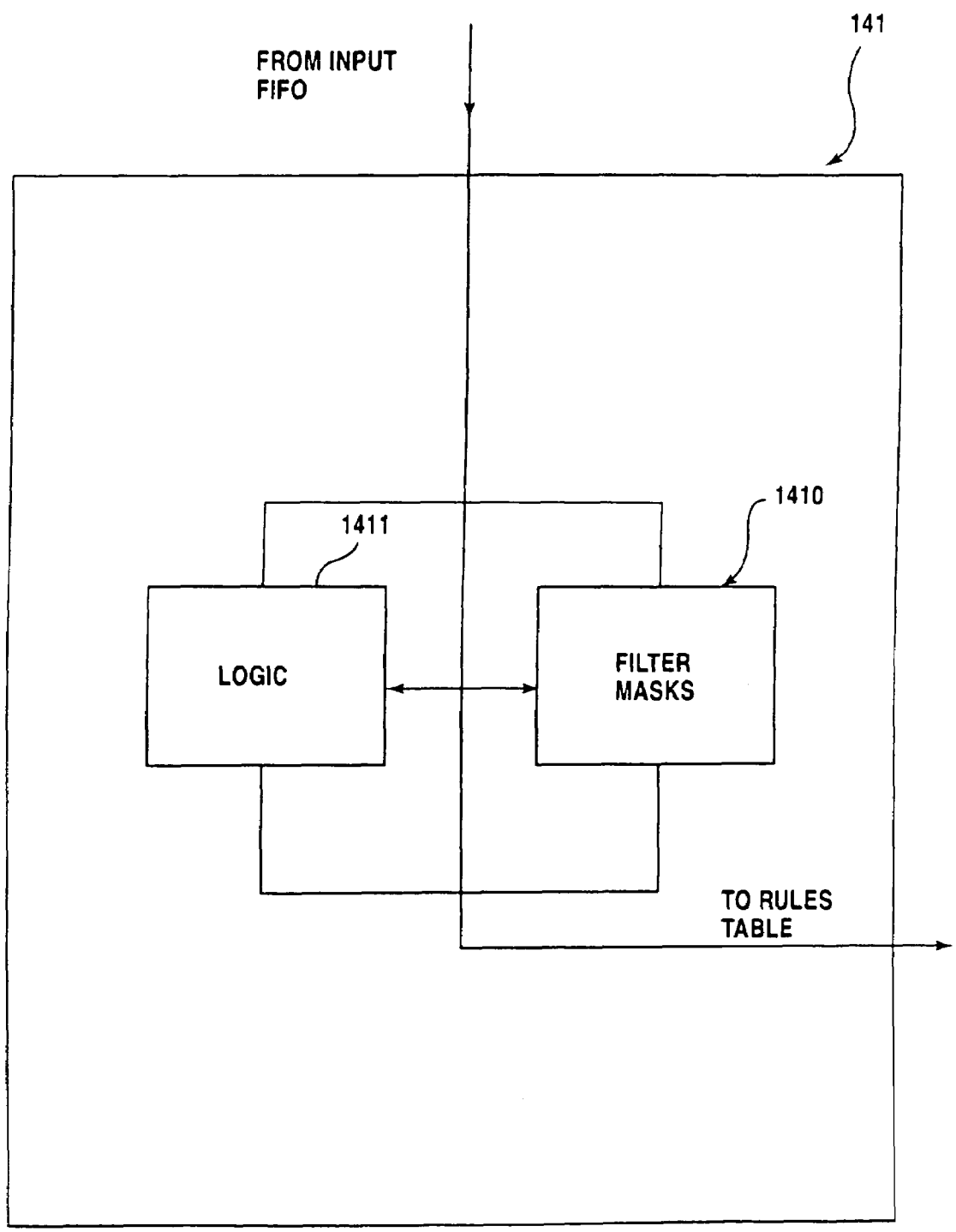
FIG. 15 is a block diagram of a fast filtering processor (FFP)

As noted previously, exclusive filters are defined in the rules table as filters which exclude packets for which there is no match; excluded packets are dropped. With inclusive filters, however, packets are not dropped in any circumstances. If there is a match, action is taken as discussed above; if there is no match, no action is taken and the packet proceeds through the forwarding process. Referring to FIG. 15, FFP 141 is shown to include filter database 1410 containing filter masks therein, communicating with logic circuitry 1411 for determining packet types and applying appropriate filter masks. After the filter mask is applied as noted above, the result of the application is applied to rules table 22, for appropriate lookup and action. It should be noted that the filter masks, rules tables, and logic, while programmable by CPU 52, do not rely upon CPU 52 for the processing and calculation thereof. After programming, a hardware configuration is provided which enables linespeed filter application and lookup.

Referring once again to FIG. 14, after FFP 141 applies appropriate configured filters and results are obtained from the appropriate rules table 22, logic 1411 in FFP 141 determines and takes the appropriate action. The filtering logic can discard the packet, send the packet to the CPU 52, modify the packet header or IP header, and recalculate any IP checksum fields or takes other appropriate action with respect to the headers. The modification occurs at buffer slicer 144, and the packet is placed on C channel 81. The control message and message header information is applied by the FFP 141 and ARL engine 143, and the message header is placed on P channel 82. Dispatch unit 18, also generally discussed with respect to FIG. 8, coordinates all dispatches to C channel, P channel and S channel. As noted previously, each EPIC module 20, GPIC module 30, PMMU 70, etc. are individually configured to communicate via the CPS channel. Each module can be independently modified, and as long as the CPS channel interfaces are maintained, internal modifications to any modules such as EPIC 20a should not affect any other modules such as EPIC 20b, or any GPICs 30.

Figure 17:
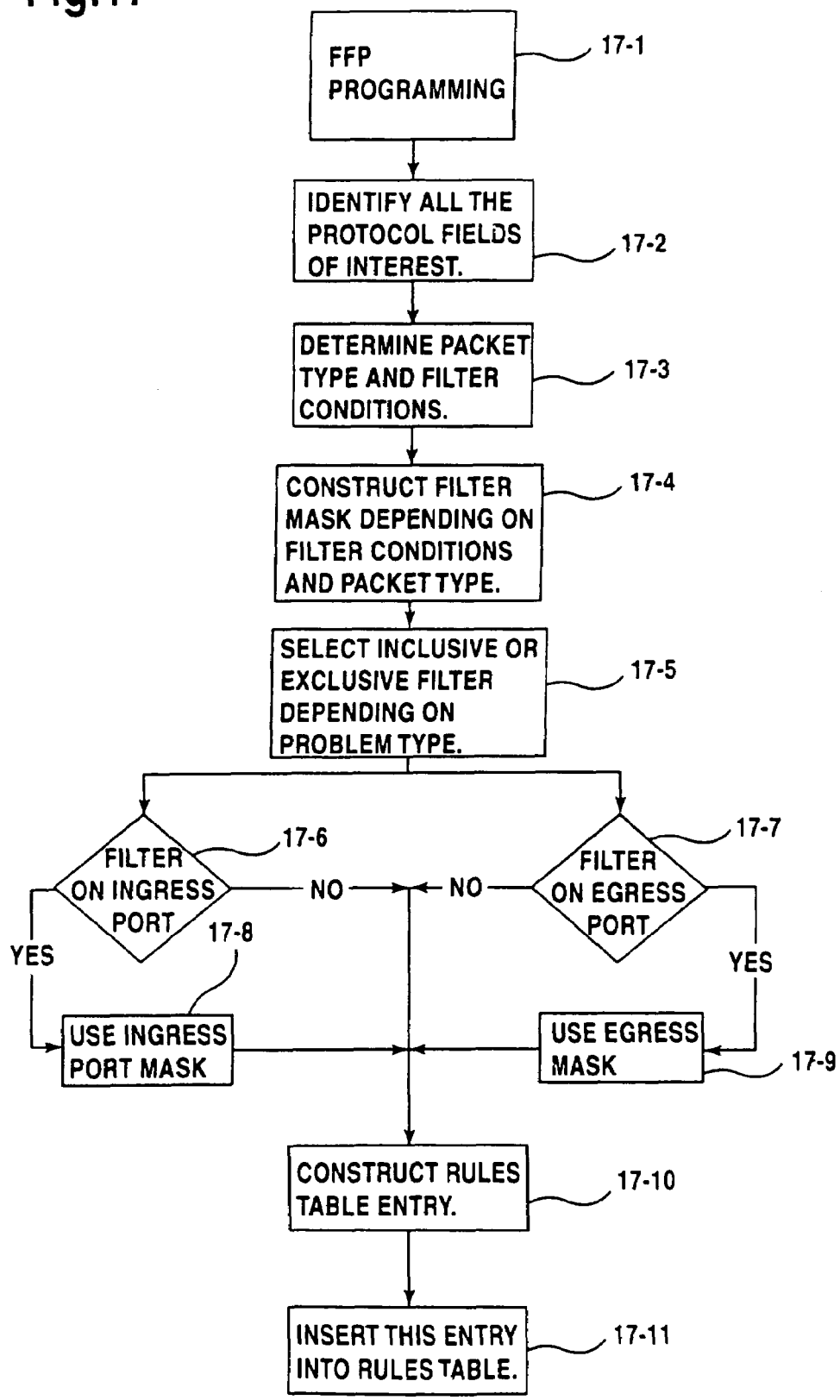
FIG. 17 illustrates a series of steps which are used to program an FFP.

As mentioned previously, FFP 141 is programmed by the user, through CPU 52, based upon the specific functions which are sought to be handled by each FFP 141. Referring to FIG. 17, it can be seen that in step 17-1, an FFP programming step is initiated by the user. Once programming has been initiated, the user identifies the protocol fields of the packet which are to be of interest for the filter, in step 17-2. In step 17-3, the packet type and filter conditions are determined, and in step 17-4, a filter mask is constructed based upon the identified packet type, and the desired filter conditions. The filter mask is essentially a bit map which is applied or ANDed with selected fields of the packet. After the filter mask is constructed, it is then determined whether the filter will be an inclusive or exclusive filter, depending upon the problems which are sought to be solved, the packets which are sought to be forwarded, actions sought to be taken, etc. In step 17-6, it is determined whether or not the filter is on the ingress port, and in step 17-7, it is determined whether or not the filter is on the egress port. If the filter is on the ingress port, an ingress port mask is used in step 17-8. If it is determined that the filter will be on the egress port, then an egress mask is used in step 17-9. Based upon these steps, a rules table entry for rules tables 22 is then constructed, and the entry or entries are placed into the appropriate rules table (steps 17-10 and 17-11). These steps are taken through the user inputting particular sets of rules and information into CPU 52 by an appropriate input device, and CPU 52 taking the appropriate action with respect to creating the filters, through CMIC 40 and the appropriate ingress or egress submodules on an appropriate EPIC module 20 or GPIC module 30.

It should also be noted that the block diagram of SOC 10 in FIG. 2 illustrates each GPIC 30 having its own ARL/L3 tables 31, rules table 32, and VLAN tables 33, and also each EPIC 20 also having its own ARL/L3 tables 21, rules table 22, and VLAN tables 23. In a preferred embodiment of the invention, however, two separate modules can share a common ARL/L3 table and a common VLAN table. Each module, however, has its own rules table 22. For example, therefore, GPIC 30a may share ARL/L3 table 21a and VLAN table 23a with EPIC 20a. Similarly, GPIC 30b may share ARL table 21b and VLAN table 23b with EPIC 20b. This sharing of tables reduces the number of gates which are required to implement the invention, and makes for simplified lookup and synchronization as will be discussed below.

Table Synchronization and Aging

SOC 10 utilizes a unique method of table synchronization and aging, to ensure that only current and active address information is maintained in the tables. When ARL/L3 tables are updated to include a new source address, a "hit bit" is set within the table of the "owner" or obtaining module to indicate that the address has been accessed. Also, when a new address is learned and placed in the ARL table, an S channel message is placed on S channel 83 as an ARL insert message, instructing all ARL/L3 tables on SOC 10 to learn this new address. The entry in the ARL/L3 tables includes an identification of the port which initially received the packet and learned the address. Therefore, if EPIC 20a contains the port which initially received the packet and therefore which initially learned the address, EPIC 20a becomes the "owner" of the address. Only EPIC 20a, therefore, can delete this address from the table. The ARL insert message is received by all of the modules, and the address is added into all of the ARL/L3 tables on SOC 10. CMIC 40 will also send the address information to CPU 52. When each module receives and learns the address information, an acknowledge or ACK message is sent back to EPIC 20a; as the owner further ARL insert messages cannot be sent from EPIC 20a until all ACK messages have been received from all of the modules. In a preferred embodiment of the invention, CMIC 40 does not send an ACK message, since CMIC 40 does not include ingress/egress modules thereupon, but only communicates with CPU 52. If multiple SOC 10 are provided in a stacked configuration, all ARL/L3 tables would be synchronized due to the fact that CPS channel 80 would be shared throughout the stacked modules.

Figure 18:
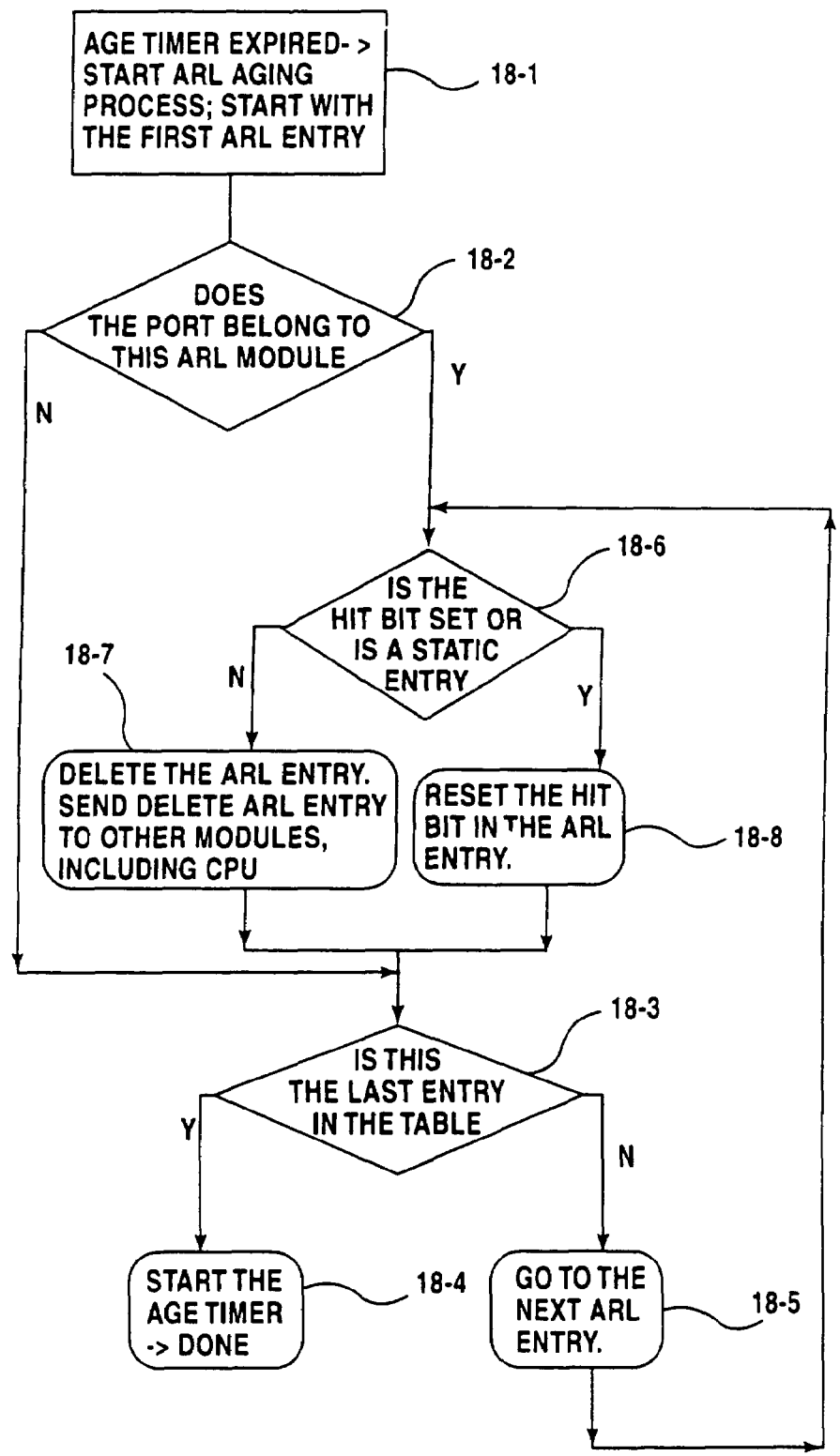
FIG. 18 is a flow chart illustrating the aging process for ARL (L2) and L3 tables.

Referring to FIG. 18, the ARL aging process is discussed. An age timer is provided within each EPIC module 20 and GPIC module 30, at step 18-1, it is determined whether the age timer has expired. If the timer has expired, the aging process begins by examining the first entry in ARL table 21. At step 18-2, it is determined whether or not the port referred to in the ARL entry belongs to the particular module. If the answer is no, the process proceeds to step 18-3, where it is determined whether or not this entry is the last entry in the table. If the answer is yes at step 18-3, the age timer is restarted and the process is completed at step 184. If this is not the last entry in the table, then the process is returned to the next ARL entry at step 18-5. If, however, at step 18-2 it is determined that the port does belong to this particular module, then, at step 18-6 it is determined whether or not the hit bit is set, or if this is a static entry. If the hit bit is set, the hit bit is reset at step 18-7, and the method then proceeds to step 18-3. If the hit bit is not set, the ARL entry is deleted at step 18-8, and a delete ARL entry message is sent on the CPS channel to the other modules, including CMIC 40, so that the table can be appropriately synchronized as noted above. This aging process can be performed on the ARL (layer two) entries, as well as layer three entries, in order to ensure that aged packets are appropriately deleted from the tables by the owners of the entries. As noted previously, the aging process is only performed on entries where the port referred to belongs to the particular module which is performing the aging process. To this end, therefore, the hit bit is only set in the owner module. The hit bit is not set for entries in tables of other modules which receive the ARL insert message. The hit bit is therefore always set to zero in the synchronized non-owner tables.

The purpose of the source and destination searches, and the overall lookups, is to identify the port number within SOC 10 to which the packet should be directed to after it is placed either CBP 50 or GBP 60. Of course, a source lookup failure results in learning of the source from the source MAC address information in the packet; a destination lookup failure, however, since no port would be identified, results in the packet being sent to all ports on SOC 10. As long as the destination VLAN ID is the same as the source VLAN ID, the packet will propagate the VLAN and reach the ultimate destination, at which point an acknowledgement packet will be received, thereby enabling the ARL table to learn the destination port for use on subsequent packets. If the VLAN IDs are different, an L3 lookup and learning process will be performed, as discussed previously. It should be noted that each EPIC and each GPIC contains a FIFO queue to store ARL insert messages, since, although each module can only send one message at a time, if each module sends an insert message, a queue must be provided for appropriate handling of the messages.

Port Movement

After the ARL/L3 tables have entries in them, the situation sometimes arises where a particular user or station may change location from one port to another port. In order to prevent transmission errors, therefore, SOC 10 includes capabilities of identifying such movement, and updating the table entries appropriately. For example, if station A, located for example on port 1, seeks to communicate with station B, whose entries indicate that user B is located on port 26. If station B is then moved to a different port, for example, port 15, a destination lookup failure will occur and the packet will be sent to all ports. When the packet is received by station B at port 15, station B will send an acknowledge (ACK) message, which will be received by the ingress of the EPIC/GPIC module containing port 1 thereupon. A source lookup (of the acknowledge message) will yield a match on the source address, but the port information will not match. The EPIC/GPIC which receives the packet from B, therefore, must delete the old entry from the ARL/L3 table, and also send an ARL/L3 delete message onto the S channel so that all tables are synchronized. Then, the new source information, with the correct port, is inserted into the ARL/L3 table, and an ARL/L3 insert message is placed on the S channel, thereby synchronizing the ARL/L3 tables with the new information. The updated ARL insert message cannot be sent until all of the acknowledgement messages are sent regarding the ARL delete message, to ensure proper table synchronization. As stated previously, typical ARL insertion and deletion commands can only be initiated by the owner module. In the case of port movement, however, since port movement may be identified by any module sending a packet to a moved port, the port movement-related deletion and insertion messages can be initiated by any module.

Trunking

Figure 19:
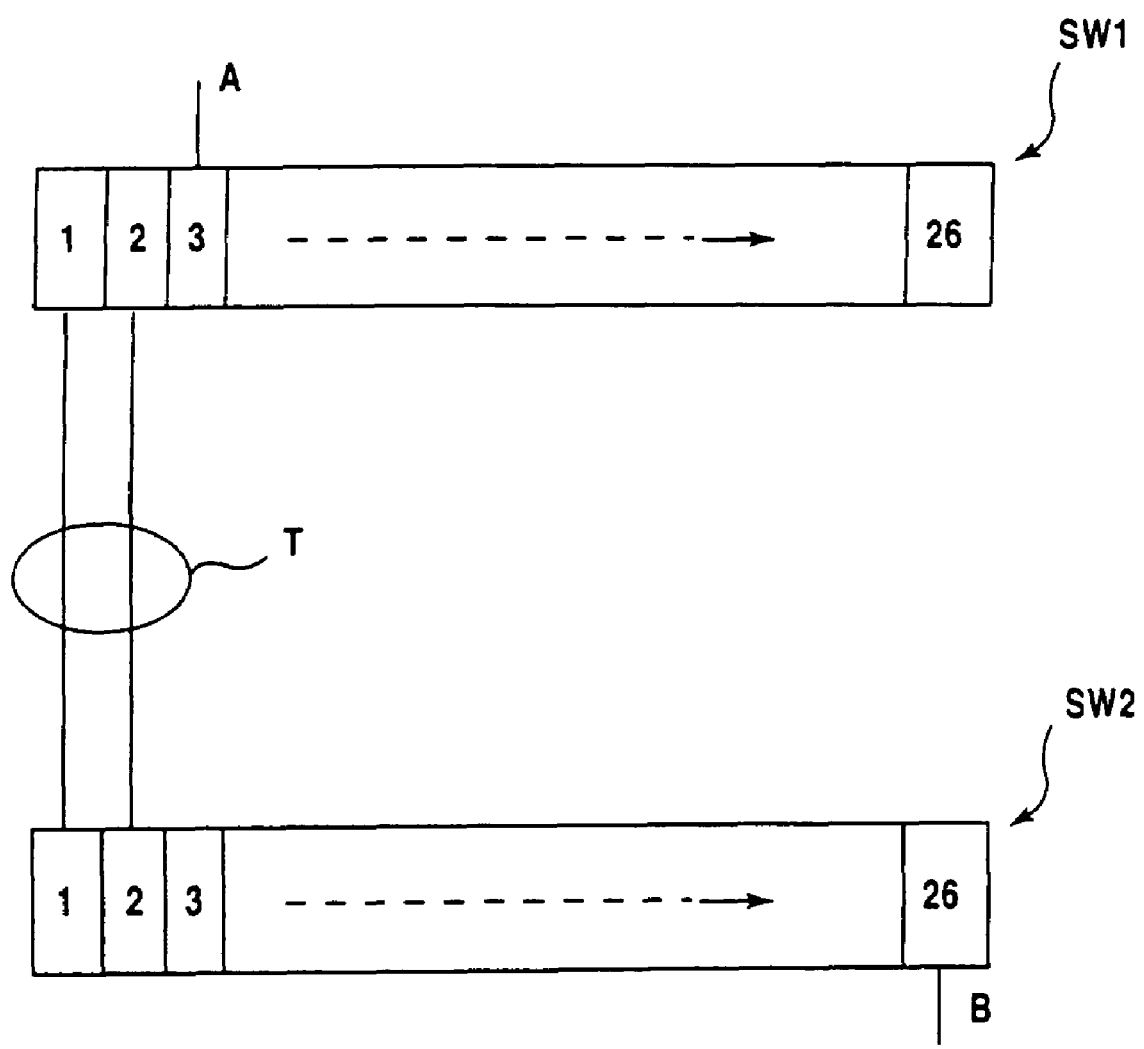
FIG. 19 illustrates communication using a trunk group according to the present invention.

During the configuration process wherein a local area network is configured by an administrator with a plurality of switches, etc., numerous ports can be "trunked" to increase bandwidth. For example, if traffic between a first switch SW1 and a second switch SW2 is anticipated as being high, the LAN can be configured such that a plurality of ports, for example ports 1 and 2, can be connected together. In a 100 megabits per second environment, the trunking of two ports effectively provides an increased bandwidth of 200 megabits per second between the two ports. The two ports 1 and 2, are therefore identified as a trunk group, and CPU 52 is used to properly configure the handling of the trunk group. Once a trunk group is identified, it is treated as a plurality of ports acting as one logical port. FIG. 19 illustrates a configuration wherein SW1, containing a plurality of ports thereon, has a trunk group with ports 1 and 2 of SW2, with the trunk group being two communication lines connecting ports 1 and 2 of each of SW1 and SW2. This forms trunk group T. In this example, station A, connected to port 3 of SW1, is seeking to communicate or send a packet to station B, located on port 26 of switch SW2. The packet must travel, therefore, through trunk group T from port 3 of SW1 to port 26 of SW2. It should be noted that the trunk group could include any of a number of ports between the switches. As traffic flow increases between SW1 and SW2, trunk group T could be reconfigured by the administrator to include more ports, thereby effectively increasing bandwidth. In addition to providing increased bandwidth, trunking provides redundancy in the event of a failure of one of the links between the switches. Once the trunk group is created, a user programs SOC 10 through CPU 52 to recognize the appropriate trunk group or trunk groups, with trunk group identification (TGID) information. A trunk group port bit map is prepared for each TGID; and a trunk group table, provided for each module on SOC 10, is used to implement the trunk group, which can also be called a port bundle. A trunk group bit map table is also provided. These two tables are provided on a per module basis, and, like tables 21, 22, and 23, are implemented in silicon as two-dimensional arrays. In one embodiment of SOC 10, six trunk groups can be supported, with each trunk group having up to eight trunk ports thereupon. For communication, however, in order to prevent out-of-ordering of packets or frames, the same port must be used for packet flow. Identification of which port will be used for communication is based upon any of the following: source MAC address, destination MAC address, source IP address, destination IP address, or combinations of source and destination addresses. If source MAC is used, as an example, if station A on port 3 of SW1 is seeking to send a packet to station B on port 26 of SW2, then the last three bits of the source MAC address of station A, which are in the source address field of the packet, are used to generate a trunk port index. The trunk port index, which is then looked up on the trunk group table by the ingress submodule 14 of the particular port on the switch, in order to determine which port of the trunk group will be used for the communication. In other words, when a packet is sought to be sent from station A to station B, address resolution is conducted as set forth above. If the packet is to be handled through a trunk group, then a T bit will be set in the ARL entry which is matched by the destination address. If the T bit or trunk bit is set, then the destination address is learned from one of the trunk ports. The egress port, therefore, is not learned from the port number obtained in the ARL entry, but is instead learned from the trunk group ID and rules tag (RTAG) which is picked up from the ARL entry, and which can be used to identify the trunk port based upon the trunk port index contained in the trunk group table. The RTAG and TGID which are contained in the ARL entry therefore define which part of the packet is used to generate the trunk port index. For example, if the RTAG value is 1, then the last three bits of the source MAC address are used to identify the trunk port index; using the trunk group table, the trunk port index can then be used to identify the appropriate trunk port for communication. If the RTAG value is 2, then it is the last three bits of the destination MAC address which are used to generate the trunk port index. If the RTAG is 3, then the last three bits of the source MAC address are XORED with the last three bits of the destination MAC address. The result of this operation is used to generate the trunk port index. For IP packets, additional RTAG values are used so that the source IP and destination IP addresses are used for the trunk port index, rather than the MAC addresses.

SOC 10 is configured such that if a trunk port goes down or fails for any reason, notification is sent through CMIC 40 to CPU 52. CPU 52 is then configured to automatically review the trunk group table, and VLAN tables to make sure that the appropriate port bit maps are changed to reflect the fact that a port has gone down and is therefore removed. Similarly, when the trunk port or link is reestablished, the process has to be reversed and a message must be sent to CPU 52 so that the VLAN tables, trunk group tables, etc. can be updated to reflect the presence of the trunk port.

Furthermore, it should be noted that since the trunk group is treated as a single logical link, the trunk group is configured to accept control frames or control packets, also known as BPDUs, only one of the trunk ports. The port based VLAN table, therefore, must be configured to reject incoming BPDUs of non-specified trunk ports. This rejection can be easily set by the setting of a B bit in the VLAN table. IEEE standard 802.1d defines an algorithm known as the spanning tree algorithm, for avoiding data loops in switches where trunk groups exist. Referring to FIG. 19, a logical loop could exist between ports 1 and 2 and switches SW1 and SW2. The spanning algorithm tree defines four separate states, with these states including disabling, blocking, listening, learning, and forwarding. The port based VLAN table is configured to enable CPU 52 to program the ports for a specific ARL state, so that the ARL logic takes the appropriate action on the incoming packets. As noted previously, the B bit in the VLAN table provides the capability to reject BPDUs. The St bit in the ARL table enables the CPU to learn the static entries; as noted in FIG. 18, static entries are not aged by the aging process. The hit bit in the ARL table, as mentioned previously, enables the ARL engine 143 to detect whether or not there was a hit on this entry. In other words, SOC 10 utilizes a unique configuration of ARL tables, VLAN tables, modules, etc. in order to provide an efficient silicon based implementation of the spanning tree states.

In certain situations, such as a destination lookup failure (DLF) where a packet is sent to all ports on a VLAN, or a multicast packet, the trunk group bit map table is configured to pickup appropriate port information so that the packet is not sent back to the members of the same source trunk group. This prevents unnecessary traffic on the LAN, and maintains the efficiency at the trunk group.

IP/IPX

Referring again to FIG. 14, each EPIC 20 or GPIC 30 can be configured to enable support of both IP and IPX protocol at linespeed. This flexibility is provided without having any negative effect on system performance, and utilizes a table, implemented in silicon, which can be selected for IP protocol, IPX protocol, or a combination of IP protocol and IPX protocol. This capability is provided within logic circuitry 1411, and utilizes an IP longest prefix cache lookup (IP_LPC), and an IPX longest prefix cache lookup (IPX_LPC). During the layer 3 lookup, a number of concurrent searches are performed; an L3 fast lookup, and the IP longest prefix cache lookup, are concurrently performed if the packet is identified by the packet header as an IP packet. If the packet header identifies the packet as an IPX packet, the L3 fast lookup and the IPX longest prefix cache lookup will be concurrently performed. It should be noted that ARL/L3 tables 21/31 include an IP default router table which is utilized for an IP longest prefix cache lookup when the packet is identified as an IP packet, and also includes an IPX default router table which is utilized when the packet header identifies the packet as an IPX packet. Appropriate hexadecimal codes are used to determine the packet types. If the packet is identified as neither an IP packet nor an IPX packet, the packet is directed to CPU 52 via CPS channel 80 and CMIC 40. It should be noted that if the packet is identified as an IPX packet, it could be any one of four types of IPX packets. The four types are Ethernet 802.3, Ethernet 802.2, Ethernet SNAP, and Ethernet II.

The concurrent lookup of L3 and either IP or IPX are important to the performance of SOC 10. In one embodiment of SOC 10, the L3 table would include a portion which has IP address information, and another portion which has IPX information, as the default router tables. These default router tables, as noted previously, are searched depending upon whether the packet is an IP packet or an IPX packet. In order to more clearly illustrate the tables, the L3 table format for an L3 table within ARL/L3 tables 21 is as follows:

IP or IPX Address—32 bits long—IP or IPX Address—is a 32 bit IP or IPX Address. The Destination IP or IPX Address in a packet is used as a key in searching this table.

Mac Address—48 bits long—Mac Address is really the next Hop Mac Address. This Mac address is used as the Destination Mac Address in the forwarded IP Packet.

Port Number—6 bits long—Port Number—is the port number the packet has to go out if the Destination IP Address matches this entry's IP Address.

L3 Interface Num—5 bits long—L3 Interface Num—This L3 Interface Number is used to get the Router Mac Address from the L3 Interface Table.

L3 Hit Bit—1 bit long—L3 Hit bit—is used to check if there is hit on this Entry. The hit bit is set when the Source IP Address search matches this entry. The L3 Aging Process ages the entry if this bit is not set.

Frame Type—2 bits long—Frame Type indicates type of IPX Frame (802.2, Ethernet II, SNAP and 802.3) accepted by this IPX Node. Value 00—Ethernet II Frame. Value 01—SNAP Frame. Value 02—802.2 Frame. Value 03—802.3 Frame.

Reserved—4 bits long—Reserved for future use.

The fields of the default IP router table are as follows:

IP Subnet Address—32 bits long—IP Subnet Address—is a 32 bit IP Address of the Subnet.

Mac Address—48 bits long—Mac Address is really the next Hop Mac Address and in this case is the Mac Address of the default Router.

Port Number—6 bits long—Port Number is the port number forwarded packet has to go out.

L3 Interface Num—5 bits long—L3 Interface Num is L3 Interface Number.

IP Subnet Bits—5 bits long—IP Subnet Bits is total number of Subnet Bits in the Subnet Mask. These bits are ANDED with Destination IP Address before comparing with Subnet Address.

C Bit—1 bit long—C Bit—If this bit is set then send the packet to CPU also.

The fields of the default IPX router table within ARL/L3 tables 21 are as follows:

IPX Subnet Address—32 bits long—IPX Subnet Address is a 32 bit IPX Address of the Subnet.

Mac Address—48 bits long—Mac Address is really the next Hop Mac Address and in this case is the Mac Address of the default Router.

Port Number—6 bits long—Port Number is the port number forwarded packet has to go out.

L3 Interface Num—5 bits long—L3 Interface Num is L3 Interface Number.

IPX Subnet Bits—5 bits long—IPX Subnet Bits is total number of Subnet Bits in the Subnet Mask. These bits are ANDED with Destination IPX Address before comparing with Subnet Address.

C Bit—1 bit long—C Bit—If this bit is set then send the packet to CPU also.

If a match is not found in the L3 table for the destination IP address, longest prefix match in the default IP router fails, then the packet is given to the CPU. Similarly, if a match is not found on the L3 table for a destination IPX address, and the longest prefix match in the default IPX router fails, then the packet is given to the CPU. The lookups are done in parallel, but if the destination IP or IPX address is found in the L3 table, then the results of the default router table lookup are abandoned.

The longest prefix cache lookup, whether it be for IP or IPX, includes repetitive matching attempts of bits of the IP subnet address. The longest prefix match consists of ANDing the destination IP address with the number of IP or IPX subnet bits and comparing the result with the IP subnet address. Once a longest prefix match is found, as long as the TTL is not equal to one, then appropriate IP check sums are recalculated, the destination MAC address is replaced with the next hop MAC address, and the source MAC address is replaced with the router MAC address of the interface. The VLAN ID is obtained from the L3 interface table, and the packet is then sent as either tagged or untagged, as appropriate. If the C bit is set, a copy of the packet is sent to the CPU as may be necessary for learning or other CPU-related functions.

It should be noted, therefore, that if a packet arrives destined to a MAC address associated with a level 3 interface for a selected VLAN, the ingress looks for a match at an IP/IPX destination subnet level. If there is no IP/IPX destination subnet match, the packet is forwarded to CPU 52 for appropriate routing. However, if an IP/IPX match is made, then the MAC address of the next hop and the egress port number is identified and the packet is appropriately forwarded.

In other words, the ingress of the EPIC 20 or GPIC 30 is configured with respect to ARL/L3 tables 21 so that when a packet enters ingress submodule 14, the ingress can identify whether or not the packet is an IP packet or an IPX packet. IP packets are directed to an IP/ARL lookup, and IPX configured packets are directed to an IPX/ARL lookup. If an L3 match is found during the L3 lookup, then the longest prefix match lookups are abandoned.

HOL Blocking

SOC 10 incorporates some unique data flow characteristics, in order maximize efficiency and switching speed. In network communications, a concept known as head-of-line or HOL blocking occurs when a port is attempting to send a packet to a congested port, and immediately behind that packet is another packet which is intended to be sent to an un-congested port. The congestion at the destination port of the first packet would result in delay of the transfer of the second packet to the un-congested port. Each EPIC 20 and GPIC 30 within SOC 10 includes a unique HOL blocking mechanism in order to maximize throughput and minimize the negative effects that a single congested port would have on traffic going to un-congested ports. For example, if a port on a GPIC 30, with a data rate of, for example, 1000 megabits per second is attempting to send data to another port 24a on EPIC 20a, port 24a would immediately be congested. Each port on each GPIC 30 and EPIC 20 is programmed by CPU 52 to have a high watermark and a low watermark per port per class of service (COS), with respect to buffer space within CBP 50. The fact that the head of line blocking mechanism enables per port per COS head of line blocking prevention enables a more efficient data flow than that which is known in the art. When the output queue for a particular port hits the preprogrammed high watermark within the allocated buffer in CBP 50, PMMU 70 sends, on S channel 83, a COS queue status notification to the appropriate ingress module of the appropriate GPIC 30 or EPIC 20. When the message is received, the active port register corresponding to the COS indicated in the message is updated. If the port bit for that particular port is set to zero, then the ingress is configured to drop all packets going to that port. Although the dropped packets will have a negative effect on communication to the congested port, the dropping of the packets destined for congested ports enables packets going to un-congested ports to be expeditiously forwarded thereto. When the output queue goes below the preprogrammed low watermark, PMMU 70 sends a COS queue status notification message on the sideband channel with the bit set for the port. When the ingress gets this message, the bit corresponding to the port in the active port register for the module can send the packet to the appropriate output queue. By waiting until the output queue goes below the low watermark before re-activating the port, a hysteresis is built into the system to prevent constant activation and deactivation of the port based upon the forwarding of only one packet, or a small number of packets. It should be noted that every module has an active port register. As an example, each COS per port may have four registers for storing the high watermark and the low watermark; these registers can store data in terms of number of cells on the output queue, or in terms of number of packets on the output queue. In the case of a unicast message, the packet is merely dropped; in the case of multicast or broadcast messages, the message is dropped with respect to congested ports, but forwarded to uncongested ports. PMMU 70 includes all logic required to implement this mechanism to prevent HOL blocking, with respect to budgeting of cells and packets. PMMU 70 includes an HOL blocking marker register to implement the mechanism based upon cells. If the local cell count plus the global cell count for a particular egress port exceeds the HOL blocking marker register value, then PMMU 70 sends the HOL status notification message. PMMU 70 can also implement an early HOL notification, through the use of a bit in the PMMU configuration register which is referred to as a Use Advanced Warning Bit. If this bit is set, the PMMU 70 sends the HOL notification message if the local cell count plus the global cell count plus 121 is greater than the value in the HOL blocking marker register. 121 is the number of cells in a jumbo frame.

With respect to the hysteresis discussed above, it should be noted that PMMU 70 implements both a spatial and a temporal hysteresis. When the local cell count plus global cell count value goes below the value in the HOL blocking marker register, then a poaching timer value from a PMMU configuration register is used to load into a counter. The counter is decremented every 32 clock cycles. When the counter reaches 0, PMMU 70 sends the HOL status message with the new port bit map. The bit corresponding to the egress port is reset to 0, to indicate that there is no more HOL blocking on the egress port. In order to carry on HOL blocking prevention based upon packets, a skid mark value is defined in the PMMU configuration register. If the number of transaction queue entries plus the skid mark value is greater than the maximum transaction queue size per COS, then PMMU 70 sends the COS queue status message on the S channel. Once the ingress port receives this message, the ingress port will stop sending packets for this particular port and COS combination. Depending upon the configuration and the packet length received for the egress port, either the head of line blocking for the cell high watermark or the head of line blocking for the packet high watermark may be reached first. This configuration, therefore, works to prevent either a small series of very large packets or a large series of very small packets from creating HOL blocking problems.

The low watermark discussed previously with respect to CBP admission logic is for the purpose of ensuring that independent of traffic conditions, each port will have appropriate buffer space allocated in the CBP to prevent port starvation, and ensure that each port will be able to communicate with every other port to the extent that the network can support such communication.

Referring again to PMMU 70 illustrated in FIG. 10, CBM 71 is configured to maximize availability of address pointers associated with incoming packets from a free address pool. CBM 71, as noted previously, stores the first cell pointer until incoming packet 112 is received and assembled either in CBP 50, or GBP 60. If the purge flag of the corresponding P channel message is set, CBM 71 purges the incoming data packet 112, and therefore makes the address pointers GPID/ CPID associated with the incoming packet to be available. When the purge flag is set, therefore, CBM 71 essentially flushes or purges the packet from processing of SOC 10, thereby preventing subsequent communication with the associated egress manager 76 associated with the purged packet. CBM 71 is also configured to communicate with egress managers 76 to delete aged and congested packets. Aged and congested packets are directed to CBM 71 based upon the associated starting address pointer, and the reclaim unit within CBM 71 frees the pointers associated with the packets to be deleted; this is, essentially, accomplished by modifying the free address pool to reflect this change. The memory budget value is updated by decrementing the current value of the associated memory by the number of data cells which are purged.

To summarize, resolved packets are placed on C channel 81 by ingress submodule 14 as discussed with respect to FIG. 8. CBM 71 interfaces with the CPS channel, and every time there is a cell/packet addressed to an egress port, CBM 71 assigns cell pointers, and manages the linked list. A plurality of concurrent reassembly engines are provided, with one reassembly engine for each egress manager 76, and tracks the frame status. Once a plurality of cells representing a packet is fully written into CBP 50, CBM 71 sends out CPIDs to the respective egress managers, as discussed above. The CPIDs point to the first cell of the packet in the CBP; packet flow is then controlled by egress managers 76 to transaction MACs 140 once the CPID/GPID assignment is completed by CBM 71. The budget register (not shown) of the respective egress manager 76 is appropriately decremented by the number of cells associated with the egress, after the complete packet is written into the CBP 50. EGM 76 writes the appropriate PIDs into its transaction FIFO. Since there are multiple classes of service (COSs), then the egress manager 76 writes the PIDs into the selected transaction FIFO corresponding to the selected COS. As will be discussed below with respect to FIG. 13, each egress manager 76 has its own scheduler interfacing to the transaction pool or transaction FIFO on one side, and the packet pool or packet FIFO on the other side. The transaction FIFO includes all PIDs, and the packet pool or packet FIFO includes only CPIDs. The packet FIFO interfaces to the transaction FIFO, and initiates transmission based upon requests from the transmission MAC. Once transmission is started, data is read from CBP 50 one cell at a time, based upon transaction FIFO requests.

Figure 13:
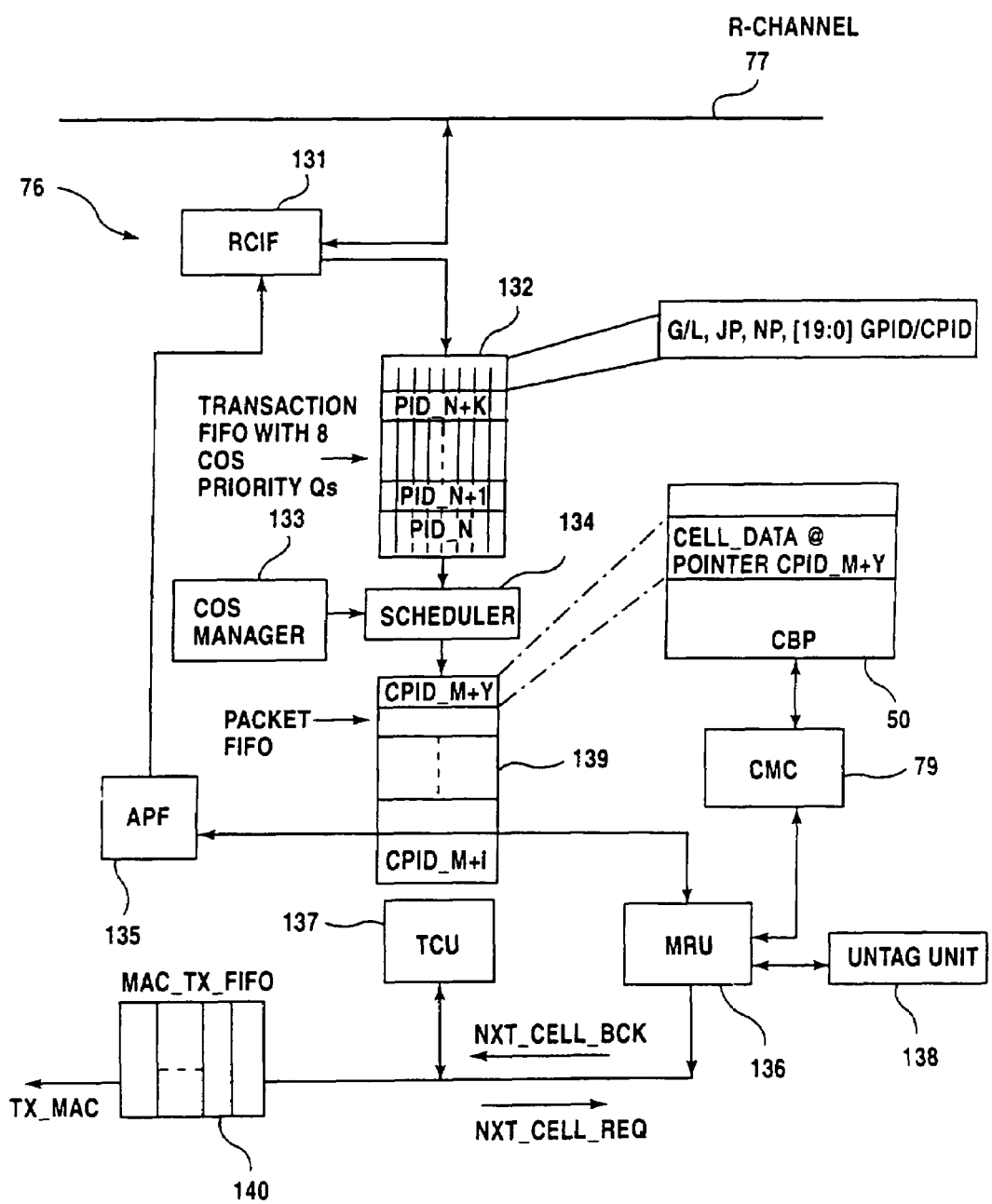
FIG. 13 illustrates a block diagram of an egress manager 76 illustrated in FIG. 10.

As noted previously, there is one egress manager for each port of every EPIC 20 and GPIC 30, and is associated with egress sub-module 18. FIG. 13 illustrates a block diagram of an egress manager 76 communicating with R channel 77. For each data packet 112 received by an ingress submodule 14 of an EPIC 20 of SOC 10, CBM 71 assigns a Pointer Identification (PID); if the packet 112 is admitted to CBP 50, the CBM 71 assigns a CPID, and if the packet 112 is admitted to GBP 60, the CBM 71 assigns a GPID number. At this time, CBM 71 notifies the corresponding egress manager 76 which will handle the packet 112, and passes the PID to the corresponding egress manager 76 through R channel 77. In the case of a unicast packet, only one egress manager 76 would receive the PID. However, if the incoming packet were a multicast or broadcast packet, each egress manager 76 to which the packet is directed will receive the PID. For this reason, a multicast or broadcast packet needs only to be stored once in the appropriate memory, be it either CBP 50 or GBP 60.

Each egress manager 76 includes an R channel interface unit (RCIF) 131, a transaction FIFO 132, a COS manager 133, a scheduler 134, an accelerated packet flush unit (APF) 135, a memory read unit (MRU) 136, a time stamp check unit (TCU) 137, and an untag unit 138. MRU 136 communicates with CMC 79, which is connected to CBP 50. Scheduler 134 is connected to a packet FIFO 139. RCIF 131 handles all messages between CBM 71 and egress manager 76. When a packet 112 is received and stored in SOC 10, CBM 71 passes the packet information to RCIF 131 of the associated egress manager 76. The packet information will include an indication of whether or not the packet is stored in CBP 50 or GBP 70, the size of the packet, and the PID. RCIF 131 then passes the received packet information to transaction FIFO 132. Transaction FIFO 132 is a fixed depth FIFO with eight COS priority queues, and is arranged as a matrix with a number of rows and columns. Each column of transaction FIFO 132 represents a class of service (COS), and the total number of rows equals the number of transactions allowed for any one class of service. COS manager 133 works in conjunction with scheduler 134 in order to provide policy based quality of service (QOS), based upon ethernet standards. As data packets arrive in one or more of the COS priority queues of transaction FIFO 132, scheduler 134 directs a selected packet pointer from one of the priority queues to the packet FIFO 139. The selection of the packet pointer is based upon a queue scheduling algorithm, which is programmed by a user through CPU 52, within COS manager 133. An example of a COS issue is video, which requires greater bandwidth than text documents. A data packet 112 of video information may therefore be passed to packet FIFO 139 ahead of a packet associated with a text document. The COS manager 133 would therefore direct scheduler 134 to select the packet pointer associated with the packet of video data.

The COS manager 133 can also be programmed using a strict priority based scheduling method, or a weighted priority based scheduling method of selecting the next packet pointer in transaction FIFO 132. Utilizing a strict priority based scheduling method, each of the eight COS priority queues are provided with a priority with respect to each other COS queue. Any packets residing in the highest priority COS queue are extracted from transaction FIFO 132 for transmission. On the other hand, utilizing a weighted priority based scheduling scheme, each COS priority queue is provided with a programmable bandwidth. After assigning the queue priority of each COS queue, each COS priority queue is given a minimum and a maximum bandwidth. The minimum and maximum bandwidth values are user programmable. Once the higher priority queues achieve their minimum bandwidth value, COS manager 133 allocates any remaining bandwidth based upon any occurrence of exceeding the maximum bandwidth for any one priority queue. This configuration guarantees that a maximum bandwidth will be achieved by the high priority queues, while the lower priority queues are provided with a lower bandwidth.

The programmable nature of the COS manager enables the scheduling algorithm to be modified based upon a user's specific needs. For example, COS manager 133 can consider a maximum packet delay value which must be met by a transaction FIFO queue. In other words, COS manager 133 can require that a packet 112 is not delayed in transmission by the maximum packet delay value; this ensures that the data flow of high speed data such as audio, video, and other real time data is continuously and smoothly transmitted.

If the requested packet is located in CBP 50, the CPID is passed from transaction FIFO 132 to packet FIFO 139. If the requested packet is located in GBP 60, the scheduler initiates a fetch of the packet from GBP 60 to CBP 50; packet FIFO 139 only utilizes valid CPID information, and does not utilize GPID information. The packet FIFO 139 only communicates with the CBP and not the GBP. When the egress seeks to retrieve a packet, the packet can only be retrieved from the CBP; for this reason, if the requested packet is located in the GBP 50, the scheduler fetches the packet so that the egress can properly retrieve the packet from the CBP.

APF 135 monitors the status of packet FIFO 139. After packet FIFO 139 is full for a specified time period, APF 135 flushes out the packet FIFO. The CBM reclaim unit is provided with the packet pointers stored in packet FIFO 139 by APF 135, and the reclaim unit is instructed by APF 135 to release the packet pointers as part of the free address pool. APF 135 also disables the ingress port 21 associated with the egress manager 76.

While packet FIFO 139 receives the packet pointers from scheduler 134, MRU 136 extracts the packet pointers for dispatch to the proper egress port. After MRU 136 receives the packet pointer, it passes the packet pointer information to CMC 79, which retrieves each data cell from CBP 50. MRU 136 passes the first data cell 112a, incorporating cell header information, to TCU 137 and untag unit 138. TCU 137 determines whether the packet has aged by comparing the time stamps stored within data cell 112a and the current time. If the storage time is greater than a programmable discard time, then packet 112 is discarded as an aged packet. Additionally, if there is a pending request to untag the data cell 112a, untag unit 138 will remove the tag header prior to dispatching the packet. Tag headers are defined in IEEE Standard 802.1q.

Egress manager 76, through MRU 136, interfaces with transmission FIFO 140, which is a transmission FIFO for an appropriate media access controller (MAC); media access controllers are known in the ethernet art. MRU 136 prefetches the data packet 112 from the appropriate memory, and sends the packet to transmission FIFO 140, flagging the beginning and the ending of the packet. If necessary, transmission FIFO 140 will pad the packet so that the packet is 64 bytes in length.

As shown in FIG. 9, packet 112 is sliced or segmented into a plurality of 64 byte data cells for handling within SOC 10. The segmentation of packets into cells simplifies handling thereof, and improves granularity, as well as making it simpler to adapt SOC 10 to cell-based protocols such as ATM. However, before the cells are transmitted out of SOC 10, they must be reassembled into packet format for proper communication in accordance with the appropriate communication protocol. A cell reassembly engine (not shown) is incorporated within each egress of SOC 10 to reassemble the sliced cells 112a and 112b into an appropriately processed and massaged packet for further communication.

Figure 16:
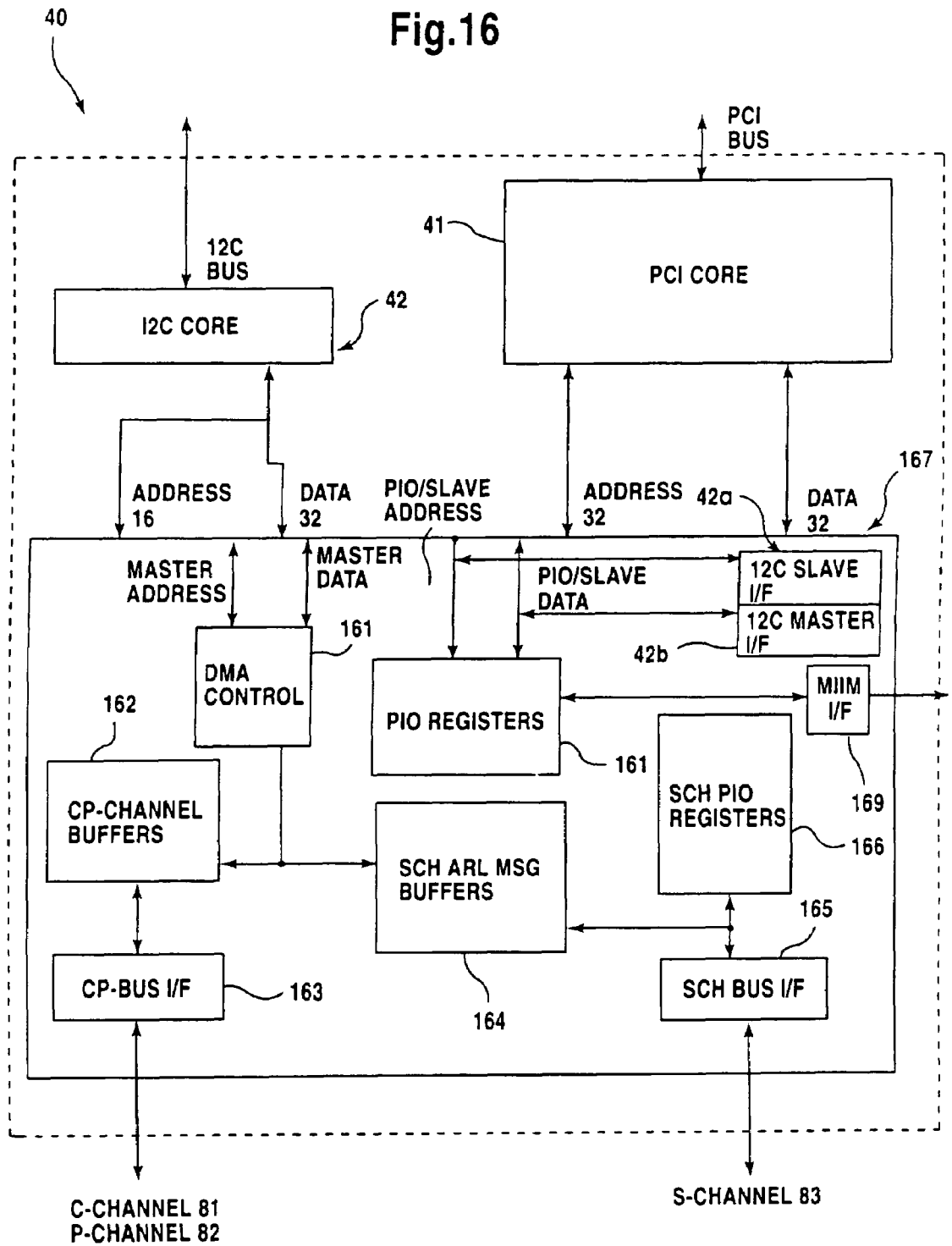
FIG. 16 is a block diagram of the elements of CMIC 40.

FIG. 16 is a block diagram showing some of the elements of CPU interface or CMIC 40. In a preferred embodiment, CMIC 40 provides a 32 bit 66 MHz PCI interface, as well as an I2C interface between SOC 10 and external CPU 52. PCI communication is controlled by PCI core 41, and I2C communication is performed by I2C core 42, through CMIC bus 167. As shown in the figure, many CMIC 40 elements communicate with each other through CMIC bus 167. The PCI interface is typically used for configuration and programming of SOC 10 elements such as rules tables, filter masks, packet handling, etc., as well as moving data to and from the CPU or other PCI uplink. The PCI interface is suitable for high end systems wherein CPU 52 is a powerful CPU and running a sufficient protocol stack as required to support layer two and layer three switching functions. The I2C interface is suitable for low end systems, where CPU 52 is primarily used for initialization. Low end systems would seldom change the configuration of SOC 10 after the switch is up and running.

CPU 52 is treated by SOC 10 as any other port. Therefore, CMIC 40 must provide necessary port functions much like other port functions defined above. CMIC 40 supports all S channel commands and messages, thereby enabling CPU 52 to access the entire packet memory and register set; this also enables CPU 52 to issue insert and delete entries into ARL/L3 tables, issue initialize CFAP/SFAP commands, read/write memory commands and ACKs, read/write register command and ACKs, etc. Internal to SOC 10, CMIC 40 interfaces to C channel 81, P channel 82, and S channel 83, and is capable of acting as an S channel master as well as S channel slave. To this end, CPU 52 must read or write 32-bit D words. For ARL table insertion and deletion, CMIC 40 supports buffering of four insert/delete messages which can be polled or interrupt driven. ARL messages can also be placed directly into CPU memory through a DMA access using an ARL DMA controller 161. DMA controller 161 can interrupt CPU 52 after transfer of any ARL message, or when all the requested ARL packets have been placed into CPU memory.

Communication between CMIC 40 and C channel 81/P channel 82 is performed through the use of CP-channel buffers 162 for buffering C and P channel messages, and CP bus interface 163. S channel ARL message buffers 164 and S channel bus interface 165 enable communication with S channel 83. As noted previously, PIO (Programmed Input/Output) registers are used, as illustrated by SCH PIO registers 166 and PIO registers 168, to access the S channel, as well as to program other control, status, address, and data registers. PIO registers 168 communicate with CMIC bus 167 through I2C slave interface 42*a* and I2C master interface 42*b*. DMA controller 161 enables chaining, in memory, thereby allowing CPU 52 to transfer multiple packets of data without continuous CPU intervention. Each DMA channel can therefore be programmed to perform a read or write DMA operation. Specific descriptor formats may be selected as appropriate to execute a desired DMA function according to application rules. For receiving cells from PMMU 70 for transfer to memory, if appropriate, CMIC 40 acts as an egress port, and follows egress protocol as discussed previously. For transferring cells to PMMU 70, CMIC 40 acts as an ingress port, and follows ingress protocol as discussed previously. CMIC 40 checks for active ports, COS queue availability and other ingress functions, as well as supporting the HOL blocking mechanism discussed above. CMIC 40 supports single and burst PIO operations; however, burst should be limited to S channel buffers and ARL insert/delete message buffers. Referring once again to I2C slave interface 42*a*, the CMIC 40 is configured to have an I2C slave address so that an external I2C master can access registers of CMIC 40. CMIC 40 can inversely operate as an I2C master, and therefore, access other I2C slaves. It should be noted that CMIC 40 can also support MIIM through MIIM interface 169. MIIM support is defined by IEEE Standard 802.3u, and will not be further discussed herein. Similarly, other operational aspects of CMIC 40 are outside of the scope of this invention.

A unique and advantageous aspect of SOC 10 is the ability of doing concurrent lookups with respect to layer two (ARL), layer three, and filtering. When an incoming packet comes in to an ingress submodule 14 of either an EPIC 20 or a GPIC 30, as discussed previously, the module is capable of concurrently performing an address lookup to determine if the destination address is within a same VLAN as a source address; if the VLAN IDs are the same, layer 2 or ARL lookup should be sufficient to properly switch the packet in a store and forward configuration. If the VLAN IDs are different, then layer three switching must occur based upon appropriate identification of the destination address, and switching to an appropriate port to get to the VLAN of the destination address. Layer three switching, therefore, must be performed in order to cross VLAN boundaries. Once SOC 10 determines that L3 switching is necessary, SOC 10 identifies the MAC address of a destination router, based upon the L3 lookup. L3 lookup is determined based upon a reading in the beginning portion of the packet of whether or not the L3 bit is set. If the L3 bit is set, then L3 lookup will be necessary in order to identify appropriate routing instructions. If the lookup is unsuccessful, a request is sent to CPU 52 and CPU 52 takes appropriate steps to identify appropriate routing for the packet. Once the CPU has obtained the appropriate routing information, the information is stored in the L3 lookup table, and for the next packet, the lookup will be successful and the packet will be switched in the store and forward configuration.

Thus, the present invention comprises a method for allocating memory locations of a network switch. The network switch has internal (on-chip) memory and an external (off-chip) memory. Memory locations are allocated between the internal memory and the external memory according to a pre-defined algorithm.

The pre-defined algorithm allocates memory locations between the internal memory and the external memory based upon the amount of internal memory available for the egress port of the network switch from which the data packet is to be transmitted by the network switch. When the internal memory available for the egress port from which the data packet is to be transmitted is above a predetermined threshold, then the data packet is stored in the internal memory. Wshen the internal memory available for the egress port from which the data packet is to be transmitted is below the predetermined threshold value, then the data packet is stored in the external memory.

Thus, this distributed hierarchical shared memory architecture defines a self-balancing mechanism. That is, for egress ports having few data packets in their egress queues, the incoming data packets which are to be switched to these egress ports are sent to the internal memory, whereas for egress ports having many data packets in their egress queues, the incoming data packets which are to be switched to these egress ports are stored in the external memory.

Preferably, any data packets which are stored in external memory are subsequently re-routed back to the internal memory before being provided to an egress port for transmission from the network switch.

Thus, according to the present invention, the transmission line rate is maintained on each egress port even though the architecture utilizes slower speed DRAMs for at least a portion of packet storage. Preferably, this distributed hierarchical shared memory architecture uses SRAM as a packet memory cache or internal memory and uses standard DRAMs or SDRAMs as an external memory, so as to provide a desired cost-benefit ratio.

Memory Management Unit

The memory management unit, or PMMU 70, is generally configured to handle all cell transactions from the time period in which an ingress from an EPIC 20 sends a cell out on the CPS channel 80 for storage in memory, either internal 50 or external 60, until the time period in which an egress port receives the cell for transfer to a remote port. Further, PMMU 70 handles cell storage operations, both within CBP 50 and GBP 60, while isolating these memory storage operations from the respective ingress and egress ports, which serves to eliminate clock latency problems between memory and the ports. Therefore, generally speaking, PMMU 70 conducts the following functions:

1) Receives cells from the ingress ports at the required rates;
2) Sends cells to the egress ports at the required rates;
3) Sends sideband messages to other modules to indicate the current status and condition of PMMU 70;
4) Drops cells and/or packets in a manner that is not destructive to the chip, eg. causing ship seizure;
5) Controls and manages the storage of cells in CBP 50 and GBP 60; and
6) Supports debug read/write operations of internal registers and memory.

Figure 20:
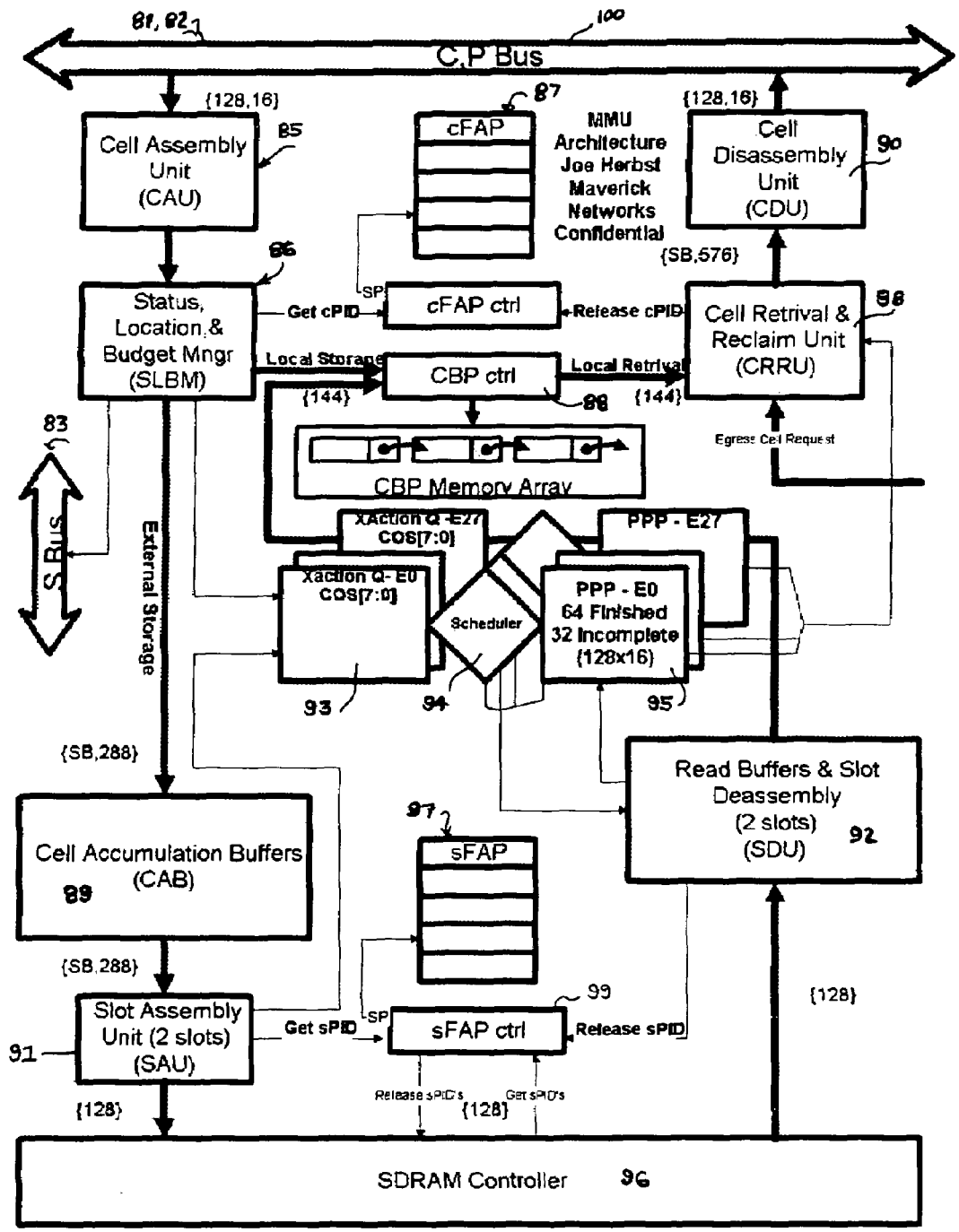
FIG. 20 is a detailed illustration of the Memory Management Unit.

In addition to the memory related functions, PMMU 70 as a whole essentially operates to connect a plurality of sub-modules or operational blocks together for operation as a common system known as PMMU 70. The sub-modules interconnected to form PMMU 70, for example, are generally shown in FIG. 20, and are as follows:

1) Cell Accumulation Unit 85 (CAU);
2) Status, Location, & Budget Manager 86 (SLBM);
3) Cell Free Address Pool 87 (cFAP);
4) CBP Controller 88;
5) Cell Accumulation Buffers 89 (CAB);
6) Cell Disassembly Unit 90 (CDU);
7) Slot Assembly Unit 91 (SAU);
8) Slot Disassembly Unit 92 (SDU);
9) Transaction Queue Controller 93 (XQ_ctrl);
10) Egress Scheduler 94 (ES);
11) Packet Pointer Pool Controller 95 (PPPC);
12) SDRAM Controller 96;
13) Slot Free Address Pool 97 (sFAP);
14) Cell Retrieval & Reclaim Unit 98 (CRRU); and
15) Slot Free Address Controller 99 (sFAP_ctrl).

MMU Interfacing with Other Modules

PMMU 70 uses the CP Bus 100, which is formed by C and P channels 81 & 82 of CPS channel 80 for all cell-based traffic. As such, the CP Bus 100 handles the bulk of the data transfer between PMMU 70 and other modules in SOC 10. Ingress functions generally result in sending cells to memory, either internal/on board memory (CBP 50) or external memory (GBP 60), while the egress functions generally receive cells for transmission to remote ports from PMMU 70. Therefore, these functions alone indicate that PMMU 70 can generally require 50% of the available bandwidth of the CP bus 100. Further, since CP Bus 100 allows packets received into the ingress to be split in to cells, transferred through the switch to memory, and then reassembled into packets in memory, PMMU 70 is required to support reassembly of up to 32 packets at once given the exemplary configuration noted above having 32 ports per switch.

CP Bus 100 supports variable length data transmissions, from 1-4 "words" per cell, wherein each word is 128 bits long. For example, a 65 byte packet would come across CP Bus 100 as a 64 byte cell, in which all 4 phases of P Bus 82 are valid. Thereafter, one word is transferred across the bus, wherein only the first phase of P Bus 82 is valid. Thus, the data on the first transfer, corresponding to when the S Bit is set, should be 4 words long, as when the S Bit is set, all of the data in the trailing 3 phases is latched and used on subsequent cells sent by the ingress. Therefore, PMMU 70 is configured to keep track of the functional data flow errors, such as 2 first cell indicators incurred without reading a last cell indicator therebetween. In this situation, PMMU 70 generates a memory failure message, which is sent out on S channel 83 to all modules.

The S Channel 83, as mentioned above, is responsible for transferring sideband messages within SOC 10 and is the second interface between PMMU 70 and other modules within SOC 10. In particular, S Channel 83 caries a number of sideband messages between PMMU 70 and other modules within SOC 10. As examples thereof, PMMU 70 is responsible for responding to the following sideband messages:

1) Read Memory Command;
2) Write Memory Command;
3) Read Register Command;
4) Write Register Command;
5) Initialize CFAP;
6) Initialize SFAP;
7) Enter a Debug Mode; and
8) Exit a Debug Mode.

Further, PMMU 70 is responsible for generating and sending the following sideband messages to other modules within SOC 10 on S Channel 83:

1) Back Pressure Warning Status;
2) Back Pressure Discard Status;
3) COS Queue Status;
4) Head of Line Status;
5) GBP Full Status;
6) GBP Available Notification;
7) Read Memory Ack;
8) Write Memory Ack;
9) Read Register Ack;
10) Write Register Ack; and
11) Memory Failure Notification.

The final interface between PMMU 70 and the remaining modules within SOC 10 is an SDRAM interface. This interface, which is shown in FIG. 20 as SDRAM Controller 96, allows PMMU 70 to directly control an SDRAM bank of memory, which is illustrated as GBP 60 in the previously discussed example configurations. In the present embodiment, for example, the SDRAM bank can be a 128-bit SDRAM bank, which can be at most 8 chips (16 bits wide) and at most one physical bank, wherein all the data pins are arranged in a standard point to point SDRAM configuration. The example of the present embodiment supports SDRAM memory configurations from 16 MB (8*16 MB chips) to 64 MB (8*64 MB chips). However, if x32 SDRAM's are available, then 4, 8, and 32 MB configurations would naturally be available, as 4*16 MB chips or 4*64 MB chips.

Timing

With the exception of a small portion of SDRAM Controller 96, PMMU 70 is clocked using the SOC 10 core clock frequency, which can be 133 MHz in the example of the present embodiment. The SDRAM Clock is received into PMMU 70 from an external oscillator, and sent out by PMMU 70 in synchronization with the data. This clock is generally specified to operate in a range between 66 and 125 MHz, and has no relationship to the main clock frequency of SOC 10. The specific functions and clock related features of SDRAM Controller 96 within the present example will be further discussed herein.

Figure 21:
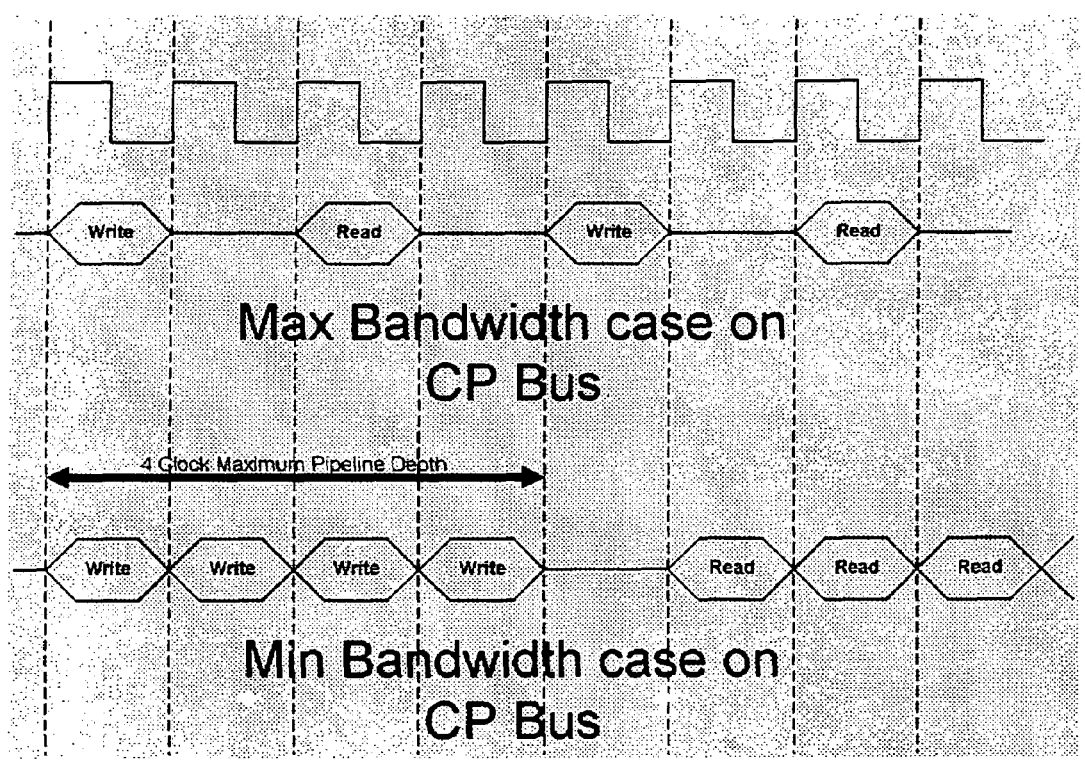
FIG. 21 is a timing diagram for the MMU.

In the example of the present embodiment, PMMU 70 accepts a new word from an ingress port via CP Bus 100 every 4 clock cycles. Further, a new cell is sent to the egress ports every 4 clocks, again via CP Bus 100. Exemplary cases for the maximum and minimum timing for these operations is illustrated in FIG. 21.

FIFO's in PMMU 70

Several First-In-First-Out queues (FIFO's) exist at the PMMU architecture level. Generally speaking, the FIFOs connect to the CBP read/write data bus and to the respective requester. FIFOs included within PMMU 70, for example, are an SLBM FIFO, an SDU FIFO, a CRRU Cell FIFO, and a Debug/SBUS FIFO. Additionally, the random access memories (RAMs) utilized by PMMU 70 are instantiated at this level. Examples of the respective RAM's in the present embodiment are as follows:

1) CBP 50
2) SAU 91
3) SDU 92
4) CAB 89
5) Transaction Queues (XQ)
6) cFAP 87
7) Copy Count Pool (CCP)
8) sFAP 99
9) Packet Pointer Pool (PPP)
10) BC/MC Bitmap 7 Untagged (BC)

The architecture of PMMU 70 is configured to optimize timing and resources. Therefore, for example, the longest pipeline delay is generally no greater than 4 clock cycles. This 4 clock maximum pipeline delay is best evidenced by referring to the 65 byte exemplary case shown in FIG. 21. As a result of the minimal pipeline delay specifications of PMMU 70, the requirements for the above noted FIFOs are relatively high, as each stage must consume no more than 4 clock cycles of latency.

PMMU 70 further utilizes novel structure and logic within the respective FIFO's to optimally store data within storage units. This structure and logic generally includes generating a glitchless fractional clock pulse from an increment or enable pulse and a clock signal, which is provided to a storage element to enable a data storage operation in a time period in which the data to be stored is most stable. The glitchless fractional clock pulse, which is generally of a shorter period than the system core clock pulse and asserted high during the same time period or duration that the core clock pulse is asserted high, defines a region in which the data to be stored is in an predicably stable state. The predictably stable state is a result of the data being stable in the median region of the clock pulse, as opposed to the end regions proximate the rising and falling edge of the clock pulse, where the data tends to be unstable; The structure and logic of the present invention not only allows for storage of data during a predictably stable portion of a clock cycle, but also minimizes overhead consumption via usage of simple space saving elements.

Figure 31:
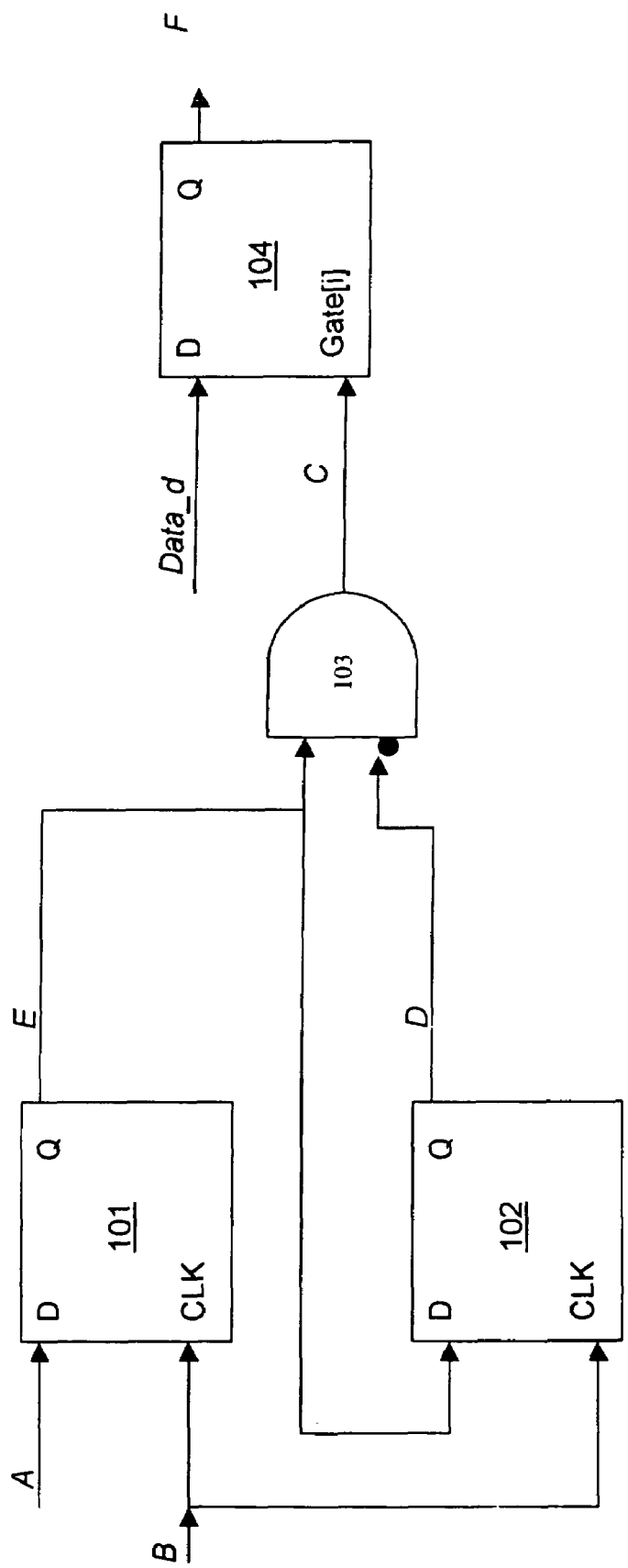
FIG. 31 illustrates a data storage configuration.

FIG. 31, for example, illustrates a structural configuration utilized to generate the glitchless fractional clock pulse that is supplied to a storage unit 104. Although storage unit 104 is generally represented within FIG. 31 as a latch, it is contemplated within the scope of the present invention that other known storage devices and/or latch equivalents may be supplemented for latch 104. Storage unit 104 is provided with two inputs: first, an enable or gate input that corresponds to the input where the previously discussed glitchless fractional clock pulse is supplied; and a data input, where the data to be stored in the latch is provided thereto. The data input, which is represented in FIG. 31 as Data_d, generally represents the data resident on a bus or similar structure awaiting storage within storage unit 104. Therefore, when the glitchless fractional clock pulse is presented at the enable input of storage unit 104, the data resident at input D is latched or stored within storage unit 104. Therefore, it is desired to strategically time the presentation of the glitchless fractional clock pulse to storage unit 104 to an optimal time when the data resident on input D is most stable.

Figure 32:
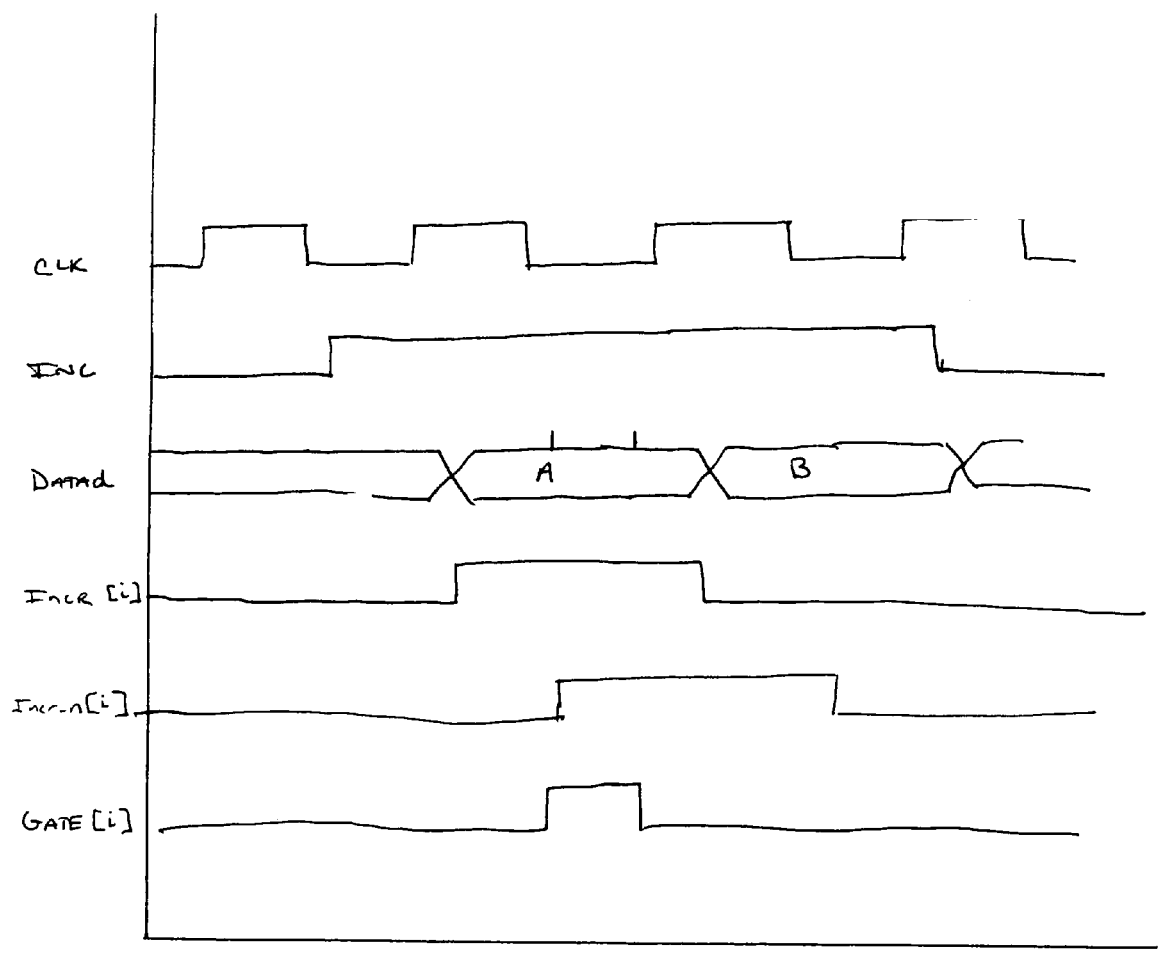
FIG. 32 illustrates the timing for the logical configuration shown in FIG. 31.

FIG. 32 shows an exemplary timing diagram of the memory circuitry shown in FIG. 31. CLK represents the general clock signal presented to the logic circuitry within FIG. 31, and in particular, to the clock input of elements 101 and 102. Data_d represents the data to be stored, and in particular, Data_d is shown to have three specific blocks of data to be stored, which are labeled A, B, and C. The increment timing line (INC) represents a unique increment clock wide pulse supplied to element 101, which signals a bank of storage elements 104 to store/latch the data resident on the Data_d line. WRPTR represents the write pointer. Incr[i], Incr[i+1], and Incr[i+2] represent the increment pulses within various portions of the logic circuitry shown in FIG. 31. Finally, Gate[i] represents the glitchless fractional clock pulse generated at the optimum time period in which to store/latch the data resident on the Data_d line, as this data is most stable within the time period that the glitchless fractional clock pulse is asserted high. In particular, this pulse is generated in sync with the falling edge of the system clock, which places the clock pulse equidistant from the ends of the data window, as shown in FIG. 32.

Referring to the sample logic configuration shown in FIG. 31, a first flip-flop 101 has an input (D) and a clock input (CLK). Input D receives an increment pulse A and input CLK receives the system clock pulse B. Second flip-flop 102 also receives the system clock pulse on a CLK input. However, the input D of second flip-flop 102 is connected to the output Q of first flip-flop 101. The output Q of first flip flop 101 is represented in FIG. 32 by the Incr[i] pulse. Output Q of first flip flop 101 is also connected to a first input of an "AND" Gate 103. The second input of AND Gate 103, which is an inverted input, is connected to the output Q of second flip flop 102, which is represented in FIG. 32 by the Incr_n[i] pulse. This configuration generates the glitchless fractional clock pulse denoted as Gate[i] in FIG. 32 from the output of AND Gate 103. This glitchless fractional clock pulse is used as the activating input for latch 104, which operates to enable the latch in a time period within the system clock pulse when the data resident on the Data_d line is most stable. This stability affords much greater reliability and accuracy in the data stored within latch/storage unit 104.

Although a particular logical arrangement has been disclosed in the example shown in FIG. 32, it is understood by those in the art that various equivalent logic arrangements can be created by De Morganizing the configuration shown.

Reset and Initialization Events

PMMU 70 is configured to perform a standard built in self test (BIST) test on all internal memory structures upon a reset action of SOC 10. This test is conducted after the reset pulse diminishes. Subsequent to the completion of the BIST test, cFAP 87 and sFAP 92 initialization will take place. Assuming no BIST test problems, PMMU 70 is generally fully operational 64,000+ n clocks after the reset pulse goes away, wherein "n" represents the number of clock cycles necessary to fully complete the BIST test. The 64,000 clock cycles represents an exemplary time period required to initialize 64 MB of SDRAM, which would have 64,000 slots, each slot representing 1 k and one clock cycle for initialization. Further, in the present example, the initialization of the cFAP 87 takes place in parallel to these operations, and generally requires only 4000 clock cycles, which allows initialization time to be limited only to that which is necessary for SDRAM to initialize.

During this initialization process, the arbiter for CP Bus 100 must be turned off, so that no requests on the S Bus 83 will be recognized and interfere with the initialization process. Upon completion of memory initialization, the arbiter for the CP Bus 100 is turned back on, and the default register settings loaded upon initialization are sufficient to allow for basic packet switching to begin. Any additional register settings preferred by the user, such as predetermined watermarks or diagnostic testing settings, can be modified after initialization.

Registers

The following read/write port specific (x32) registers are utilized by PMMU 70 in the present example.

1) Low Water Mark (LWM)—allocates the minimum number of cells that a port can consume within CBP 50.
2) High Water Mark (HWM)—allocates the maximum number of cells that a port can consume within CBP 50. The high water mark is essentially used as a stopping point for bringing cells back in from GBP 60 into CBP 50 for transmission to the appropriate egress port. In particular, if the last cell count plus the global cell count is determined to be greater than the high water mark, then PMMU 70 is programmed to stop scheduling cells to be brought back in from GBP 60 until this congestion status clears. Further, as an aside, every time a cell is brought in from GBP 60, GCC is decremented and LCC in incremented.
3) Head of Line Blocking (HOL)—allocates the maximum number of cells that an egress can have outstanding at any given time.
4) Global Reroute Marker (GRM)—denotes the point at which PMMU 70 will start to bring cells back into CBP 50 after these cells have gone out to GBP 60. This is specified in terms of cells remaining within GBP 60.
5) Ingress Back Pressure Warning Limit—denotes the number of cells at which PMMU 70 will send out a Back Pressure Warning message. Generally, in the present exemplary embodiment {15:0} corresponds to an example warning limit.
6) Scheduler Control—There are two fields that control scheduling flow.
   a. Max Number of COS's—2 bits {1:0} to indicate the maximum number of COS's that the particular Egress will support. The logical depth of the XQ is then divided by the number of COS's.
   b. Packet Pointer Pool Size—2 bits {17:16} used to indicate 16, 32, or 64 entries in each PPP for each Egress.

PMMU 70 also utilizes COS specific (x8) registers. These registers are as follows.
   Flow Control Registers—
   a. Maximum Latency—{7:0} denotes the maximum time between packets (GPID/CPID's) being scheduled to go into the PPP.
   b. Maximum Packets—{23:16} Denotes the maximum number of packets to send on a particular COS. If the register is supplied with FF, then this value denotes send until empty.

The present exemplary embodiment of PMMU 70 additionally utilizes a number of general and/or multi-port registers (x1), which are as follows.

1) CAB Bootout Timer—The number of clock cycles (in hundreds), before cells are forced out from the CAB 89 (force a slot boundary).
2) CFAP Pool Size—The maximum number of cells to "dole out" for storage in the CBP 50.
3) SFAP Pool Size—The maximum number of cells to allocate for storage in the GBP 60.
4) Sum of LWM's—The collective sum of all the Low Water Mark registers. This is used to pre-allocate space in CBP 50.
5) CBP Safety Margin—The number of cells to save for SDU 92 to bring in to the CBP 50 (added to the Pre-allocation count) (prevents a deadlock condition between CPID's and GPID retrieval).
6) XQ Skid mark—(8 bits) The number of entries to use as a safety margin for the XQ filling. The SBUS message "COS Queue Status" will have an asserted bit for this COS if the SkidMark+the Preallocated Count+the Outstanding Transactions>=the total number of XQ entries (ex 256 if 8 COS's are enabled). The Skid Mark is primarily used to cover the latency of Ingress traffic responding to the S-bus message.
7) Misc. Configuration—Different bits for small functions
   a) Disable Power management—Turns OFF any power management.
   b) Short out unused Ports—Used by the Token Manager to "skip over" the ports that have no instantiation.
   c) Add dead state to SRAM's—Does not send a write request into an SRAM if a read is pending.
   d) Start BIST—Setting this bit will start a BIST transaction. Hardware will clear the bit when the BIST FSM is done. This is accomplished in DEBUG mode.
8) SDRAM Control—{3:0} bits denote the max number of cells per slot. {7:4} denote the maximum number of slots per chain (GPID). {15:8} control the DLL delay to the SDRAM CLKOUT0 {23:16} control the DLL delay to the SDRAM CLKOUT1 {31:24} control the DLL delay to the SDRAM CLKOUT2.
9) Clear Error Status—Writing this register will cause the corresponding bit(s) in the Global Error Register to be cleared.
10) Ingress Back Pressure Discard Delta Count—The number of cells at which PMMU 70 will send out a Back Pressure Discard message {15:0}=Discard Count that is added to the warning limit set in the Port specific registers above.

PMMU 70 also includes a number of read only registers, which are listed below.

1) Local Cell Count (LCC Count)—outstanding number of cells to an Egress that resides in CBP 50, which can be (x32) port specific registers.
2) Global Cell Count (GCC_Count)—outstanding number of cells to an Egress that resides in the GBP 60, which can be (x32) port specific registers.
3) XQ_entries—Total number of outstanding entries in the XQ, which can be (x32) port specific register.
4) IBP_count—Current number of cells outstanding per Ingress, which can be (x32) port specific register.
5) COS Specific (x8) registers.
6) General/MultiPort Registers (x1)
   a. CFAP_readpointer—How many cells has PMMU 70 released
   b. SFAP_readpointer—How many slots has PMMU 70 released c. Dropped Cell Count—How many cells has PMMU 70 dropped due to bandwidth or error conditions.

d. Dropped Packet Count—How many packets has PMMU 70 dropped due to bandwidth or error conditions.

e. BIST Failed Address—bit 31 represents a failure having occurred, {30:n} represents which memory that failed, {n−1:0} represent the address that failed.

Cell Assembly Unit—CAU 85

The primary function of CAU 85 within the present exemplary embodiment of PMMU 70 is to convert data on CP Bus 100, which is in CP Bus format, into the Cell Data and Cell header formats used to store the Cell in memory. This block also stores the code that is sent with the first 64 bytes for each Ingress. Once a cell is received from CP bus 100 into CAU 85, the cell is reformatted into 3 fields, the Cell Header, the Cell Data and the Sideband/info fields. Therefore, in the present example, CAU 85 is essentially a stand alone module with respect to its function, and as such, does not include any major sub-modules. However, CAU 85 regularly interfaces with CP BUS 100, SLBM 86, and the system core clock. In order for CAU 85 to operate within the desired parameters of SOC 10, CAU 85 must process a cell every 4 clock cycles, if the cell is not the first cell of a packet, and every 8 clock cycles if the cell happens to be the first cell in a packet. CAU 85 utilizes a simple 4 state finite state machine (FSM), that is configured to track CP Bus 100 and its variable length. Thus, CAU 85 operates to pull cells off of CP Bus 100 for processing by PMMU 70. Once a cell(s) is pulled off of CP BUS 100, CAU 85 formats the cell(s) into a selected common format/language utilized by the modules within PMMU 70. Upon completion of formatting the cell(s), CAU 85 hands the cell(s) off to SLBM 86.

Status, Location, & Budget Manager (SLBM 86)

The principle function of this module is to make decisions for cells that come into PMMU 70. Given the exemplary configuration having 32 ports, cells can potentially come in at different times from different ingresses, and therefore, it is possible to have as many as 32 open packets being reassembled at once within PMMU 70. Once a First Cell of a packet is received, all the necessary and relevant information for packet storage is kept in a local RAM or register file. Correspondingly, each packet can be to one or many Egresses, as SOC 10, as noted above, has broadcast ad multicast capability. In the present example, each Egress has 4 water marks associated therewith that signify the current status of each outgoing port, which were discussed above. Further, SLBM 86 interfaces to S-Bus 83 to communicate with other modules within PMMU 70. SLBM 86 acts both to take register read-write commands and store the appropriate value corresponding thereto, and to send requests to stop ingress traffic to a specific egress, or to possibly stop all incoming traffic in a situation, for example, where GBP 60 is full.

Figure 33:
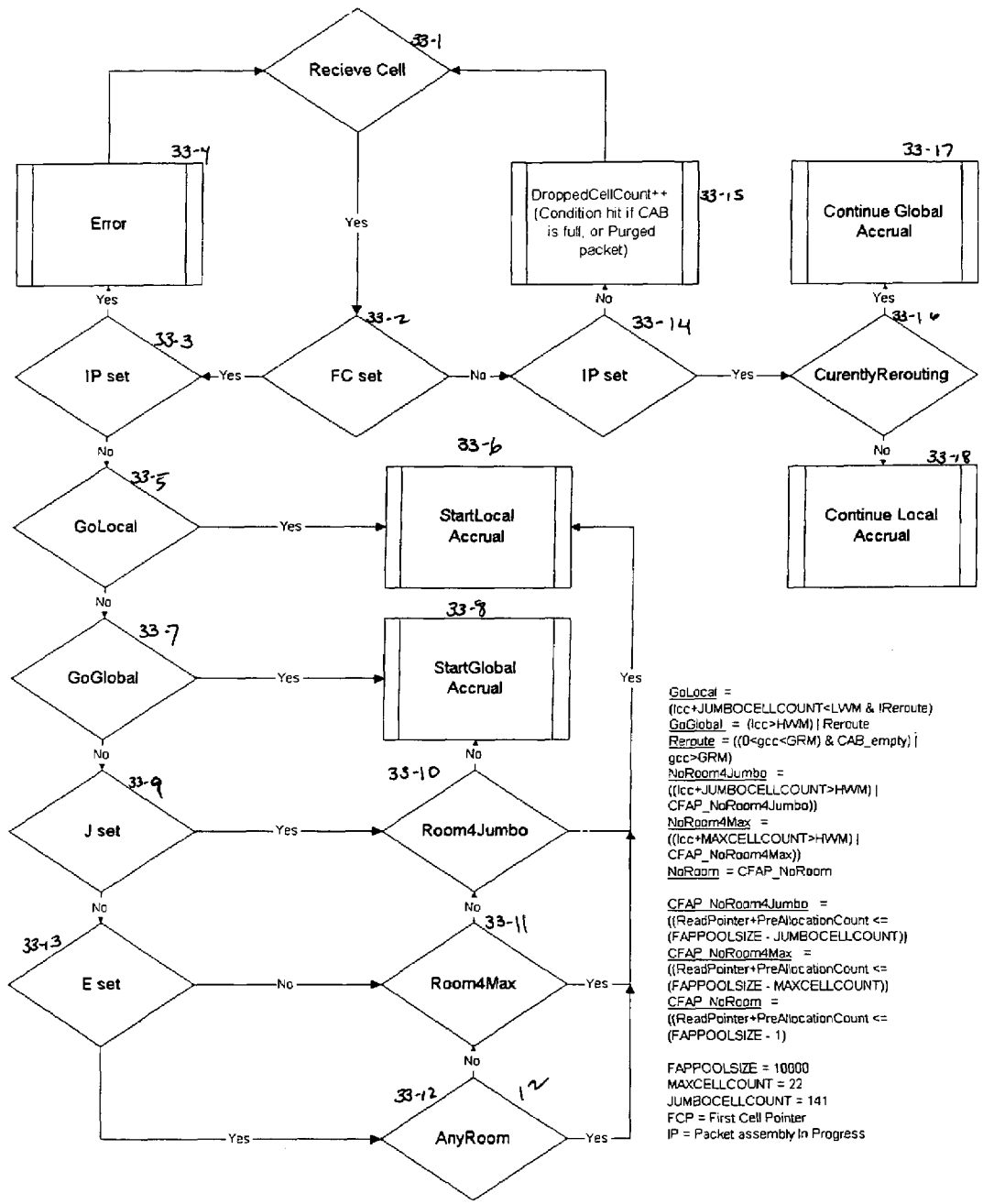
FIG. 33 is a flowchart for receiving a cell within SLBM.

An example of the data flow within SLBM 86 is shown in the flowchart presented as FIG. 33. The general data flow within SLBM 86 begins with receiving a cell at step 33-1 in the flowchart. At this point the logic continues to step 33-2, wherein it is determined if the FC bit, which represents the first cell of the packet, is set. Since the FC bit indicates the first cell of a packet, the FC bit also serves to indicate whether or not a block of data is currently being assembled within PMMU 70, as this bit is set high upon entry of a cell into PMMU 70 and released or set low when the cell is processed into memory. If the FC bit is set, then the logic continues to step 33-3, wherein it is determined if the IP bit is set. If both the IP bit and the FC bits are set, then an error condition is determined at step 33-4, as a cell construction cannot be in progress when a first cell is received. If the IP bit is found not to be set, then the logic determines if the packet should "go local" at step 33-5. The determination to store the incoming data in local memory includes determining if the current cell count is lower than the low watermark setting for the particular egress that the data is scheduled to be transmitted to through SOC 10. Further, the GoLocal designation shown at step 33-5 additionally includes determining if the GCC value is equal to zero, which corresponds to GBP 60 being empty. Therefore, if the current LCC value plus the number of expected cells left in this particular packet reassembly is less than the low watermark, then the packet is determined to be eligible for storage in local memory 50. If the packet is eligible, then the flowchart continues to the start local accrual at step 33-6, which is further detailed in FIG. 34. If the logic determines not to go local, then the logic continues to the go global step, which is step 33-7. At step 33-7, the logic determines the inverse of step 33-5, by determining if the local cell count, which is the number of cells in CBP 50, added to the number of expected cells left in this particular reassembly is greater than the low watermark. Alternatively, if the global cell count is determined to be greater than zero, then the global accrual process is initiated. If the determination is made to go global as a result of GCC being greater than 0 or the cell counts being over the LWM, then the logic continues to the start global accrual in step 33-8, which is further detailed in FIG. 35. If the logic determines to not start the global accrual process at step 33-7, then it is next determined if the J bit is set at step 33-9. If the J bit is set, then the logic determines if there is sufficient memory space in global memory for a jumbo packet at step 33-10. If sufficient space exists in global memory, the global accrual process is started; but if there is insufficient space, then the logic continues to step 33-11, wherein it is determined if there is room for a maximum size data block, which can, for example, correspond to up to 25 cells. If so, the logic returns to the local accrual step, and if not, the logic checks to see if there is any room at all within local memory for the data block, so that local accrual may begin. If the J bit is determined not to be set at step 33-9, then the logic continues to step 33-13 where the E bit is checked. The E bit corresponds to the end bit, so if it is set, the logic continues to step 33-12, and if it is not, then the logic continues to step 33-11.

Returning to step 33-2, if it is determined that the FC bit is not set, then the logic continues to step 33-14, wherein it is determined if the IP bit is set. If the IP bit is set, which corresponds to the state wherein the system is currently rerouting, then the logic continues to 33-16 where it is determined if the system is currently rerouting. If the system is currently rerouting, then the logic continues to step 33-17, the continue global accrual step, which is further detailed within FIG. 37. If it is determined that the system is not currently rerouting, then the logic continues to step 33-18, which corresponds to the continue local accrual step further detailed within FIG. 36.

Figure 34:
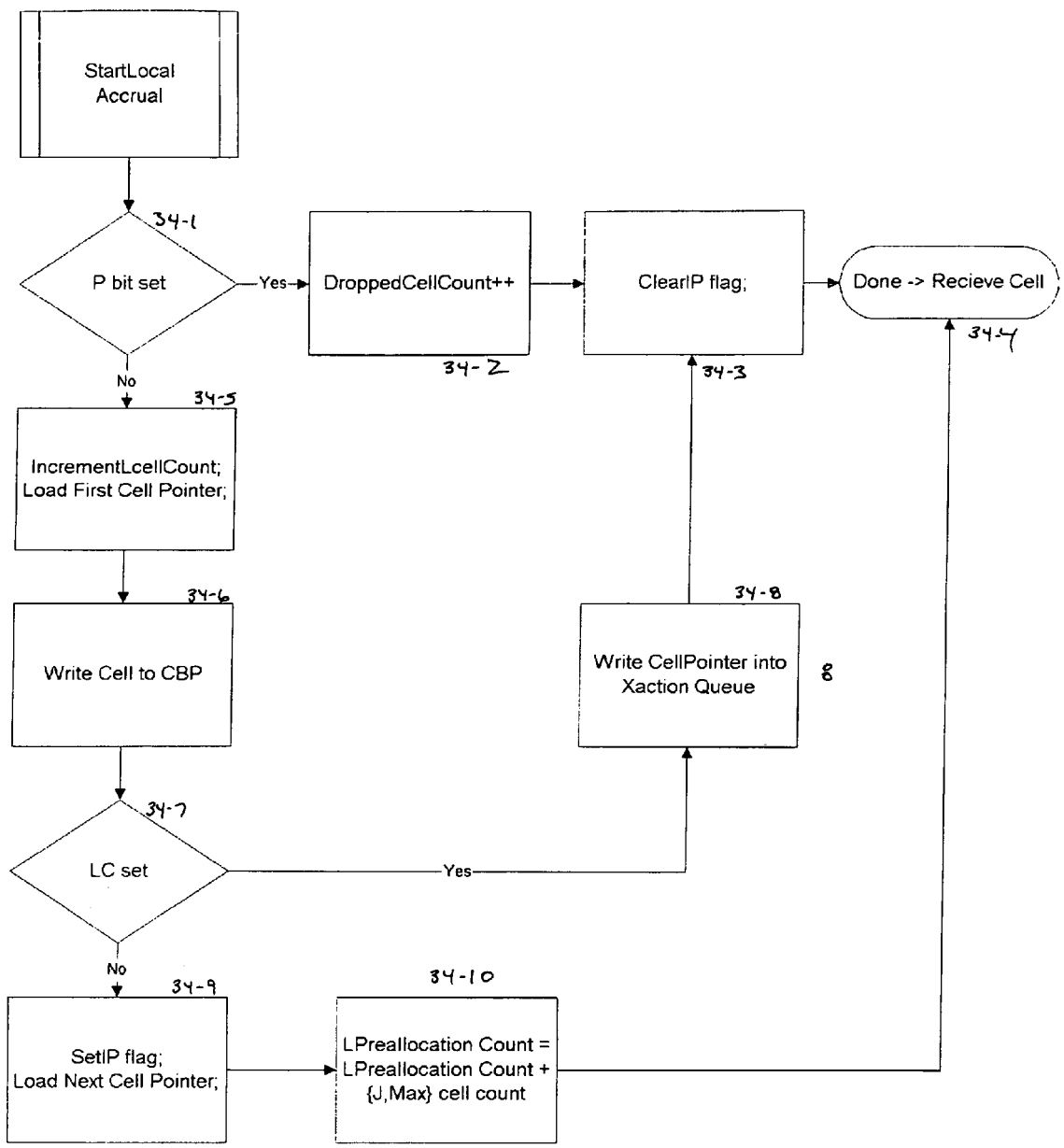
FIG. 34 is a flowchart local accrual process.

The start local accrual process shown in FIG. 34 begins at step 34-1, where it is determined if the P bit is set. If the P bit is set, then the logic continues to sequential steps 34-2 and 34-3, where the drop cell count is incremented and the IP flag is cleared. Thereafter the local accrual process is completed at step 34-4. However, if the P bit is determined not to be set at step 34-1, then the logic continues with the local accrual process at steps 34-5 and 34-6, wherein the cell count is incremented, the first cell pointer is loaded, and the cell is written to CBP 50. After the cell is written to CBP 50, the logic determines whether the LC bit is set at step 34-7. If the LC bit is determined to be set, then the logic writes the cell pointer into the transaction queue at step 34-8 and continues to step 34-3. If the LC bit is determined not to be set, then the logic continues to steps 34-9 and 34-10, where the IP flag is set and the next cell pointer is loaded. Further, the LPreallocation Count is calculated to be the sum of the current LPreallocation Count and the {J, Max} cell count. Thereafter the start local accrual process is completed at step 34-4, and the logic returns to the receive cell step noted in FIG. 33.

Figure 35:
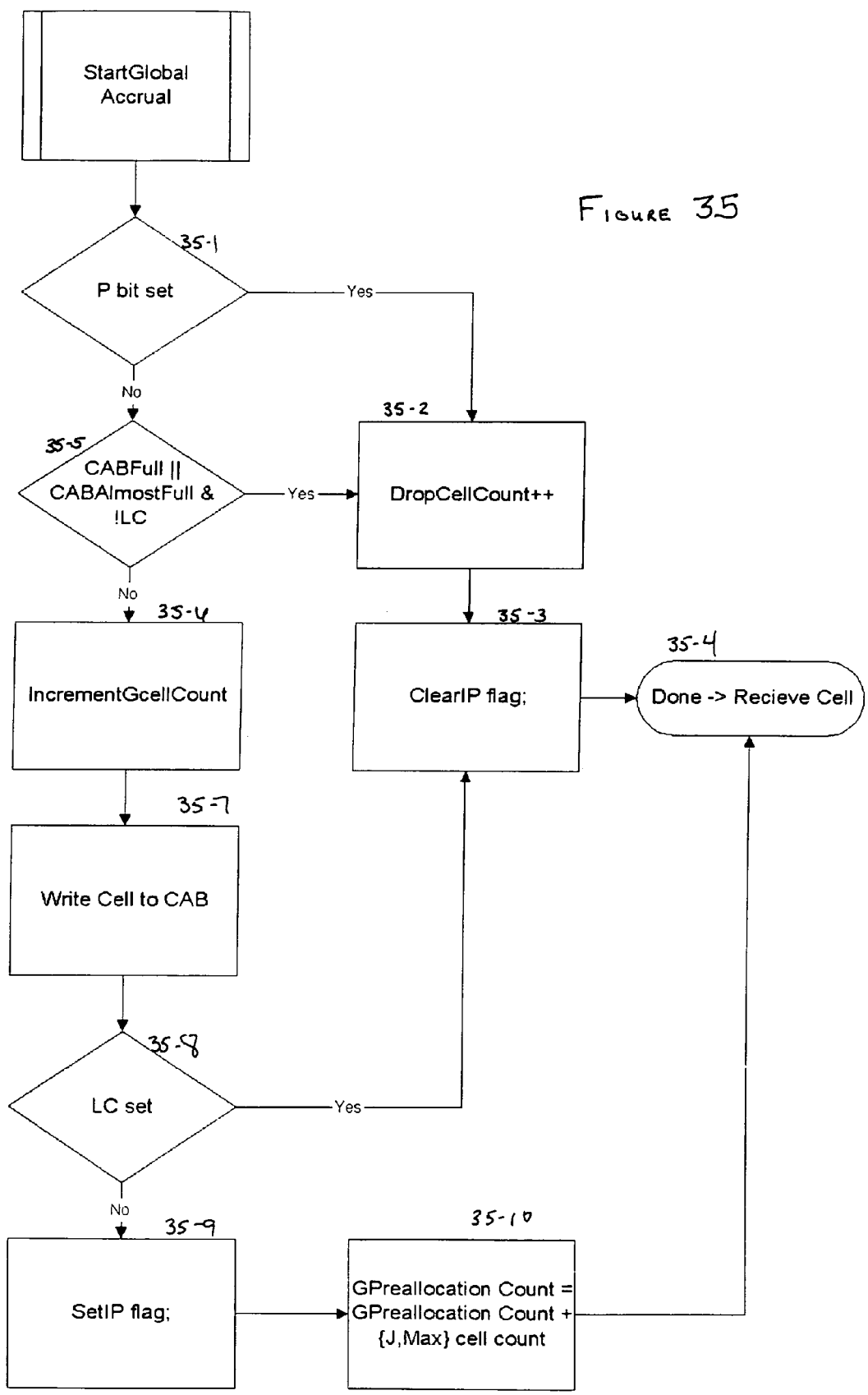
FIG. 35 is a flowchart of the global accrual process.

The start global accrual process shown in FIG. 35 begins at step 35-1, where it is determined if the P bit is set. If the P bit is set, then the logic continues to sequential steps 35-2 and 35-3, where the drop cell count is incremented and the IP flag is cleared. Thereafter the global accrual process is completed at step 35-4. However, if the P bit is determined not to be set at step 35-1, then the logic continues with the global accrual process at step 35-5, wherein it is determined if CAB 89 is full or almost full. If CAB 89 is full or almost full, then the logic continues to step 35-2. If not, then the logic continues to steps 35-6 and 35-7, where the GCC is incremented and the cell is written to CAB 89. Subsequent to writing the cell to CAB 89, the logic determines if the LC bit is set at step 35-8. If this bit is set, then the logic returns to step 35-3. If the LC bit is not set, then the logic sets the IP flag and the GPreallocation Count is calculated to be the sum of the current GPreallocation count and the {J, Max} cell count. Thereafter the logic terminates at step 35-4 and returns to the receive cell step within FIG. 33.

Figure 36:
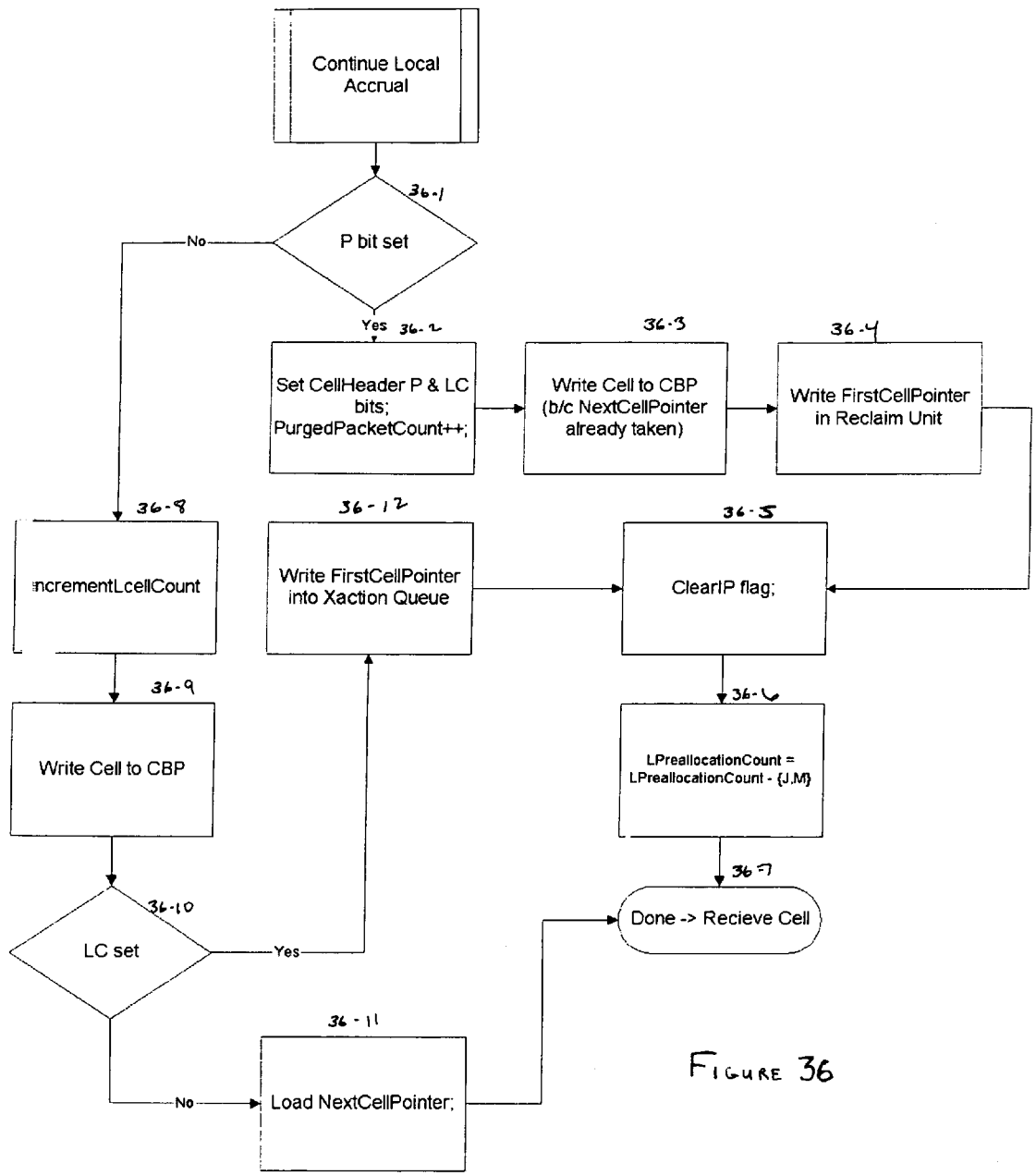
FIG. 36 is a flowchart of the continue local accrual process.

The continue local accrual process noted in FIG. 33 as step 33-18 is continued in FIG. 36 at step 36-1, where the logic determines if the P bit is set. If it is determined that the P bit is set, then the logic continues through steps 36-2 through 36-6. At step 36-2 the logic sets the CellHeader P and LC bits along with incrementing the PurgedPacketCount (PPP). At step 36-3 the logic writes the cell to CBP 50, and at step 36-4 the logic writes the FirstCellPointer (FCP) in the reclaim unit. At step 36-5 the logic clears the IP flag and at step 36-6 the logic calculates the LPreallocationCount. Thereafter the logic continues to step 36-7, where the process is completed and the logic returns to the receive cell step of FIG. 33. If the P bit is determined not to be set at step 36-1, then the logic continues to steps 36-8 and 36-9, wherein the LCC is incremented and the cell is written to CBP 50. Thereafter, at step 36-10 the logic determines if the LC bit is set. If this bit is set, then the logic continues to step 36-12, wherein the FCP is written into the transaction queue. Thereafter, the logic continues to steps 36-5 through 36-7. If the LC bit is determined not to be set at step 36-10, then the logic loads the NextCellPointer (NCP) at step 36-11, and then continues to step 36-7.

Figure 37:
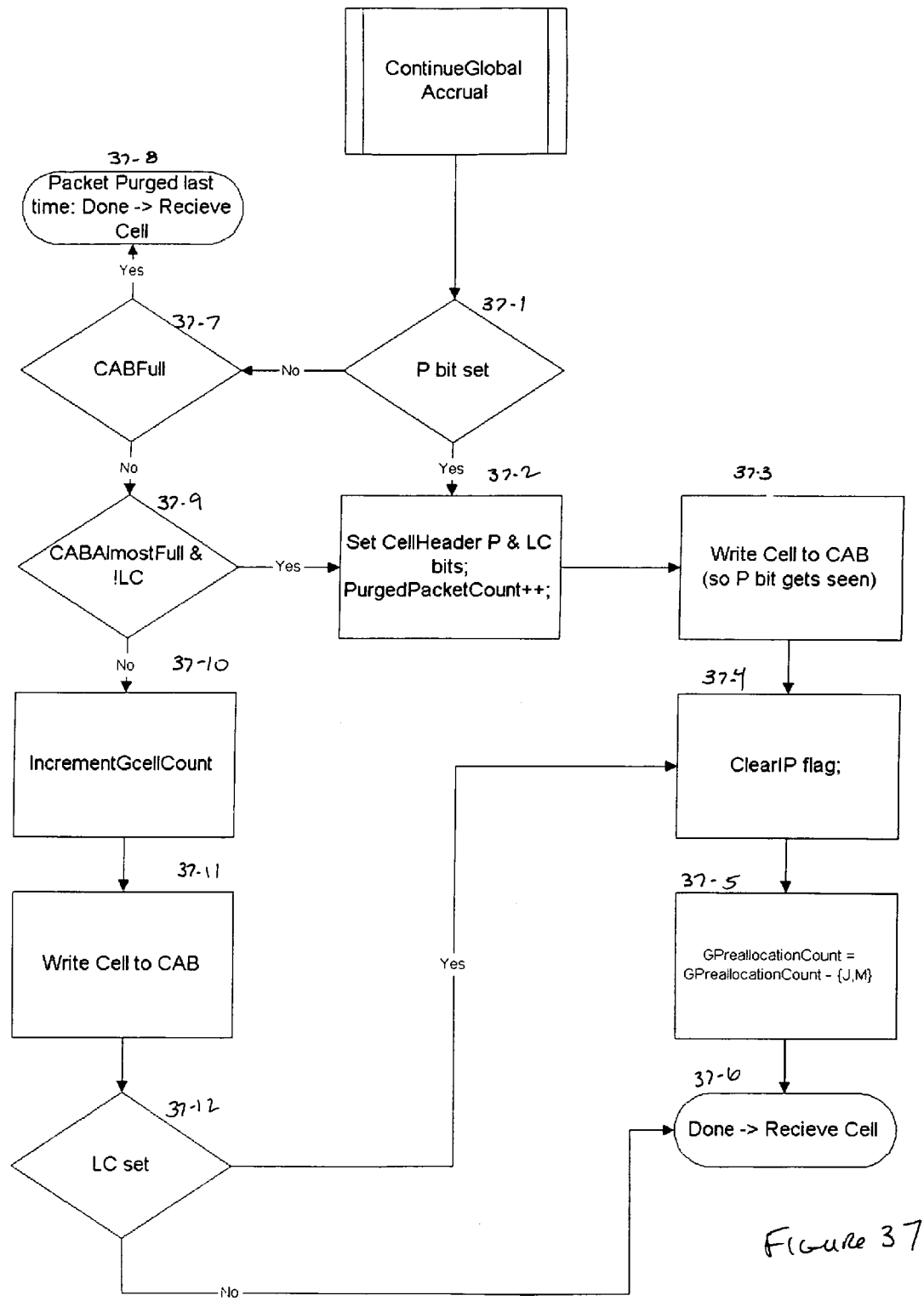
FIG. 37 is a flowchart of the continue global accrual process.

The continue global accrual process noted in FIG. 33 as step 33-17 is further detailed within FIG. 37. At step 37-1 in FIG. 37 the logic determines if the P bit is set. If it is determined that the P bit is set, then the logic continues to steps 37-2-37 through 37-6, wherein the CellHeader P and LC bits are set and the PurgedPacketCount is incremented at step 37-2. At step 37-3 the cell is written into CAB 89, and at step 37-4 the IP flag is cleared. At step 37-5 the logic calculates the GPreallocationCount, and then continues to step 37-6, where the continue global accrual process is completed and the logic returns to step 33-1 in FIG. 33. If the P bit is determined not to be set in step 37-1, then the logic continues to step 37-7, where it is determined if the CABFull bit is set. If this bit is set, then the packet is purged at step 37-8, and the logic returns to step 33-1 in FIG. 33. If the CABFull bit is not set, then the logic determines if CAB 89 is almost full and the status of the LC bit at step 37-9. If CAB 90 is almost full and the LC bit is not set, then the logic continues to step 37-2. If CAB 90 is not almost full and the LC bit is set, then the logic continues to steps 37-10 and 37-11, wherein the GCC is incremented and the cell is written into CAB 89. Thereafter, at step 37-12 the logic determines if the LC bit is set, and if so, the logic continues to step 37-4 of the flowchart. If the LC bit is not set, then the logic continues to step 37-6 of the flowchart, which corresponds to returning to the receive cell step within FIG. 33.

In the example of the present embodiment, SBUS manager, which is a submodule of SLBM 86, manages the SBUS I/F and disseminates all necessary commands and information messages to the other internal modules of SLBM 86 for relaying of status info and out of the PMMU 70. An Initial Decision Matrix submodule implements the flow configuration for receiving a new cell within PMMU 70. The Initial Decision Matrix submodule ascertains whether the data is new or old, global, local, and above or below the representative watermarks. The Initial Decision Matrix submodule is an area between Ingress data, which, in the present example, is 32 bits wide, and Egress data, which is also 32 bits wide, and therefore a "matrix". This submodule keeps track of the IP vector and the First Packet Pointer (FPP) and Next Packet Pointer (NPP). The Initial Decision Matrix submodule includes ingress cell pointers, which keep track of the current status of each packet assembly. There are 32 registers corresponding to each ingress in the present example. Each register contains the FPP in the chain, the next cell in the chain and the IP flag which states that the assembly is in progress. Additionally, the pointers and muxes that indicate to other modules that there is only one FPP, NPP, and IP flag are resident herein. The Initial Decision Matrix submodule also interfaces to cFAP 87 by prefetching the necessary pointers. In the present example, the Initial Decision Matrix submodule includes a Sum32 submodule, which operates to sum a 32 bit input vector and return an output. A Start Local Accrual and Start Global Accrual submodules are provided with pure combinatorial logic, and operate to implement the cell flow logic discussed in the above noted flowcharts for starting a new packet & subsequent cell accrual. A Continue Local Accrual submodule is provided within the matrix. This module is also pure combinatorial logic and implements the flow logic for continuing an old packet & any subsequent cell accrual. A Continue Global Accrual submodule is provided, again with pure combinatorial logic, and operates to implement the cell flow logic for continuing an external (global) packet & subsequent cell accrual. A Cell Counter Unit submodule is provided for keeping track of current cell counts for each egress. The Cell Counter Unit takes increment, decrement and transfer requests for a port that is being worked on (all can be at the same time) and keeps track of the current local and global cell count for the respective egress. The Cell Counter Unit also generates status pins that notify the remaining modules within PMMU 70 of the current status. This module also keeps track of the Current Status of the module (reroute), and is instantiated on a per-egress basis in the present example.

Cell Free Address Pool 87

Cell Free Address Pool 87, in the present example, is the module that is responsible for obtaining and releasing free address from CBP 50 address pool. The linked list architecture of CBP 50 mandates that the next cell header be resident within PMMU 70 prior to the writing of the current cell into memory. Therefore, every time a cell is written to CBP 50, another cell is fetched and becomes available to be written into the next cell header for that ingress stream. This allows for accurate generation and tracking of the linked list architecture. The primary interface with cFAP 87 is the Cell Free Address Pool Controller (cFAP ctrl), which is shown in FIG. 20. The cFAP further interfaces with the read only cFAP_readpointer and the cFAP POOLSIZE, SUM OF LWM's, and CBP Safety Margin read/write registers.

Further, in the present exemplary embodiment, the configuration and operational characteristics of cFAP 87 increase the reliability of SOC 10, while decreasing the overhead usage. In particular, cFAP 87 and the accompanying controller are configured to maximize the efficiency of memory usage through a unique address management scheme, which is illustrated by the following example. Furthermore, although this example of a memory management configuration is illustrated with respect to cFAP 87, it can be effectively applied to various alternative memory systems.

For example, upon initialization of cFAP 87, BIST is conducted on the memory address locations within the memory unit corresponding to the memory address locations resident within cFAP 87. If the BIST finds any errors or defects in the memory structure tested, then the memory address corresponding to the bad unit of memory is returned by the BIST. Thereafter, PMMU 70 removes this memory address location from the cFAP 87, so that PMMU 70 does not access the bad memory unit during normal operation. As such, the efficiency of SOC 10 is increased, as packet flow errors as a result of corrupted data being returned from bad memory location are minimized. Furthermore, replacement overhead is minimized, as a single BIST error will not render the memory inoperable, as the remaining usable memory locations are still utilized in the present exemplary embodiment.

Figure 39:
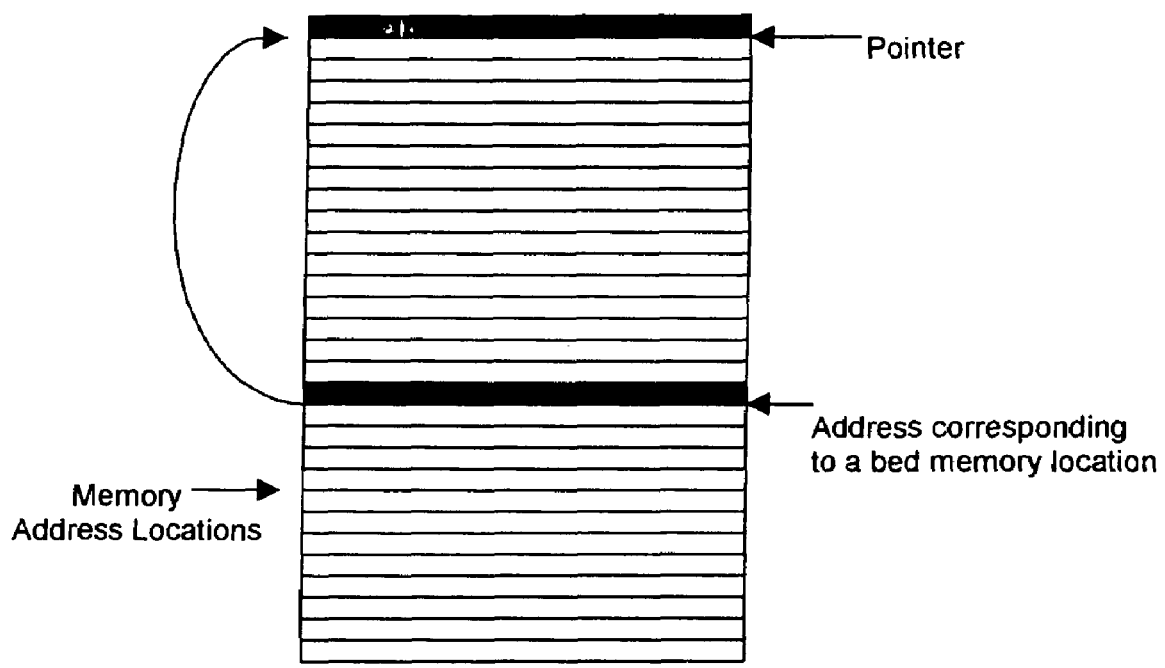
FIG. 39 illustrates an example of the memory management configuration and method.

FIG. 39 is presented as further illustration and example of the memory management configuration and method used within SOC 10. As noted above, CFAP 87 includes a plurality of memory addresses, wherein each memory address corresponds to a physical memory location within the associated memory. Therefore, when a BIST indicates that a memory location within the memory associated with cFAP 87 is inoperable or unreliable, then PMMU 70 essentially removes this faulty memory location from the available list of memory locations for use, which are contained in cFAP 87. As shown in FIG. 39, when a bad memory location is found by a BIST, the address associated with the bad memory location is first located within cFAP 87. Thereafter, this memory address associated with the inoperable memory location is removed from the middle of the table of available memory addresses and inserted at the top of the table of available addresses in cFAP 87. Subsequent to the insertion of the bad address into the top or first slot of the table of available memory address within cFAP 87, the pointer used to indicate the first available memory address is incremented to the next available memory address, which is immediately below the inoperable address just inserted within cFAP 87. Further, this pointer is initialized to return to this position, meaning the position below the inoperable address found by the BIST, when memory is empty and all addresses are available, so that the bad address is no longer accessed. Therefore, when a memory address is requested from cFAP 87, the memory address corresponding to the inoperable memory location will no longer be used be used.

Additionally, cFAP 87 is configured to optimize the read and write operations of memory addresses from cFAP 87I. In particular, for example, cFAP 87 utilizes a last-in first-out configuration to save overhead and increase performance. This configuration is implemented through the use of a stack configuration to store cell free addresses, in conjunction with the stack pointer that indicates the next available address for use from cFAP 87. As such, when an address is requested from cFAP 87, the address that is utilized is the address that the stack pointer currently indicates as valid. Thereafter, the stack pointer is incremented into the stack to the next available address, which would be the address adjacent to the address previously read from cFAP 87. When an address is released, the released address is placed at the top of the stack immediately below the stack pointer. Then the stack pointer is decremented, which moves the pointer below the recently inserted address, to indicate that the address just received back into the stack is now the next available address for use. As such, a last-in first-out configuration is generated in the stack.

However, the present exemplary embodiment of the invention modifies the last-in first-out configuration to further increase the performance of the memory, while also reducing the overhead requirements. This modification includes providing the capability to pass off an address during simultaneous read and write requests. In particular, when an address is released during the same clock cycle in which an address is requested, then the present exemplary embodiment simply passes off the released address to the module requesting an address. As an example of this operation, assuming that a request for an address (a read request) was made during the same clock cycle as a release of an address (a write request), then the cFAP controller is configured to simply pass the released address to the module requesting an address. As such, there is no need to write the released address into the pool and decrement the pointer to indicate that the address is now available, which eliminates multiple clock cycles from the operation. Further, the present exemplary embodiment eliminates the need to read an address from the address pool during this process, as the released address is simply passed off to the requesting module without an address pool read operation and pointer increment operation. The elimination of these steps via the passing off of the simultaneously released and requested address effectively eliminates the clock cycles associated with the aforementioned unnecessary accesses to memory. This elimination of clock cycles both increases the performance of the memory, as well as reduces the overhead necessary to efficiently operate the memory.

Common Buffer Pool Controller (CBP_ctrl 88)

In the present exemplary embodiment, the Common Buffer Pool Controller 88 (CBP_ctrl) module manages CBP 50. It takes requests from SLBM 86 for local storage within CBP 50 of cell requests from the read buffer for transfer of cells, and schedules requests for the reading of cells to go out to an egress. CBP_ctrl 88 has the option of utilizing a first in, first out, (FIFO) operation to write requests to manage any latency between CBP_ctrl 88 and CP bus 100 transactions. CBP_ctrl 88 module is responsible for the transfer of data to and from SDU 92, SLBM 86, and CRRU 98. Because of the tremendous bandwidth requirements, CBP_ctrl's 88 sole purpose is to optimize CBP 50 bandwidth. CBP_ctrl 88 also deals with any nuances (such as 2 clocks latency, dead cycle insertion etc.) to the CBP RAM itself, and other modules are not affected by these actions.

CBP_ctrl 88 utilizes the core clock of SOC 10 and interfaces with two write FIFO's and one read FIFO. Further, CBP_ctrl 88 is configured to control the random access memory of CBP 50. Depending upon the CBP 50 random access memory specification, CBP_ctrl 88 has to fully optimize the bandwidth of CBP 50. CBP_ctrl 88 is designed to interface to a command FIFO (8 deep) and 3 external data FIFO's. Commands and data are pre-loaded, and the CBP_ctrl 88 strictly optimizes the transfer of data, working in any nuances, such as 1 clock dead cycle on W->R, if needed, or a 2 clock latency on data. This module is a cornerstone for the ability PMMU 70 to accept writes from an ingress, SDU 92, and reads to CRRU 98 every clock cycle. CBP_ctrl 88 also includes three FSM's. First, an arbiter FSM that is responsible for placing requests into the command queue, in a prioritized fashion; second, an address FSM that is responsible for the issuance of addresses and control signals to CBP 50 in an optimal fashion; and third, a data FSM that is responsible for "moving data", selecting mux's that go to the write data input, and asserting all the representative increment and decrement pulses.

Cell Disassembly Unit (CDU 90)

The primary function of the CDU 90 module in the present exemplary embodiment is to convert the CBP Cell format back into the CP bus format. Therefore, CDU 90 generally accomplishes the inverse function of CAU 85. CDU 90 takes the entire cell header and cell data, reformats these two elements as a combination, and sends the combination out on CP bus 100 in accordance with instructions from the arbiter. This is the reply phase of a transaction request by an egress. It is also the final phase of the MMU data path, as the packet will be free of PMMU 70 control upon reaching CP Bus format and being made available to CP Bus 100 for transfer by the arbiter. CDU 90 also is responsible for decrementing the ingress cell budget that affects the ingress back pressure warning/discard messages. In order to maintain the speed and bandwidth requirements of SOC 10, CDU 90 is configured to process 1 word every 4 clock cycles in the present exemplary embodiment.

Slot Assembly Unit (SAU 91)

The Slot Assembly Unit 91 (SAU) is responsible for pulling cells out of CAB 89 and forming slots that will go to the SDRAM (external memory GBP 60) as a large block. SAU 91, for example, has the ability to send 1-16 cells per slot and will chain 1-16 slot's per GPID. In order to maintain speed and bandwidth requirements of SOC 10, SAU 91 pulls data from CAB 89 every other clock cycle, and writes to SDRAM controller 96 every other clock cycle. Therefore, for example, SAU 91 may read/pull data on even clock cycles, while writing/pushing data on odd cycles, in order to maximize the available bandwidth.

Slot Disassembly Unit (SDU 92)

SDU 92 is responsible for the inverse function of SAU 91, specifically the reading of slots from 60 via the SDRAM Controller 96 and sending them to CBP 50. The SDU 92 parses through the slot and recognizes the beginning and end of packets in the slots, and sends all CPID's to the PPP. SDU 92 in the present example is driven by a 32 deep command FIFO, when can be varied in size, that sets up the order in which SDU 92 should read slots back from SDRAM/GBP 60. SDU 92 will keep track of the 32 first slot pointers (FSP) and next slot pointers (NSP) for each egress, and what position within the slot chain the process is currently operating. SDU 92 operates on the core clock frequency of SOC 10, and writes to CBP 50 every other clock cycle (on even clock cycles, for example) and reads from CBP 50 on the alternative clock cycles (on odd clock cycles, for example).

Transaction Queue Controller (Xq_ctrl)

Transaction queue controller is configured to manage the transaction queue for the specific egress that it represents. In the present example, XQ_ctrl takes requests to write a CPID or GPID to the transaction queue and reads/writes the 2 k×18 XQ_RAM appropriately. The Transaction queue controller is re-instantiated on a per-egress basis, and supports, for example, up to 8 COS levels. A feature of this "FIFO" is a "decrement ->(then) read" policy. This is to prevent having to use 8 registers per COS. Since only one entry in the transaction queue is worked on at a time, this is reasonable. Each transaction queue has 8 COS's, and thus, the read/write pointers can point to 8 different locations. The transaction queue depth can be, for example, equal to 2 k entries divided by the number of COS's that it is supporting. Thus if the XQ_ctrl is supporting all 8 registers on a given egress, then it will have 256 entries per COS. The BCBitmap that is sent to us with the first cell of a packet is used as a chip select for the transaction queues. SLBM 86 and SAU 91 both write the transaction queues, however, for ordering issues, the writes of the respective modules are generally not overlapping. If an egress port is currently rerouting, the write operations to that transaction queue will come from SAU 91, and not from SLBM 86. Likewise SAU 91 will generally not write to a transaction queue that is not currently rerouting.

The COSPtrCtrl module in the present example is responsible for the FIFO pointers, which eventually become addresses to an SRAM. It is statically sized to adjust for tradeoff's between the maximum number of COS's and the transaction queue depth. It also takes preallocation and deallocation requests to give back a "stop accepting" notice and a "virtually full" notice to SLBM 86. The distinction between these two signals is that the "stop accepting" is asserted when PMMU 70 is a "skidmark" transaction away from being "virtually" full. It is then de-asserted when PMMU 70 is 2 skidmarks away from being "virtually full." Virtually full is used by SLBM 86 to ascertain the status of the transaction queue, thereby deciding whether or not to modify the BC/MC bitmap. If a transaction queue COS is full, SLBM 86 will mask off the BCBitmap bit that would otherwise send additional data to the already full transaction queue. This is a secondary mechanism for preventing data overload at the transaction queue, as the ingress should stop sending more packets to this egress after the "COS Status" message goes out with that bit set. The consequences of that message not getting to the ingress in time, or PMMU 70 not sending it in time can be significant, as this situation could result in a lost "chain" in memory. The pre-allocate & de-allocate logic is used by CAB 89 to ensure that a transaction queue entry is "saved" for it. Once the GPID has been written into the transaction queue by SAU 91, it can then de-allocate one entry. Writes to any single transaction queue can come at a maximum rate of one write instruction per 4 clock cycles. However, there are 2 sources for the transaction queue writes, SAU 91 and the SLBM 86. Thus, writes to non-overlapping transaction queues can occur back to back. Read operations occur independent of the write operations, and thus can occur in the same clock cycle. In such a case, there will be a 1 clock delay on the ReadAck signal back to Egress Scheduler 94.

Egress Scheduler 94

In the present exemplary embodiment, this module is responsible for passing a "token" around in a token order to a scheduler for each egress manager to take a request to move a packet from either GBP 60 or CBP 50 into the PPP for that egress. For example if egress port 3 has a packet ready to go, and the token comes around, egress port 3 makes a request to the transaction queue to get the next packet for this port. Upon seeing the packet ID and the associated status of global or local, Egress Scheduler 94 then issues a write request to the PPP to take that pointer, if it is a CPID, or hands a GPID off to SDU 92. If a GPID is being processed, it will issue a slot retrieval request every time a token is passed to it. The use of a token/token order is for handling the transmission rate disparities among the respective egresses. For example, the Gigabit ports 30 will get the token 10× as often as the FE ports 20, as the Gigabit ports operate to transfer data at 10 times the rate of the Fast Ethernet ports. Further, Egress Scheduler 94 includes two primary submodules. First, a COSArbiter, which is responsible for deciding which COS gets serviced next within a given egress, and sending Read Requests to the transaction queue. Within the COSArbiter is a COSArbiter_fsm (x8), which is configured to manage Low Priority and High Prioritay Requests, as well as determine when to decrement the transaction queue. For example, a GPID request to SDU 92 involves many Req/Ack transitions. High priority requests are used when the COS latency timer has expired for this COS. Low priority requests will stay active for a given COS until the maximum packet requirement has been met. The token manager determines the "rate" at which things get scheduled. If an Egress Scheduler 94 is not requesting, the token is passed in the next clock. If an Egress Scheduler 94 is requesting, it is 4 clocks to decrement, then transfer the packet to the PPP. The worst case bandwidth requirement is the all egresses have minimum size packets (thus one CPID per packet) and thus one CPID per 8 clocks is transferred. Also within COSArbiter is a COSPriority Encoder (x1), which is the priority encoder for the 8 levels of COS. This is a 16 bit encoder, wherein the top 16 are for high priority and the lower 16 are for the low priority. This way a COS0 request that has had a latency timeout, will get priority over a COS7 request that has not had a latency timeout. Second, COSArbiter includes an Egress Token Manager (x1), which operates to take in 32 tokens and hand out 32 tokens. All egresses require a "token" in order to pass a CPID from the transaction queue to the PPP, or to make a GPID or slot request to SDU 92. The Egress Token Manager is designed to pass the token to the Gigabit ports 10 times more often in order to maintain the desired flow within SOC 10. The token manager determines the "rate" at which data is scheduled to flow in or out of SOC 10. If an ES is not requesting, then the token is passed to another scheduler in the next clock cycle. If an ES is requesting, it takes 4 clock cycles to decrement the representative count, and then transfer the packet to the PPP. In the worst case bandwidth requirement, all egresses have minimum size packets, and therefore one CPID per packet. Therefore, one CPID should be transferred for every 8 clock cycles. Further, Scheduler 94 includes 4 FSM's: first, a COSArbiter FSM; second, an Intercept FSM that intercepts tokens and proportionally distributes them to the Gigabit ports according to the data transfer rate of the port; third, a Token Manager FSM, which initiates requests when Scheduler 94 has a token; and fourth, a GPID Manager, which interfaces with SDU 92 and requests slots and or GPID's.

Packet Pointer Pool Controller (PPP_ctrl)

PPP_ctrl's primary function is to manage the PPP RAM. PPP_ctrl takes write requests from Scheduler 94 and SDU 92 for storage of the FPP and also read requests from CRRU 98 for taking the FPP. However, all requestor's, namely the ESWrite31x0, SDUWrite31x0, & CRRURead31x0 in the present example, have at most one bit active at a time. Therefore, all requests are treated independently, and subsequent requests will typically be at most every 4 clocks. PPP_ctrl is also responsible for storing all 32 read/write pointers for the PPP. Each pointer points to the beginning of a packet linked list. SDU 92 and Scheduler 94 blocks will write at an appropriate rate corresponding to the rate at which the acknowledge signals return, and likewise CRRU 98 will read at an equivalent speed. PPP_ctrl will have shallow FIFO's around it to absorb any transient bursts in requests from other modules. However, in order to meet the speed and bandwidth requirements of SOC 10, PPP_ctrl is configured to service a read request every 8 clock cycles and 2 write requests every 8 clock cycles, all of which are independent events. However, the PPP_ctrl can theoretically operate as fast as the acknowledge signals are received, and therefore, performance of SOC 10 is generally not affected by PPP_ctrl's operation. Further, PPP_ctrl includes three FSM's: first, an Arbiter_FSM that is responsible for placing requests into the Command Queue; second, an Address_FSM that is responsible for the issuance of addresses and control signals to CBP 50; and third, a Data_FSM that is responsible for moving data, selecting multiplexers that go to the wr_data input, and asserting all the correct Increment and decrement pulses.

SDRAM Scheduler 96

The SDRAM Scheduler 96 in the present exemplary embodiment is responsible for taking requests from a number of sources, for example, SAU 91, SDU 92, SFAP 97, and the Refresh requestor. These requests are processed and sent out to the SDRAM. As such, SDRAM Scheduler 96 must interface between SAU 91, SDU 92, and SFAP 97, which is accomplished through a synchronous interface. The function of SDRAM Scheduler 96 is to arbitrate and schedule requests from these three units. Although order is preserved in processing requests from SAU 91, SDU 92, and SFAP 97, there is some degree of flexibility in the logic controlling SDRAM Scheduler 96 to select which request from the aforementioned units is processed next. More particularly, the logic governing the operation of SDRAM scheduler 96 attempts to minimize and/or optimize the overhead requirements of the module by considering predetermined factors in accessing the memory. Examples of these could factors include, switching between read and write accesses, wherein the switching occurs within in a four-clock overhead per read/write pair. Another example would be to minimize when a row miss occurs in the same bank, which results in excessive overhead usage, generally in the range of approximately five clock cycles plus read/write overhead. Further, the logic attempts to maximize row hits, as row hits utilize the least overhead. A portion of this optimization process is similar to logical speculation on the part of SDRAM Controller 96, as for any slot read operation, it may be necessary to write back an updated copy count, and the logic will not know this until after the read has actually been initiated.

In addition to considering overhead factors, SDRAM Controller 96 considers the priority designation of the requests and/or the associated data in accessing SDRAM. For example, if all of the requests from SAU 96 get filled, then SDRAM Controller 96 can put a higher priority on writing to SDRAM, which will mitigate the possibility of dropping packets as a result of not enough write operations to SDRAM. The SDU going empty is less of a priority, as generally no packets are dropped in this case. SFAP 97 is generally implemented as a stack. If at any time, SFAP 97 needs to both read and write the SDRAM at once, then the pointers will be copied over internally, which renders SFAP similar to a single-level command register.

In operation in the present example, SDRAM Controller 96 functions as an arbiter for read and write operations to global memory 60. However, SDRAM Controller 96 must process requests for access to GBP 60 from a number of sources, as noted above. Therefore, in order to maximize the efficiency of each memory access, SDRAM Controller 96 essentially pre-plans its accesses. In particular, SDRAM Controller 96 reviews the current requests and determines which of the requests can be processed together in order to minimize overhead. For example, if Controller 96 is receiving simultaneous requests from SAU 91, SDU 92, SFAP 97, and the Refresh requester, then Controller 96 looks at the first request received and determines the clock overhead cost associated with processing this first request alone. Then Controller 96 looks at each of the remaining requests and determines the overhead cost associated with processing each individual request in conjunction with the first request received. Thereafter, Controller 96 selects the request that can be most efficiently paired with the first request received, and processes this request in conjunction with the first request received. As such, two requests are processed within the overhead generally associated with a single memory access, as the second request is essentially processed within the shadow of the first request for purposes of clock overhead. Further, Controller 96 is capable of utilizing this method to group a plurality of requests together using the same method for processing under a single clock overhead, which obviously increases the efficiency of Controller 96.

Figure 22:
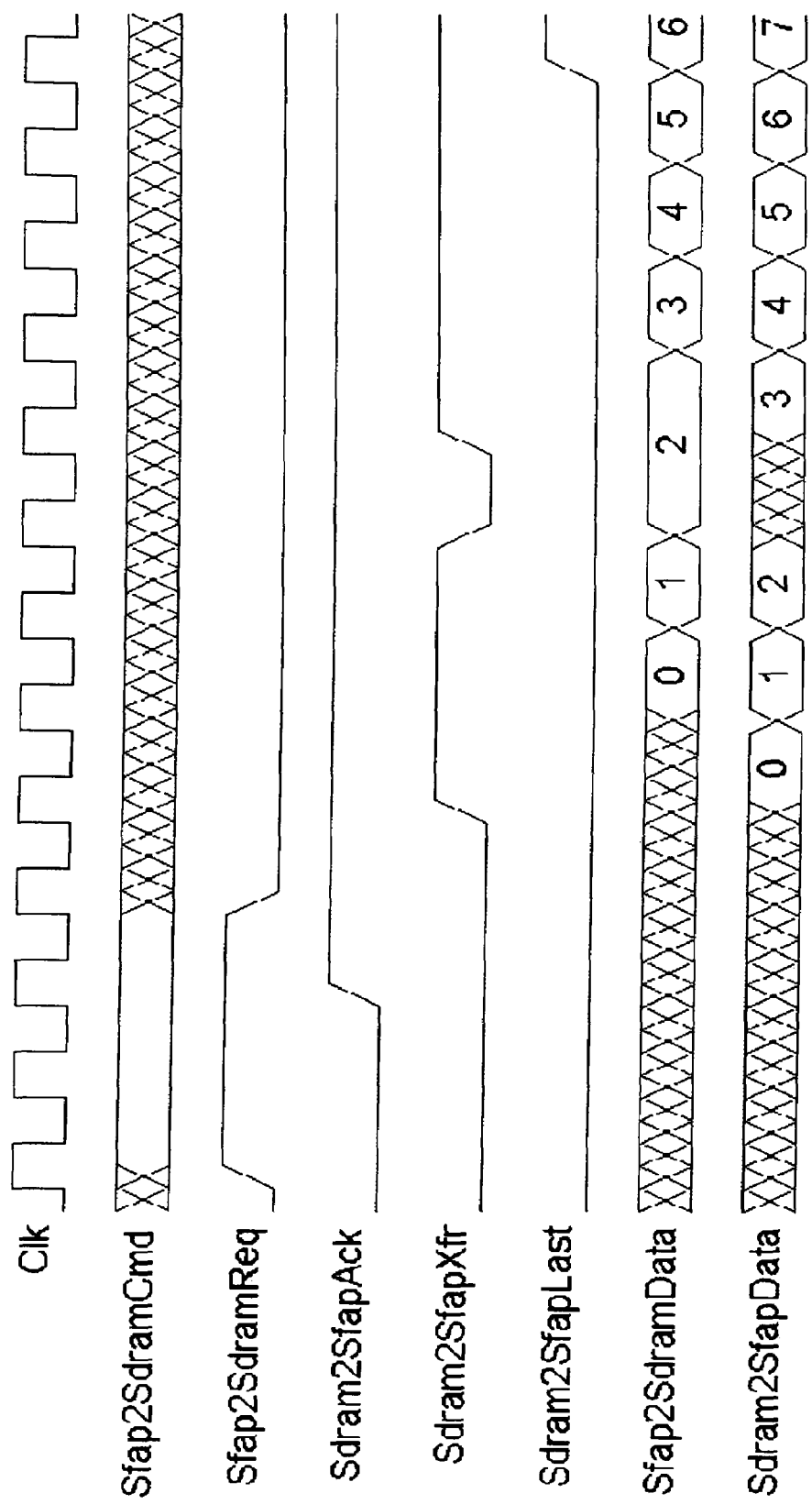
FIG. 22 is a timing diagram for the SFAP to the SDRAM Scheduler.

With regard to timing issues, SFAP 97 will activate its request signal during the same clock that SFAP 97 makes a command valid, as shown in FIG. 22. Eventually, the SDRAM Controller 96 will reply with an Ack signal. This may be a few hundred clock cycles, if Controller 96 is dealing with a priority situation with the SAU's or other modules. While waiting for the Ack signal, the SFAP 97 can continue to access its internal SRAM. Once the Ack signal is returned to SFAP 97, it needs to switch off its internal SRAM accesses. In a minimum of two clocks after Ack goes active, Xfr will go active initiating a read or write transfer of eight words with the SFAP 97 internal SRAM. Due to clock speed differences between the SOC 10 and SDRAM, there may be one or more idle clock cycles during this transfer. During any idle clocks, transfer will be inactive, as Ack remains active.

In the present example, SAU 91 write requests and SDU 92 read requests will be queued in a six-deep FIFO. This configuration allows one command for each half of each SAU 91 and SDU 92 present. The format for SAU 91 and SDU 92 numbers, one of three is selected for the transfer. 00 selects "A", 01 selects "B" and 10 selects "C". The timing of these SAU 91 and SDU 92 commands to THE SDRAM Scheduler is fairly simple. There are enough command entries in the FIFOs to allow one command to be queued for each half of each SAU/SDU, so there is no need for a "full" signal to indicate the FIFO is full. The Sau2SdramReq and Sdu2SdramReq signals go active to indicate a command is ready on the Sau2SdramCmd or Sdu2SdramCmd bus respectively.

The SDRAM Controller 96 addresses SAU 91 and SDU 92 blocks using a 9-bit address bus in the present exemplary embodiment. This bus selects which SAU/SDU unit (A, B or C) as well as the one of 24 312-bit words within the SAU/SDU, then one of three 128-bit subwords within the word. The same refer to the "SAU to SDRAM" and "SDRAM to SDU" timing diagrams, which are shown as FIGS. 23 and 24 respectively. When reading from the SAU, Sdram2SauAddr is driven valid and Sdram2SauRd goes active to read a 128-bit subword on the Sau2SdramData bus. This data is available one clock after Sdram2SauAddr becomes valid. During the same clock that the last sub-word is addressed, Sdram2SauLast will go active to inform the SAU logic this buffer is again available for filling.

Figure 23:
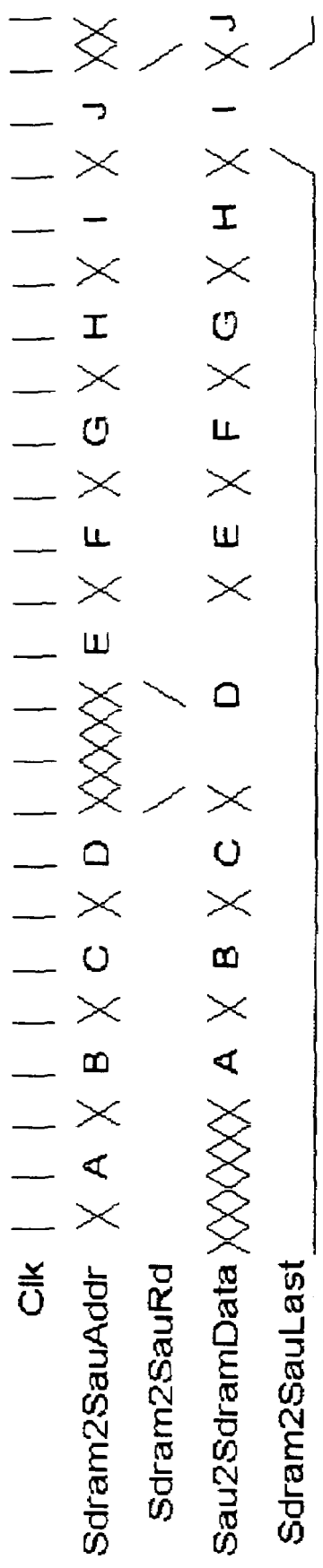
FIG. 23 is a timing diagram for the SAU to the SDRAM Scheduler.
Figure 24:
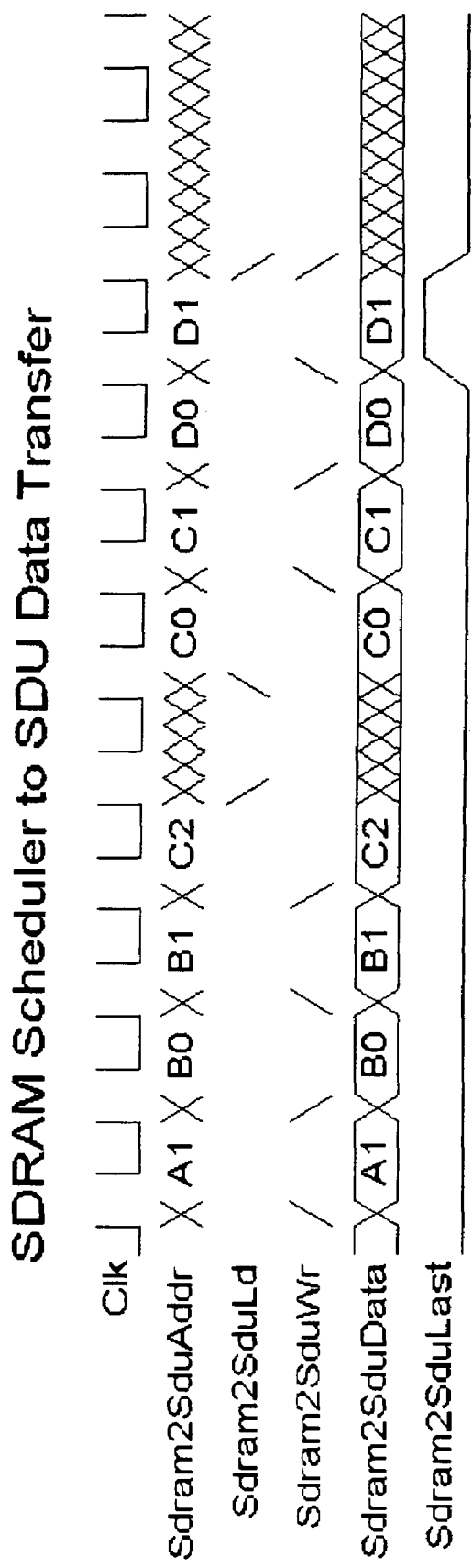
FIG. 24 is a timing diagram for the SDRAM Scheduler to the SDU.

When writing to SDU 92, Sdram2SduAddr is valid during the same clock cycle that a valid sub-word is present on Sdram2SduData. Between one and three sub-words can be written to any SDU word, depending in the cell length. The SDRAM scheduler provides two signals to control this latch and write function, so that read-modify-write logic in the SDU can be avoided. Sdram2SduLd goes active with each sub-word, then Sdram2SduWr goes active on the last sub-word, indicating that the assembled complete word should be written to SDU 92. A last signal (Sdram2SduLast) is also provided to indicate the final data transfer. Referring specifically to FIGS. 23 and 24, it is shown, for example, that the "C" word being written will first contain the side-band data bits (sub-word 2), followed by cell data bytes 15-0 (sub-word 0) then cell data bytes 31-16 (sub-word 1). Sdram2SduWr goes active during the C1 sub-word to request the SDU logic to write the completed word.

The interface between Scheduler 94 and SDRAM Controller 96 is asynchronous. Commands are passed in a four-entry asynchronous FIFO. Each data transfer takes at least two SDRAM words, as the minimum sized cell in a one-cell slot would consist of one word of side-band data, and one word containing cell data. With complete two-clock synchronization both directions, it takes six clock cycles of the internal clock of SOC 10 for one stage of an asynchronous FIFO to turn around. Therefore, three FIFO entries are generally used for the command FIFO. A fourth command FIFO entry is used to facilitate pipelining the top of FIFO command with the one already in progress in the SDRAM controller. The SDRAM clock will be asynchronous to SOC 10's internal clock, and running at a lower frequency.

There are separate FIFOs for SDRAM writes and reads, each of which are four levels deep. However, if a full handshake protocol were needed on both ends, six levels would likely be necessary. However, there is no full handshake needed on the SDRAM controller 96 side, as the data is pre-fetched and the associated memory space is pre-allocated.

The SDRAM Scheduler needs to keep a record of read and write commands so it can match up the FIFO data with its source or destination. Read and write transfers happen at different times, so there is generally a separate command tracker for reads and writes. Each tracker is six entries, as this is enough to cover all four command FIFO entries, plus the current command in progress at SDRAM Controller 96, with one extra entry remaining. As such, the possibility of a tracker overflowing is minimized. The information maintained consists, for example, of only two bits. The SDRAM scheduler combines commands from the three sources noted above into a single command format for SDRAM Controller 96. Part of the scheduler's function is determining "same" or "different" bank, and row "hit" or row "miss." Therefore, SDRAM scheduler must know the SDRAMs organization and be able to split row and column addresses.

Figure 25:
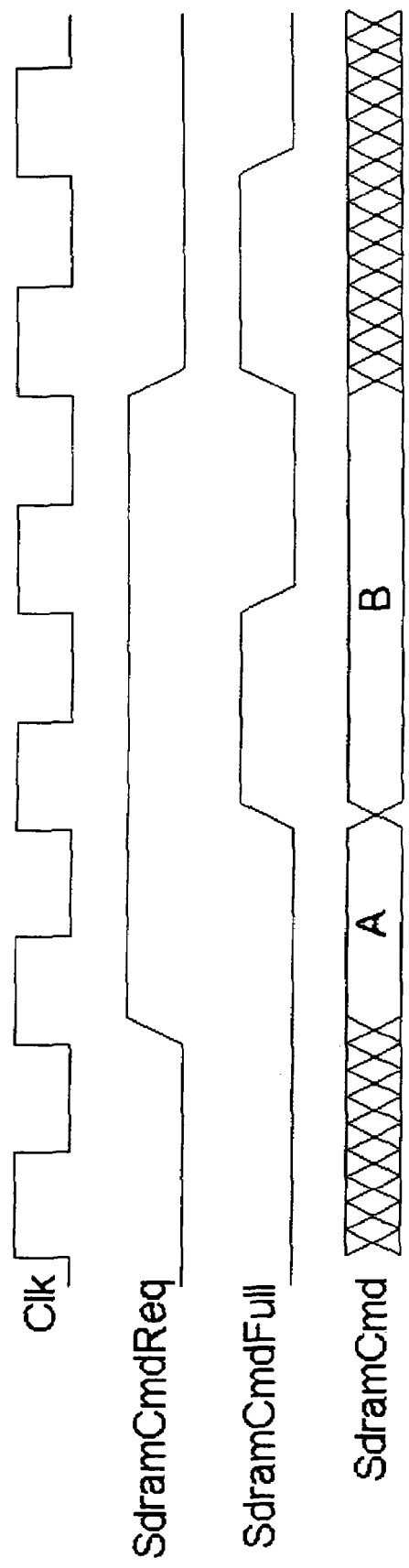
FIG. 25 is a timing diagram for the SDRAM Controller interface.
Figure 26:
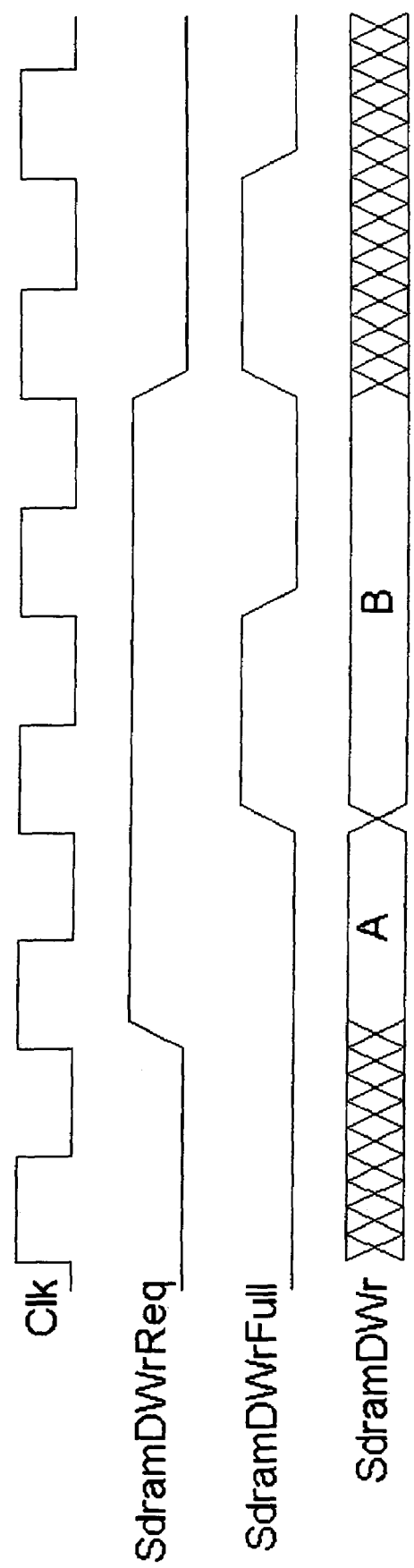
FIG. 26 is a timing diagram for the SDRAM Controller DATA Write FIFO.
Figure 27:
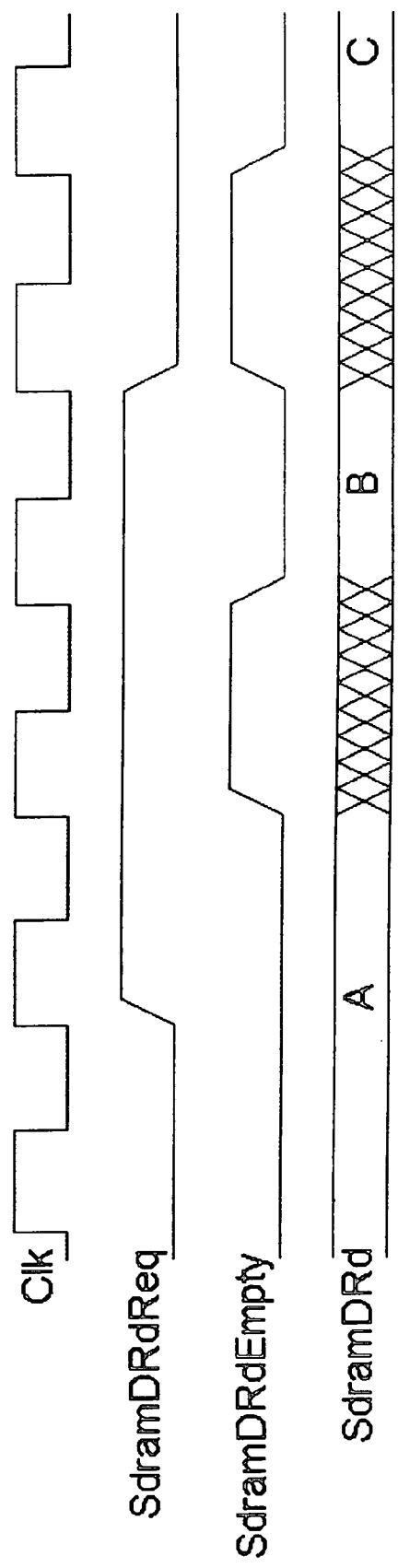
FIG. 27 is a timing diagram for the SDRAM Controller DATA Read FIFO.

The timing of SDRAM Controller 96 is illustrated in FIGS. 25, 26, and 27. FIG. 26 illustrates the timing of writing commands to SDRAM Controller 96. When a command is ready to be written, SdramCmdReq is activated, and the SdramCmd bus is driven. Then the logic checks to see if SdramCmdFull is active. If it is, the logic holds Req active and Cmd valid while waiting for another clock cycle in which the Full indicator is inactive. If the command FIFO is not full at first, then command "A" is written, which fills the FIFO. One clock cycle later, the FIFO is not full, and command "B" is written. Command "B" fills the FIFO again, but there are no new commands ready so Req is driven inactive.

Therefore, the timing for writing data into the Data Write FIFO is similar to the processes associated with writing the command FIFO, which are noted above. However, the processes associated with reading data from the Data Read FIFO is different from the aforementioned processes. When reading data, SdramDRdReq is activated, while waiting for SdramDRdEmpty to be inactive, as shown in FIG. 27. During any clock cycle that Req is active, and Empty is inactive, the SdramDRd bus will contain valid data read from the SDRAM. Using this timing scheme, data word "A" is available immediately upon Req going active. Words "B" and "C" are available after a one clock cycle dead time.

A cell can occupy one or two words on the bus between SLBM 86 and CAB 89, depending on the length of the particular cells, and the bus is 312 bits wide in the present example. If the length is 25 bytes or less, generally one word is enough, otherwise a second word is needed. The first word contains all side-band information, in case the second word is missing. FIG. 28 illustrates the first and second word formats.

With regard to the bus between SAU 91 and CAB 89, as data is taken out of CAB 89, the BC/MC Bitmap, Untagged Bitmap, and COS fields are removed and are copied into the transaction queue. The data bytes in SAU 91 are arranged differently, to more closely match the SDRAM format. The first SAU word of a cell contains data for the first three SDRAM words, and the second SAU word, if present, contains data for the fourth and fifth SDRAM words. There are 32-bits of sideband data for each cell in the present example. According to the logic of CAB slot filling, all cells in a slot are going to the same destination egresses. This means that the copy count on all cells in a slot will theoretically be identical. For this reason, PMMU 70 can safely put a common copy count in a uniform place in the first word of each slot, and thereafter, simply use the common copy count for the first cell and any subsequent cells. However, the SDRAM interface of the present invention compresses slot data to take the least amount of 128-bit SDRAM words. A two bit "Cell Size" field in the 32 bits of sideband data indicates how many words the cell will take. FIG. 29 illustrates number of words within SAU 91 and SDRAM that correspond to four possible two bit cell sizes. The second word only contains bytes 63-32 of cell data, and the "copy count" field is only valid for the first cell in a slot, as shown in the SAU word format illustrated in FIG. 30.

In the bus between SAU 91 and SDRAM, subsequent words each contain up to 16 bytes of cell data, if present. The slot size, which is defined as a precise count of the number of SDRAM words used in this slot field, is added as the slot is written to SDRAM.

When multiplexing data for SDRAM, attention is needed to make sure the cell data bytes are sent in the correct order. Specifically, for example, the sideband bytes are sent first (coming from bits 256-292 of the first SAU word), followed by data bytes 15-0 (bits 127-0 of the same word), then data bytes 31-16 (bits 255-128). SDRAM to SDU bus/SDU format. The bus is 128 bits wide, per the SDRAM interface, and time multiplexed. Data will be latched inside SDU 92 to put together 312-bit words. The bus is basically in SDRAM format, except the NC Header field replaces Slot Size and Copy Count. A "Release" flag is added to inform the SDU logic that this slot should be released back to the free-slot pointer pool. This is generally set for slots not containing multicast or broadcast cells.

In SDU 92 to CBP 50 bus, which is generally in CBP format, the cell data bytes are split differently. This bus is 288 bits, of which 28 bytes of cell data are in the first word, and the remaining 36 bytes are in the second word. This means four bytes of data from the first SDU word will end up in the second CBP word, but this situation occurs only in instances where cells longer than 28 bytes are present on the SDU 92 to CBP 50 bus.

Packet Flow Within the MMU

Upon completion of the initialization process, assuming that there were no memory failure errors encountered in the BIST test, then PMMU 70 is ready to receive cells. In the present exemplary embodiment, the first cells received from any ingress are generally 4 words long, which corresponds to 512 bits, and all 4 phases of the P Bus should be valid. PMMU 70 has the ability to recognize disparities in cell flow, such as a "no last cell" indicator, and further, PMMU 70 tests for these conditions as a form of maintaining data integrity. Once PMMU 70 begins to receive cells, CAU 85 immediately translates the data coming in off of the CP Bus 100. This translation returns the Cell Header, Cell Data, and the Cell Sideband Busses. As the cell is being received, the source and destination fields (BCBitmap) are used by the next stage in the pipeline. The next stage in the pipeline, as shown in FIG. 20, is SLBM 86. SLBM 86 looks at budget registers, cFAP status, CAB status, SDRAM status, and the transaction queue depth to determine the destination of the packet traveling through PMMU 70. A packets destination can only be evaluated upon completed reception of the first cell, as this information is encapsulated within the first cell. After the destination is determined, this destination must be retained, as the entire group of associated or linked cells forming the assembled packet must be either saved in CBP 50, GBP 60, or the entire group of linked or associated cells must be dropped. This is to avoid mishandling of cells and disordering of cell assembly, as retrieving packet information from multiple memory resources is undesirable. The CurrentlyRerouting Flags in SLBM 86, which are also termed the in progress (IP) flags, are set upon the reception of each first cell within PMMU 70, and are referred to for each remaining cell in the packet. This operation is further discussed in the SLBM section above. Further, upon reception of the first cell, PMMU 70 allocates the appropriate memory space within CBP 50, if this space is available. Then it must be determined whether the cells/packet is to be stored locally within CBP 50 or globally in GBP 60. This determination is made by comparing a predetermined threshold, termed herein a Low Water Mark, with a calculated value. In order to determine if a cell is eligible for entry into CBP 50, the current cell count must be lower than the Low Water Mark, and the Global Cell Count must equal 0. If these two conditions are met in the present exemplary embodiment, then the packet or cells can be stored locally. If not, then the packet/cells must be stored in global memory 60. Once SLBM 86 has determined the storage destination of the packet and made the decision as to which memory address to begin storing the packet in, then SLBM 86 takes the first cell of the packet and stores this cell in CBP 50, if each cell corresponding to the currently transferred packet has been selected for storage within internal memory. If the determination is made to send each of the cells to external memory, as a result of a watermark within internal memory being exceeded, for example, then the first cell and all cells associated therewith are sent to CAB 89 for processing into GBP 60 by SDRAM controller 96. In the case of broadcast or multicast packets, the cell is sent to both, with the BCBitmap and the copycount fields being adjusted to reflect this operation.

If the packet is determined to be eligible for admission into CBP 50, then it has passed through the SLBM flowcharts, which are further discussed herein above, and is written in to the SLBM cell FIFO that goes into CBP 50. However, before writing the current cell into CBP 50, SLBM 86 is required to pre-fetch the next cell pointer (NCP), such that the following cells can be tied or linked to the first cell of the packet. This essentially allows for storage of multiple cells of a single packet into numerous memory locations, while also allowing for an effective and accurate mechanism for reassembling the cells into a single packet identical packet to that which was sliced and stored in memory. For each packet reassembly, SLBM 86 stores a first packet pointer (FPP) and an NCP. As such, upon reassembly, the reassembling module knows where the first cell of the packet is located, as well as where the next cell of the packet is located. Thus, using these pointers, the respective reassembly module can "string together" a plurality of linked cells into a single packet. These pointers are stored for each port on SOC 10, and therefore, in the present exemplary embodiment there are 32 pointers to be stored for each SOC 10. Each additional cell received by SLBM 86 requires the fetching of another NCP from cFAP 87. This process of retrieving and storing cell pointers will continue for each port until PMMU 70 receives the last cell. Once the last cell in the packet is received, PMMU 70 writes the cell to CBP 50 with a void value in the NCP field. Further PMMU 70 writes the FPP to the transaction queue controller, with the G/L flag set to local. Thus, PMMU 70 uses the stored BCBitmap that was stored when the first cell was received to "chip select" the various transaction queues and write the UT bits in to each queue. Further, the transaction queue controller is required to know which COS queue this is going to, which is valid in the first phase of P Bus 81.

CBP controller 88 is responsible for maximizing the throughput of cells to and from CBP 50. Therefore, CBP controller 88 also requires substantial FIFO's. In the present example, CBP controller 88 has an 8 deep command queue that decides SLBM 86 write requests, SDU write requests, and CRRU write requests. These requests can be any length, generally 1-4 words, and stacked into each data FIFO, independent of the command that requests the service. For example, SLBM 86 can insert a 4 word data unit into an SLBM receive cell data FIFO, while the request for service is conducted in parallel. The command queue and the data queue are de-coupled to allow for greater bandwidth efficiency, and as such, SOC 10 of the present embodiment is capable of a true 17+ Gb/s bandwidth utilization our of CBP 50, which is sufficient to keep ahead of the CP Bus 100 bandwidth.

If it is determined that a packet should be sent to external memory, which corresponds to GBP 60, then the first cell is sent from SLBM 86 to CAB 89. At this point, when an external memory storage operation is initiated, SLBM 86 no longer has any responsibility for the present packet, and only notes that the packet is being rerouted to GBP 60. Once the first cell has reached CAB 89, it is stored until enough cells are present to form a "slot." CAB 89 stores cells according to their respective ingress, but "packages" them in accordance with the commonality of the egress port, COS, and the UT tags of the respective packets. The rules for these classifications are further discussed in the CAB section above. However, once enough cells have been collected in CAB 89 to form a slot, then CAB 89 sends a request to SAU 91 to transfer the slot of cells into SDRAM/GBP 60. The present configuration of PMMU 70, for example, generally utilizes 2 CAB's, 3 SAU's, and 3 SDU's for bandwidth and handling the variable CP word length. The SAU's, the SDU's, and the CAB's have a 2× bandwidth requirement, as PMMU 70 must read and write for every cell received, which also justifies the word length of 312 bits.

After SAU 91 has receive the request from CAB 89, SAU 91 performs the same prefetch an store operations as previously mentioned for SLBM 86 relative to FPP and NCP, such that the same "linked list" of cells is created. Specifically, SAU 91 has to store the first slot pointer (FSP), the next slot pointer (NSP), and a status it as to whether or not the entire slot chain (GPID) has been written into GBP 60. However, in order to prevent an out of ordering state, the GPID cannot be written to the transaction queue controller until the entire slot chain has been written to GBP 60. In this regard the SFAP_Controller 99 performs much the same function that the CFAP_controller did. However, SFAP_Controller 99 has but a small portion of the SDRAM/GBP 60 slots cached in the local SFAP memory 97. Consequently, the write request by SAU 91 has to contend with 3 other requestor's for the SDRAM_Controller's 96 attention, which are the refresh request, the SFAP swap requests, and the SDU read request. In a tight bandwidth situation, PMMU 70 will favor write requests from the SAU 91 over the read requests from the SDU 92. Once the entire chain of cells forming a linked list representing the original sliced packet to be stored is written into GBP 60, the GPID is written into the transaction queue with the appropriate COS.

With the entry in the transaction queue at a particular COS, PMMU 70 must "schedule" the cells associated therewith for transmission to the designated egress port(s). The transaction queues can be logically divided into as many COS queue's as desired, on a per port basis. For example, port 3 may support 4 COS's, which makes the "logical depth" of the COS queue=2k/4=512 entries/COS. Likewise, port 5 may have 8 levels, in which 256 entries/COS may be stored. Each ID in the transaction queue, can be a pointer to the external memory/CBP 60 chain that contains 1 to (16*12) cells, or a pointer to the internal memory, that is already resident. The egress scheduler receives and reviews all of the outstanding requests for each COS. There are 32 egress schedulers in the present example, each one being chartered with scheduling the next packet to be sent to the PPP. The determination of which packet of the several that may be resident in each COS queue next to be scheduled is a function of 2 variables, MaxLatency, and MaxPackets. These 2 variables are COS specific (i.e. applicable to generally all egresses) and determine the maximum time that a COS entry is allowed to wait, before it gets a higher request priority, and exactly how many packets we can send from this COS queue, before allowing alternative packets to be scheduled. Assuming that a packet is ready to be sent to the appropriate egress, it is still necessary to arbitrate with the other egress' transaction queue for scheduling the Packet ID to be moved directly to the PPP, if the packet resides in CBP 50, or schedule for retrieval from the SDRAM, if the packet is stored in external memory GBP 60.

The Egress Token Manager (ETM) is the module that passes a token around to each of the 32 Egress schedulers, offering the opportunity for the individual scheduler to move a Packet ID from the transaction queue (if local) into the PPP, or to request a slot retrieval from SDU 92. Two of the ports are Gigabit ports, and in an effort to minimize buffering, the Gigabit ports receive the token 10× as often as the Fast Ethernet ports. Once the appropriate egress scheduler has the token, the output of the transaction queue is directly connected to the PPP or the SDU 92. In the event of a local ID, it is written directly into the PPP. In the event that it is a global ID, SDU 92 is now charged with retrieving the GPID, one slot at a time.

Once the token is passed, the egress scheduler and the SDU 92 engage in an interaction. The ES makes a GPIDRequest, to which the SDU 92 will eventually respond with a GPIDAck, or a SLOTAck In the event of a GPIDAck, the Slot that came back was the last in the chain (which may also be the first). In the event that a SLOTAck is returned, the SDU stores the NSP. When the ES gets the token again, it makes a SLOTReq, in leui of a GPIDReq, and the interaction between the SDU and the ES continues (with SLOTReq and SLOTAck) until SDU 92 has reached the end of the chain and returns a GPIDAck. At this point the ES can "retire" the transaction queue entry and move to it's next Packet ID for transferal to the PPP. The SDU 92 receives GPID requests from 32 egress schedulers. It has a command queue depth of 32, which corresponds to one queue for each ES. It takes in GPID requests and writes the FSP into a table, indexed by the port ID. At the other end of the queue, read requests are being made by SDU 92 to retrieve slots from the SDRAM Controller 96. Once the data is returned, the SDU parses through the Slot and breaks the data into cells. SDU 92 stores the NSP, if this is not the last Slot in the chain, and then transfers these cells back into the CBP 50 through the SDU cell buffer, and writes any complete CPID's into the PPP. If it is the last slot in the chain, SDU 92 will return a GPIDAck. If it is not the last slot in the chain, the SDU 92 will return a SLOTAck to indicate that there are more slots in the chain and that the ES should return with a SLOTReq the next time it gets the Token. It is in this fashion, that the SDU is able to minimize the latency that any Egress will incur in receiving packets.

The PPP is divided into 32 logical partitions, each having a physical maximum of 64 entries. Each port has a programmable option to make the logical maximum number of entries to be 8, 16, 32, or 64, based on a 2 bit input (per port). The next to last stage in this pipeline of operations is the Cell Retrieval and Reclaim Unit 98. This module is responsible for looking at the PPP empty flag and scheduling cell retrievals from CBP 50. The Egress has to pull cells from the PMMU 70, so this is managed through a simple single bit I/F wire that pulses high once per clock edge for each cell that it wants. Again, a token manager monitors all the egress cell counters, validates that there are entries in the PPP pool, and verifies that the token manager is able to accept the entries. With the token at this procedural point, a read request is sent to CBP 50.

With the cell scheduled for reading, concurrently, is the read access to the Copy Count Pool. If the value in the pool is equal to one, then the cell is transferred back to the cFAP controller to return the address back for reclamation. At this point the process is rejuvenated. Once the cell is sent to the CRRU Cell FIFO, CDU 90 will pull the data out of the CRRU Cell FIFO and convert the Cell format back into the CP bus format. The CRRU will also "pick off" the LC bits and the NCP in order to keep track of where in the cell chain each egress is at. Once the CDU has the cell, it is sent to the eress and the MMU has completed its operation relative to that particular cell.

Error Detection

As noted above, PMMU 70 operates to detect packet transfer and memory errors. When an error condition is detected, or alternatively, when the Ingress tells us to purge the current packet, PMMU 70 handles the operations associated with purging the packet and returning the system to normal operation. Assuming that a purge packet request generated by the ingress was received after the majority of the packet has been stored in CBP 50 or GBP 60, PMMU 70 prematurely terminates the packet. This is accomplished by setting the LC and P bits in the header. If the entire packet is already residing in local memory, then the FPP is sent to the CRRU block, where it is stored in a reclaim queue. If the packet is resident in external memory, then the cell will go out to the SDRAM with the LC and P bits set, and the GPID will still be assigned to the transaction queues. However, when SDU 92 brings the slot(s) back in, it will recognize the P bit has been set in the cell header and instead of putting the FPP into the PPP, it will send it to CRRU 98. Using this configuration and method of operation, there exists a small, but finite chance that the reclaim queue can become overcongested, at which point PMMU 70 must stop all Ingress traffic. This is evidenced by a STOP request to the CP arbiter that will stop granting Ingress Requests. PMMU 70 is configured to prioritize reclaim requests over rgress requests. Under these circumstances, the egresses and the ingresses could under-run and overrun respectively. The ingress should apply its own back pressure mechanism if it detects an overflow condition, in order to prevent a perpetual, positive feedback condition. This condition is exacerbated when the ingress overflows, it has to terminate the packet, causing more reclaim requests, causing more STOP requests to the arbiter.

In these situations, PMMU 70 will detect/generate parity (checksum) on a per slot basis. As the slot goes into SAU 91, a checksum is generated in the slot header. A checksum is used to allow modification for the copy count manipulation. As the slot is pulled out of the SDRAM/GBP 60, SDU 92 does a check on the data & checksum. If there is an error, the CPU is notified via the S-Bus message "Memory Failure Notification" and it is then under software control to handle the error. A CPU response might be to communicate to the Egresses to simply flush all of the packets it receives for a predetermined time period, which would correspond to the maximum time required for flushing a transaction queue.

During packet processing, PMMU 70 is also configured to implement temporal and spatially based flow control within SOC 10. For example, if a particular egress port is receiving an excessive number of cells for transmission, then PMMU 70 is configured to implement a combination of temporal and spatial flow control methods to remedy the overcrowding at that particular egress port. This overcrowding situation generally occurs when a Gigabit port is acting as an ingress for packets destined for egress on a normal Ethernet port, as the Gigabit port can fill an egress queue at a rate 10 to 100 times faster than normal Ethernet ports can clear and transmit packets from the queue. Another overcrowding situation occurs when a number of normal Ethernet ports are receiving packets from a plurality of ports, but all of the packets received from the Ethernet ports are destined for a single egress port. As such, the egress queue again fills at a much faster rate than the egress port can clear and transmit packets from the queue.

Figure 38:
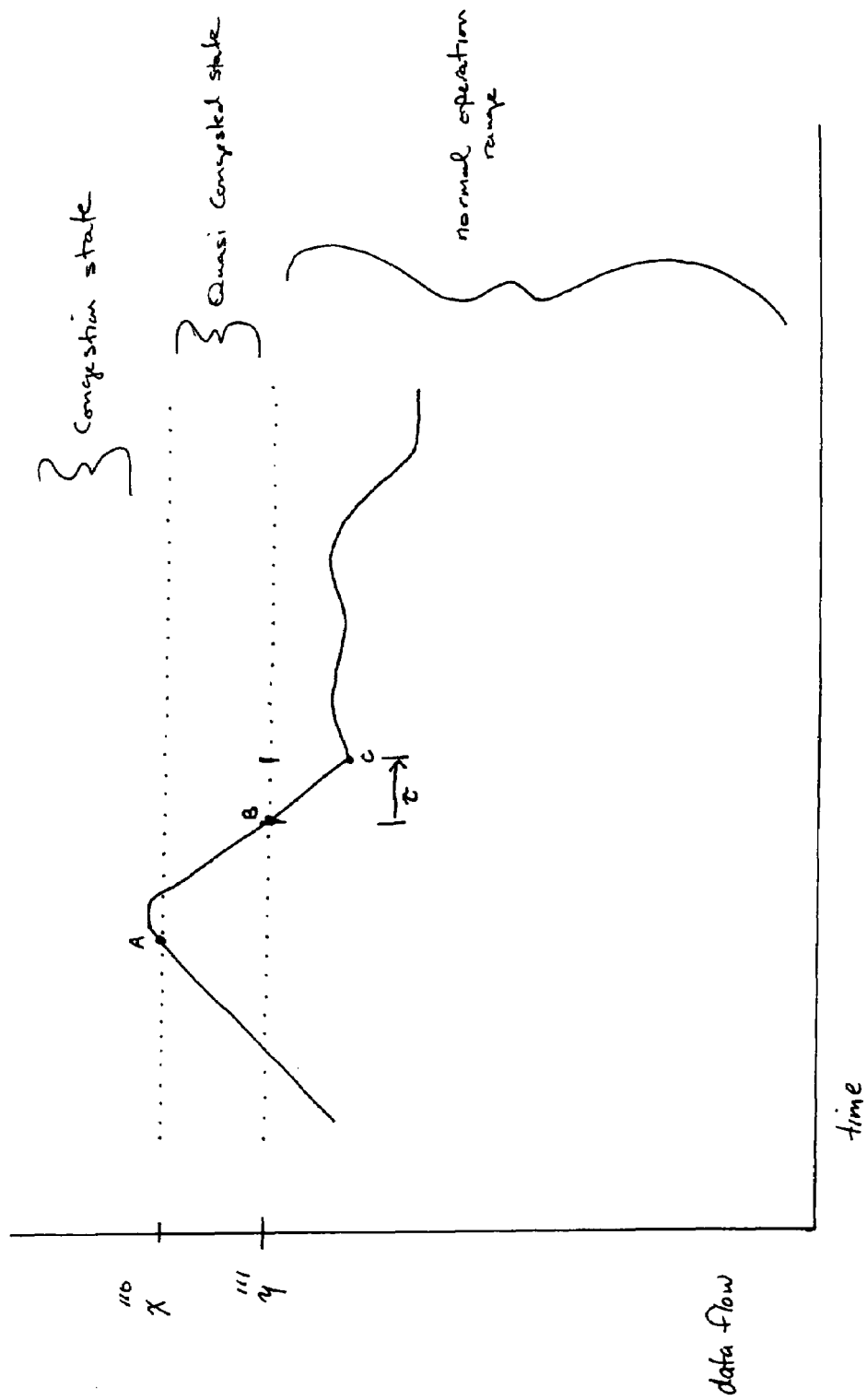
FIG. 38 is an illustration of flow control.

In order to prevent port congestion in these instances, a flow control scheme must be implemented to temporarily "switch off" data flow to a port that has or is becoming congested. Therefore, the first task associated with implementing a flow control scheme is to continually track and/or count the number of packets or cells destined for each port on SOC 10. Further, a first and second predetermined thresholds must be established for each port, wherein the first threshold 110 represents the point at which data flow should be shut off in order to avoid port congestion and the second threshold 111 represents a marker point for reinitiating data flow to the port upon leaving a congestion state. These thresholds are illustrated in FIG. 38. Thus, when an incoming data flow (cells residing in queue for egress) reaches the first predetermined threshold 110, noted as "A" in FIG. 38, then the incoming data flow is discontinued for that port, as the port is approaching the congestion state illustrated in FIG. 38. Subsequently, since the outgoing data flow at the particular egress is still operational, the number of cells residing in queue for this particular egress will decrease, and eventually fall below the second predetermined threshold 111, which is noted as "B" in FIG. 38. When the number of cells in queue for egress falls below second threshold 111 at point "B," then the egress port has essentially returned to the normal operational range, which is illustrated in FIG. 38. After the data flow reenters the normal range at point "B," PMMU 70 waits to reinitiate data flow to the egress for a predetermined amount of time "τ," as illustrated in FIG. 38. Therefore, upon re-entering the normal range and waiting a predetermined amount of time "τ," data flow is reinitiated at point "C." As such, PMMU 70 has utilized a unique temporal and spatial flow control technique, which results in an overhead savings, space savings, gate savings, and reduces the number of dropped packets within a network switch as a result of port congestion.

The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

What is claimed is:

1. A network switch comprising:
   at least one data port interface;
   a first memory;
   a second memory; and
   a memory management unit in connection with said at least one data port interface, said first memory, and said second memory,
   wherein the memory management unit receives data from the at least one data port interface, determines if the data is to be stored in one of the first memory or the second memory, stores the data in one of the first memory or the second memory as a linked list, retrieves the data from one of the first memory or the second memory, and forwards the data for egress,
   wherein the memory management unit further comprises a communication channel and a data input section in connection with the communication channel, and
   wherein the data input section further comprises at least one cell accumulation buffer and a slot assembly unit, the slot assembly unit being configured to receive cells from the at least one cell accumulation buffer and package the received cells into cell slots to be stored in the second memory,
   wherein, when the data is stored in the second memory, global storage of data is initialized and continued until a last slot is stored.

2. A network switch as recited in claim 1, said network switch further comprising
   a status location budget manager in connection with the at least one data port interface, the first memory, and the second memory, for determining if the data is to be stored in the first memory or the second memory.

3. A network switch as recited in claim 1, said network switch further comprising
   a first memory controller for storing data within said first memory and a second memory controller for storing data within said second memory.

4. A network switch as recited in claim 1, wherein said first memory further comprises on-chip memory.

5. A network switch as recited in claim 1, wherein said second memory further comprises off-chip memory.

6. A network switch as recited in claim 1, wherein the memory management unit further comprises:
   a data output section in connection with the communication channel;
   a first memory controller in connection with the first memory, the data input section, and the data output section;
   a second memory controller in connection with the second memory, the data input section, and the data output section;
   at least one address pool in connection with the first memory controller and the second memory controller; and
   a scheduler in connection with the data input section and the data output section.

7. A network switch as recited in claim 6, wherein the data input section further comprises:
   a cell assembly unit in connection with the communication channel;
   a status location budget manager in connection with the cell assembly unit; and
   at least one address pool in connection with the status location budget manager, the slot assembly unit, and the data output section.

8. A network switch as recited in claim 7, wherein the cell assembly unit converts data received from the communication channel into a cell header format, a cell data format, and a sideband information format.

9. A network switch as recited in claim 7, wherein the status location budget manager determines whether data received by the cell accumulation buffer is to be stored in the first memory or the second memory.

10. A network switch as recited in claim 7, wherein the at least one cell accumulation buffer collects data to be stored in the second memory prior to sending the data to be stored in the second memory to the slot assembly unit.

11. A network switch comprising:
    at least one data port interface;
    a first memory;
    a second memory; and
    a memory management unit in connection with said at least one data port interface, said first memory, and said second memory,
    wherein the memory management unit receives data from the at least one data port interface, determines if the data is to be stored in one of the first memory or the second memory, stores the data in one of the first memory or the second memory as a linked list, retrieves the data from one of the first memory or the second memory, and forwards the data for egress, wherein the memory management unit further comprises a communication channel;

a data input section in connection with the communication channel;

a data output section in connection with the communication channel;

a first memory controller in connection with the first memory, the data input section, and the data output section;

a second memory controller in connection with the second memory, the data input section, and the data output section;

at least one address pool in connection with the first memory controller and the second memory controller; and a scheduler in connection with the data input section and the data output section wherein the data output section further comprises a cell disassembly unit in communication with the communication channel;

a cell retrieval and reclaim unit in communication with the cell disassembly unit; and a read buffer and slot disassembly unit in communication with the cell retrieval and reclaim unit and the second memory controller.

12. A network switch as recited in claim 11, wherein the cell disassembly unit converts a cell format from a CBP format to a CP bus format and transmits a cell to the communication channel when enabled to do so.

13. A network switch as recited in claim 11, wherein the cell retrieval and reclaim unit receives egress for cells and schedules cell egresses through the cell disassembly unit in accordance with a predetermined algorithm.

14. A network switch as recited in claim 13, wherein the predetermined algorithm further comprises a token order.

15. A network switch as recited in claim 11, wherein the read buffer and slot disassembly unit reads slots from the second memory and sends the slots to the first memory.

16. A network switch as recited in claim 11, wherein said at least one address pool further comprises:

a cell free address pool connected to the first memory controller; and a slot free address pool connected to the second memory controller.

17. A network switch as recited in claim 11, said network switch further comprising:

a cell free address pool unit in connection with the first memory controller;

a slot free address pool unit in connection with the second memory controller; and a scheduler connected to the first memory controller and the second memory controller.

18. A network switch as recited in claim 17, wherein the cell free address pool unit further comprises a cell free address pool and a cell free address pool controller connected to the cell free address pool.

19. A network switch as recited in claim 18, wherein the cell free address pool controller is configured to receive and release free addresses from the cell free address pool unit for use in storing cells in the first memory.

20. A network switch as recited in claim 17, wherein the scheduler transmits a token between at least two egress managers in accordance with a predetermined algorithm, thereby allowing the at least two egress managers to individually schedule an egress transmission of data when the token is present.

21. A network switch as recited in claim 17, wherein the slot free address pool unit further comprises a slot free address pool and a slot free address pool controller connected to the slot free address pool.

22. A network switch as recited in claim 21, wherein the slot free address pool controller is configured to receive and release free slots from the slot free address pool for use in storing cells in the second memory.

23. A network switch as recited in claim 17, wherein the first memory controller receives and processes requests for storage of data in the first memory.

24. A network switch as recited in claim 17, wherein the second memory controller receives and processes requests for storage of data in the second memory.

25. A network switch as recited in claim 24, wherein the second memory controller receives requests from a slot assembly unit, the slot free address pool, a slot assembly unit, and a refresh requestor.

26. A method for storing data in a network switch, said method comprising the steps of:

receiving data to be transmitted to an egress at an input to a memory management unit;

formatting the data received as a linked list;

determining if the data is to be stored in a first memory or a second memory; and storing the data in the first memory or the second memory based on the determining step;

wherein the determining step further comprises the steps of determining if a cell count is less than a first predetermined threshold for the egress;

determining if a number of cells in the second memory is zero; and determining if a number of cells in the first memory added to a number of cells remaining in an assembly is less than the first predetermined threshold.

27. A method for storing data in a network switch, said method comprising the steps of:

receiving data to be transmitted to an egress at an input to a memory management unit;

formatting the data received as a linked list;

determining if the data is to be stored in a first memory or a second memory; and storing the data in the first memory or the second memory based on the determining step;

wherein the step of storing data in the first memory further comprises the steps of initializing a cell count;

setting an in progress flag;

loading a first cell pointer into a memory controller;

incrementing the cell count;

storing a first cell in the first memory.

28. A method for storing data in a network switch as recited in claim 27, further comprising the steps of incrementing the cell count;

storing a next cell in the first memory;

determining if a last cell bit is set; and loading a next cell pointer and continuing to store cells if the last cell bit is determined not to be set.

29. A method for storing data in a network switch, said method comprising the steps of:

receiving data to be transmitted to an egress at an input to a memory management unit;

formatting the data received as a linked list;
determining if the data is to be stored in a first memory or a second memory; and
storing the data in the first memory or the second memory based on the determining step;
wherein the step of storing data in the second memory further comprises the steps of initializing global storage of data and continuing global storage of data until a last slot is stored.

30. A method for storing data in a network switch as recited in claim 29, wherein the step of initializing global storage further comprises the steps of:
initializing a global cell count and setting an in progress flag;
incrementing the global cell count;
writing a first cell to a cell accumulation buffer;
determining if a last cell bit is set; and
loading a next cell pointer if the last cell bit is not set.

31. A method for storing data in a network switch as recited in claim 30, wherein the step of continuing global storage further comprises the steps of:
incrementing the global cell count;
writing a next cell to the cell accumulation buffer;
determining if the last cell bit is set;
continuing global storage of cells if the last cell bit is not set; and
clearing the in progress flag if the last cell bit is set.

* * * * *